US011875021B2

(12) United States Patent
Bylenok et al.

(10) Patent No.: US 11,875,021 B2
(45) Date of Patent: Jan. 16, 2024

(54) UNDERWATER USER INTERFACE

(71) Applicant: Apple Inc., Cupertino, CA (US)

(72) Inventors: Benjamin W. Bylenok, Cupertino, CA (US); Alan An, Santa Clara, CA (US); Alyssa C. Ramdyal, Campbell, CA (US); Andrew Chen, Sunnyvale, CA (US); Anya Prasitthipayong, Sunnyvale, CA (US); Cheng-I Lin, Emeryville, CA (US); Eric Shi, Cupertino, CA (US); Kenneth H. Mahan, San Jose, CA (US); Ki Myung Lee, Cupertino, CA (US); Kyle B. Cruz, Campbell, CA (US); Maxime Chevreton, Mountain View, CA (US); Richard J. Blanco, San Francisco, CA (US); Sung Chang Lee, Saratoga, CA (US); Walton Fong, San Jose, CA (US); Wei Guang Wu, Palo Alto, CA (US); Xuefeng Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/222,803

(22) Filed: Apr. 5, 2021

(65) Prior Publication Data
US 2021/0223925 A1 Jul. 22, 2021

Related U.S. Application Data

(63) Continuation of application No. 16/222,619, filed on Dec. 17, 2018, now Pat. No. 10,969,941.
(Continued)

(51) Int. Cl.
G06F 3/0484 (2022.01)
G06F 3/0482 (2013.01)
(Continued)

(52) U.S. Cl.
CPC .............. *G06F 3/0484* (2013.01); *G06F 3/02* (2013.01); *G06F 3/0482* (2013.01);
(Continued)

(58) Field of Classification Search
CPC ........ G06F 3/0484; G06F 3/02; G06F 3/0482; G06F 3/04883; G06F 1/163;
(Continued)

(56) References Cited

U.S. PATENT DOCUMENTS 6,323,846 B1 11/2001 Westerman et al.
6,570,557 B1 5/2003 Westerman et al.
(Continued)

FOREIGN PATENT DOCUMENTS

CN 102929424 A * 2/2013
JP 2012233954 A * 11/2012
(Continued)

OTHER PUBLICATIONS

Final Office Action received for U.S. Appl. No. 16/222,619, dated Jul. 27, 2020, 11 pages.
(Continued)

*Primary Examiner* — Jordany Nunez
(74) *Attorney, Agent, or Firm* — DLA Piper LLP (US)

(57) ABSTRACT

The present disclosure generally relates to underwater user interfaces. In some embodiments, a method includes at an electronic device with a display and one or more input devices, receiving a first request to display a user interface for accessing a first function of the electronic device. In response to receiving the first request, and in accordance with a determination that the electronic device is under water, the method includes displaying a first user interface for accessing the first function. In response to receiving the first request, and in accordance with a determination that the electronic device is not under water, the method also
(Continued)

includes displaying a second user interface for accessing the first function.

30 Claims, 43 Drawing Sheets

Related U.S. Application Data

(60) Provisional application No. 62/738,832, filed on Sep. 28, 2018.

(51) Int. Cl.
| | | |
|---|---|---|
| *G06F 3/0488* | (2022.01) | |
| *G06F 3/04883* | (2022.01) | |
| *G06F 3/02* | (2006.01) | |
| *H04M 1/72454* | (2021.01) | |
| *H04N 23/62* | (2023.01) | |

(52) U.S. Cl.
CPC .... *G06F 3/04883* (2013.01); *H04M 1/72454* (2021.01); *H04N 23/62* (2023.01)

(58) Field of Classification Search
CPC .... G06F 1/1656; G06F 1/1671; G06F 1/1686; G06F 3/04817; H04M 1/72454; H04M 1/18; H04N 5/23216; H04N 5/23296; H04N 5/23245; H04N 5/23293; H04N 5/232933; B63C 2011/021
See application file for complete search history.

(56) References Cited

U.S. PATENT DOCUMENTS

| | | | |
|---|---|---|---|
| 6,677,932 B1 | 1/2004 | Westerman | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,023,031 B2 * | 9/2011 | Ikeda ................. | H04N 5/23245 348/333.04 |
| 8,239,784 B2 | 8/2012 | Hotelling et al. | |
| 8,272,262 B2 * | 9/2012 | Cabrera ................ | G01C 13/00 73/170.29 |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 9,348,458 B2 | 5/2016 | Hotelling et al. | |
| 9,733,767 B2 * | 8/2017 | Shin ..................... | G06F 3/04166 |
| 9,933,937 B2 | 4/2018 | Lemay et al. | |
| 10,373,479 B2 | 8/2019 | Banfi | |
| 10,969,941 B2 * | 4/2021 | Bylenok ............... | G06F 1/1686 |
| 11,726,194 B2 * | 8/2023 | Nangou ............... | G01S 7/52071 382/100 |
| 2002/0015024 A1 | 2/2002 | Westerman et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2011/0214500 A1 * | 9/2011 | Cabrera ................. | G01C 13/00 73/170.29 |
| 2012/0023450 A1 * | 1/2012 | Noto .................... | G06F 3/04886 715/825 |
| 2012/0236173 A1 * | 9/2012 | Telek ....................... | G03B 7/00 348/223.1 |
| 2015/0022481 A1 | 1/2015 | Andersson et al. | |
| 2015/0062069 A1 * | 3/2015 | Shin ........................ | G06F 3/044 345/174 |
| 2015/0277720 A1 * | 10/2015 | Thorson ................ | G06F 3/0487 345/174 |
| 2016/0146935 A1 * | 5/2016 | Lee ......................... | H04B 11/00 367/87 |
| 2016/0334295 A1 * | 11/2016 | Miura ........................ | G01L 9/12 |
| 2016/0334935 A1 * | 11/2016 | Jeon ......................... | G06F 3/0418 |
| 2017/0003879 A1 * | 1/2017 | Tamai .................... | G06F 3/0481 |
| 2017/0024587 A1 * | 1/2017 | Nonogaki ............... | H04M 1/00 |
| 2017/0201618 A1 * | 7/2017 | Schmidt ................. | G01N 27/02 |
| 2017/0213525 A1 * | 7/2017 | Tamegai ................ | G09G 5/006 |
| 2017/0243471 A1 * | 8/2017 | Banfi ....................... | G01S 19/17 |
| 2018/0059872 A1 | 3/2018 | Iida | |
| 2018/0157368 A1 * | 6/2018 | Park ..................... | G06F 3/04162 |
| 2018/0260070 A1 | 9/2018 | Mun et al. | |
| 2019/0064998 A1 | 2/2019 | Chowdhury et al. | |
| 2019/0246060 A1 * | 8/2019 | Tanabe .................. | G06F 3/0304 |
| 2019/0324640 A1 * | 10/2019 | Park ......................... | G06K 9/22 |
| 2020/0104021 A1 * | 4/2020 | Bylenok .......... | H04N 5/232933 |

FOREIGN PATENT DOCUMENTS

| | | | |
|---|---|---|---|
| JP | 2018042137 A | * | 3/2018 |
| WO | 2013/169849 A2 | | 11/2013 |
| WO | 2014/105276 A1 | | 7/2014 |

OTHER PUBLICATIONS

Non-Final Office Action received for U.S. Appl. No. 16/222,619, dated Mar. 19, 2020, 16 pages.
Notice of Allowance received for U.S. Appl. No. 16/222,619, dated Nov. 20, 2020, 9 pages.
Supplemental Notice of Allowability received for U.S. Appl. No. 16/222,619, dated Mar. 8, 2021, 3 pages.

* cited by examiner

700 ⬎

At an electronic device with a display and one or more input devices, receive a first request to display a user interface for assessing a first function of the electronic device
702

In response to receiving the first request, and in accordance with a determination that the electronic device is under water, display a first user interface for accessing the first function
704

In response to receiving the first request, and in accordance with a determination that the electronic device is not under water, display a second user interface for accessing the first function
706

while displaying the first user interface:
detect, via the one or more input devices, a first user input to access the first function;
in accordance with a determination that the first user input is a first type of user input, access the first function from the first user interface; and
in accordance with a determination that the first user input is not the first type of user input, maintain display of the first user interface without accessing the first function;
while displaying the second user interface:
detect, via the one or more input devices, a second user input to access the first function;
in accordance with a determination that the second user input is a second type of user input, access the first function from the second user interface; and
in accordance with a determination that the second user input is not the second type of user input, maintain display of the second user interface without accessing the first function.
708

The first user interface has a first appearance, and where the second user interface has a second appearance that is different from the first appearance
710

FIG. 7A

Receive a second request to display a user interface for accessing a second function of the electronic device;
in response to receiving the second request, and in accordance with a determination that the electronic device is under water:
display the first user interface for accessing the second function;
while displaying the first user interface, detect, via the one or more input devices, a first user input to access the second function; and
in accordance with a determination that the first user input is a first type of user input, access the second function from the first user interface; and
in accordance with a determination that the first user input is not the first type of user input, maintain display of the first user interface without accessing the second function;
in response to receiving the second request, and in accordance with a determination that the electronic device is not under water:
display the second user interface for accessing the second function;
while displaying the second user interface, detect, via the one or more input devices, a second user input to access the second function;
after displaying the second user interface, and in accordance with a determination that a second type of user input is performed while the second user interface is displayed, access the second function from the second user interface; and
after displaying the second user interface, and in accordance with a determination that the second type of user input is not performed while the second user interface is displayed, maintain display of the second user interface without accessing the second function
712

While displaying the first user interface:
detect, via the one or more input devices, a first user input to interact with a physical button of the electronic device;
in response to detecting the first user input, perform the first function;
in response to receiving the first request, and in accordance with a determination that the electronic device is not under water:
display a first user interface element that is associated with the first function in the second user interface;
detect, via the one or more input devices, a second user input to select the first user interface element;
in accordance with a determination that the second user input is a drag input performed over the first user interface element, perform the first function; and
in accordance with a determination that the second user input is not a drag input performed over the first user interface element, maintain display of the first user interface element without performing the first function
714

FIG. 7B

In response to receiving the first request, and in accordance with a determination that the electronic device is under water:
  display a first user interface element that is associated with the first function in the first user interface;
  detect, via the one or more input devices, a first user input to select the first user interface element;
  in accordance with a determination that the first user input is an input with an intensity above a respective intensity threshold detected at a location corresponding to the first user interface element, perform the first function; and
  in accordance with a determination that the first user input is an input with an intensity that is not above the respective intensity threshold detected at the location corresponding to the first user interface element, maintain display of the first user interface element without performing the first function;
in response to receiving the first request, and in accordance with a determination that the electronic device is not under water:
  display a second user interface element that is associated with the first function in the second user interface;
  detect, via the one or more input devices, a second user input to select the second user interface element;
  in accordance with a determination that the second user input is a drag input performed over the second user interface element, perform the first function; and
  in accordance with a determination that the second user input is not a drag input performed over the second user interface element, maintain display of the second user interface element without performing the first function
716

While displaying the first user interface:
  detect, via the one or more input devices, a first user input to interact with a physical button of the electronic device;
  in response to detecting the first user input, perform the first function;
in response to receiving the first request, and in accordance with a determination that the electronic device is not under water:
  display a first user interface element that is associated with the first function in the second user interface;
  detect, via the one or more input devices, a second user input to select the first user interface element; and
  in accordance with a determination that the second user input is a touch input performed over the first user interface element, perform the first function; and
  in accordance with a determination that the second user input is not a touch input performed over the first user interface element, maintain display of the first user interface element without performing the first function
718

In response to receiving the first request, and in accordance with a determination that the electronic device is under water:
  display a first user interface element that is associated with the first function in the first user interface;
  detect, via the one or more input devices, a first user input to select the first user interface element; and
  in accordance with a determination that the first user input is an input with an intensity above a respective intensity threshold detected at a location corresponding to the first user interface element, perform the first function; and
  in accordance with a determination that the first user input is an input with an intensity that is not above the respective intensity threshold detected at the location corresponding to the first user interface element, maintain display of the first user interface element without performing the first function;
in response to receiving the first request, and in accordance with a determination that the electronic device is not under water:
  display a second user interface element that is associated with the first function in the second user interface;
  detect, via the one or more input devices, a second user input to select the second user interface element;
  in accordance with a determination that the second user input is a touch input performed over the second user interface element, perform the first function; and
  in accordance with a determination that the second user input is not a touch input performed over the second user interface element, maintain display of the second user interface element without performing the first function
720

In response to receiving the first request, and in accordance with a determination that the electronic device is under water:
  display one or more user interface elements associated with the first function;
  detect, via the one or more input devices, a first user input to press a first physical button of the electronic device; and
  in response to detecting the first user input, select one of the one or more user interface elements
722

In response to receiving the first request, and in accordance with a determination that the electronic device is under water:
  display a plurality of user interface elements associated with the first function;
  detect, via the one or more input devices, a first user input to press a first physical button of the electronic device;
  in response to detecting the first user input, select a first user interface element of the plurality of user interface elements;
  after selecting the first user interface element, detect, via the one or more input devices, a second user input to press a second physical button of the electronic device;
  in response to detecting the second user input:
    unselect the first user interface element; and
    select a second user interface element of the plurality of user interface elements
724

In response to receiving the first request:
in accordance with a determination that the electronic device is under water, display one or more user interface elements that are associated with one or more functions in the first user interface; and
in accordance with a determination that the electronic device is not under water, display the second user interface without displaying the one or more user interface elements,
where the first user interface and the second user interface are wake screen user interfaces that are displayed while the electronic device is in a wake screen mode
726

The one or more user interface elements are associated with applications selected from a group consisting of a timer application, an alarm application, and a flashlight application
728

In response to receiving the first request, and in accordance with a determination that the electronic device is under water, display a camera user interface element in the first user interface;
detect, via the one or more input devices, a first user input to select the camera user interface element to access a camera of the electronic device;
in response to detecting the first user input, display an underwater camera user interface having one or more camera user interface elements that are associated with camera settings of the camera, where the user interacts with one or more of the one or more camera user interface elements to adjust one or more corresponding camera settings of the camera;
detect, via the one or more input devices, a second user input to select a first camera user interface element of the one or more camera user interface elements; and
in response to detecting the second user input, adjust a corresponding camera setting associated with the first camera user interface element
730

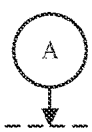

In accordance with a determination that the electronic device is under water, automatically adjust one or more settings of the electronic device for underwater usage
732

FIG. 7E

In accordance with a determination that the electronic device is under water, activate a lost phone mode; and while the electronic device is in the lost phone mode, periodically emit a flash from the electronic device
734

While the electronic device is in the lost phone mode, periodically emit a strobe pattern from the electronic device
736

While the electronic device is in the lost phone mode, receive a communication from a second electronic device; and
in response to receiving the communication from the second electronic device, activate the display of the electronic device
738

While the electronic device is in the lost phone mode, receive a communication from a second electronic device;
in response to receiving the communication from the second electronic device:
determine a position of the electronic device relative to the second electronic device; and
transmit a request to the second electronic device to display the position of the electronic device relative to the second electronic device on a display of the second electronic device
740

In accordance with a determination that the electronic device is under water, display a request for user confirmation that the electronic device is under water;
detect, via the one or more input devices, a first user input to confirm that the electronic device is under water; and
in response to detecting the first user input, display the first user interface on the display
742

FIG. 7F

While displaying the first user interface:
determine whether the electronic device is no longer under water; and
automatically remove the display of the first user interface after a determination that the electronic device is no longer under water
744 determine that the electronic device is under water if a first threshold amount of the display of the electronic device is wet; and
determine that the electronic device is not under water if a second threshold amount of the display of the electronic device is wet,
where the first amount percentage is greater than the second threshold amount
746

While displaying the first user interface:
determine whether the electronic device is no longer under water for a threshold period of time; and
automatically remove the display of the first user interface after a determination that the electronic device is no longer under water for the threshold period of time
748

In accordance with a determination that the electronic device is under water, display an underwater indicator on the display; and
in accordance with a determination that the electronic device is no longer under water, remove the underwater indicator from the display
750

While the underwater indicator is displayed in the first user interface, detect, via the one or more input devices, a first user input to remove the first user interface; and
in response to detecting the first user input, remove the first user interface from the display
752

In response to a determination that the electronic device is under water, deactivate one or more modules of the electronic device
754

FIG. 7G

UNDERWATER USER INTERFACE

CROSS-REFERENCE TO RELATED APPLICATIONS

This application is a continuation of U.S. application Ser. No. 16/222,619 (now U.S. Publication No. 2020-0104021), filed Dec. 17, 2018, which claims benefit of U.S. Provisional Patent Application No. 62/738,832, entitled "UNDERWATER USER INTERFACE," filed on Sep. 28, 2018, which are hereby incorporated by reference in their entirety for all purposes.

FIELD

The present disclosure relates generally to computer user interfaces, and more specifically to techniques for accessing underwater user interfaces and for operating an electronic device while the electronic device is under water.

BACKGROUND

As electronic devices are manufactured to be water resistant or water proof, some users are using their electronic devices while engaging in water based activities or other activities that cause their electronic devices to come in contact with water or other liquids. Users will, in some circumstances, operate their electronic devices while the electronic devices are wet.

Exemplary user interface hierarchies include groups of related user interfaces used for: organizing files and applications; storing and/or displaying digital images, editable documents (e.g., word processing, spreadsheet, and presentation documents), and/or non-editable documents (e.g., secured files and/or .pdf documents); recording and/or playing video and/or music; text-based communication (e.g., e-mail, texts, tweets, and social networking); voice and/or video communication (e.g., phone calls and video conferencing); and web browsing. A user will, in some circumstances, need to perform such user interface navigations within or between a file management program (e.g., Finder from Apple Inc. of Cupertino, Calif.), an image management application (e.g., Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But methods for performing these navigations and animating the transition between related user interfaces in a user interface hierarchy are cumbersome and inefficient. In addition, these methods take longer than necessary, thereby wasting energy. This latter consideration is particularly important in battery-operated devices.

Additionally, abrupt transitions between different user interfaces can be distracting and jarring for users, reducing the efficiency and enjoyment of the user when using the device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF SUMMARY

Current methods for displaying user interfaces while an electronic device is under water are outdated, time consuming, and inefficient. For example, some existing methods use complex and time-consuming user interfaces, which may include multiple key presses or keystrokes, and may include extraneous user interfaces. In addition, these methods take longer than necessary, thereby wasting energy. This latter consideration is particularly important in battery-operated devices.

Accordingly, the present technique provides electronic devices with faster, more efficient methods for accessing underwater user interfaces and interfaces for interacting with an electronic device while the electronic device is under water. Such methods and interfaces optionally complement or replace other methods and interfaces for interacting with an electronic device while the electronic device is under water. Such methods and interfaces reduce the number, extent, and/or nature of the inputs from a user, reduce the cognitive burden on the user, and produce a more efficient human-machine interface. For battery-operated computing devices, such methods and interfaces conserve power and increase the time between battery charges. Further, such methods and interfaces also streamline operations performed to access underwater user interfaces and for operating an electronic device while underwater, which reduce unnecessary received inputs and improves user efficiency and output.

The above deficiencies and other problems associated with user interfaces for electronic devices (e.g., with touch-sensitive surfaces) are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display and one or more input devices. The method includes receiving a first request to display a user interface for accessing a first function of the electronic device. In response to receiving the first request, and in accordance with a determination that the electronic device is underwater, the method includes displaying a first user interface for accessing the first function. In response to receiving the first request, and in accordance with a determination that the electronic device is not underwater, the method includes displaying a second user interface for accessing the first function.

In accordance with some embodiments, a non-transitory computer-readable storage medium comprising one or more programs, the one or more programs including instructions which, when executed by an electronic device with a display and one or more input devices, causes the electronic device to receive a first request to display a user interface for accessing a first function of the electronic device. In response to receiving the first request, and in accordance with a determination that the electronic device is underwater, the instructions also cause the electronic device to display a first user interface for accessing the first function. In response to receiving the first request, and in accordance with a determination that the electronic device is not underwater, the instructions also cause the electronic device to display a second user interface for accessing the first function.

In accordance with some embodiments, an electronic device includes a display, one or more input devices, one or more processors, memory, and one or more programs; the one or more programs are stored in the memory and configured to be executed by the one or more processors, and the one or more programs include instructions for performing or causing performance of the operations of any of the methods described herein. In accordance with some embodiments, a non-transitory computer readable storage medium has stored therein one or more programs, the one or more programs including instructions which, when executed by one or more processors of an electronic device with a display and one or more input devices, cause the electronic device to perform or cause performance of the operations of any of the methods described herein. In accordance with some embodiments, a graphical user interface on an electronic device with a display and one or more input devices, memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, one or more input devices, and means for performing or causing performance of the operations of any of the methods described herein. In accordance with some embodiments, an information processing apparatus, for use in an electronic device with a display and one or more input devices, includes means for performing or causing performance of the operations of any of the methods described herein.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods for accessing underwater user interfaces and interfaces for interacting with an electronic device while the electronic device is under water, thereby increasing the effectiveness, efficiency, and user satisfaction with such devices. Such methods and interfaces may complement or replace other methods for accessing underwater user interfaces.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 5B is a block diagram illustrating a personal electronic device in accordance with some embodiments.

FIGS. 7A-7G are flow diagrams of a process for accessing underwater user interfaces in accordance with some embodiments.

DESCRIPTION OF EMBODIMENTS

Figure 1A:
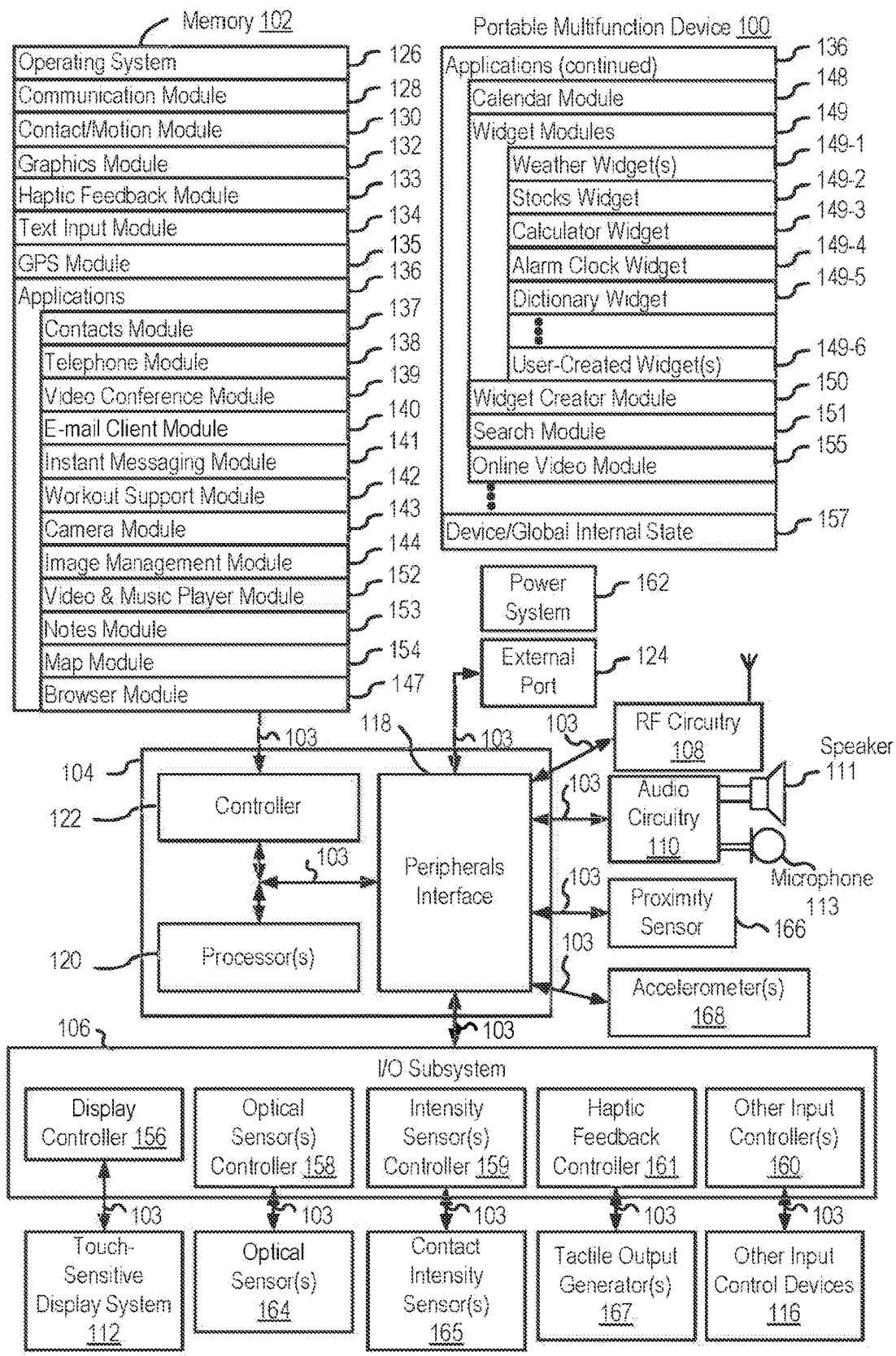
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for accessing underwater user interfaces displayed on the electronic devices. Such techniques can reduce the cognitive burden on a user who accesses user interfaces while the electronic device is under water, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for accessing underwater user interfaces. FIGS. 6A-6V illustrate exemplary user interfaces while device is under water. FIGS. 7A-7G are flow diagrams illustrating methods of accessing underwater user interfaces in accordance with some embodiments. The user interfaces in FIGS. 6A-6V are used to illustrate the processes described below, including the processes in FIGS. 7A-7G.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
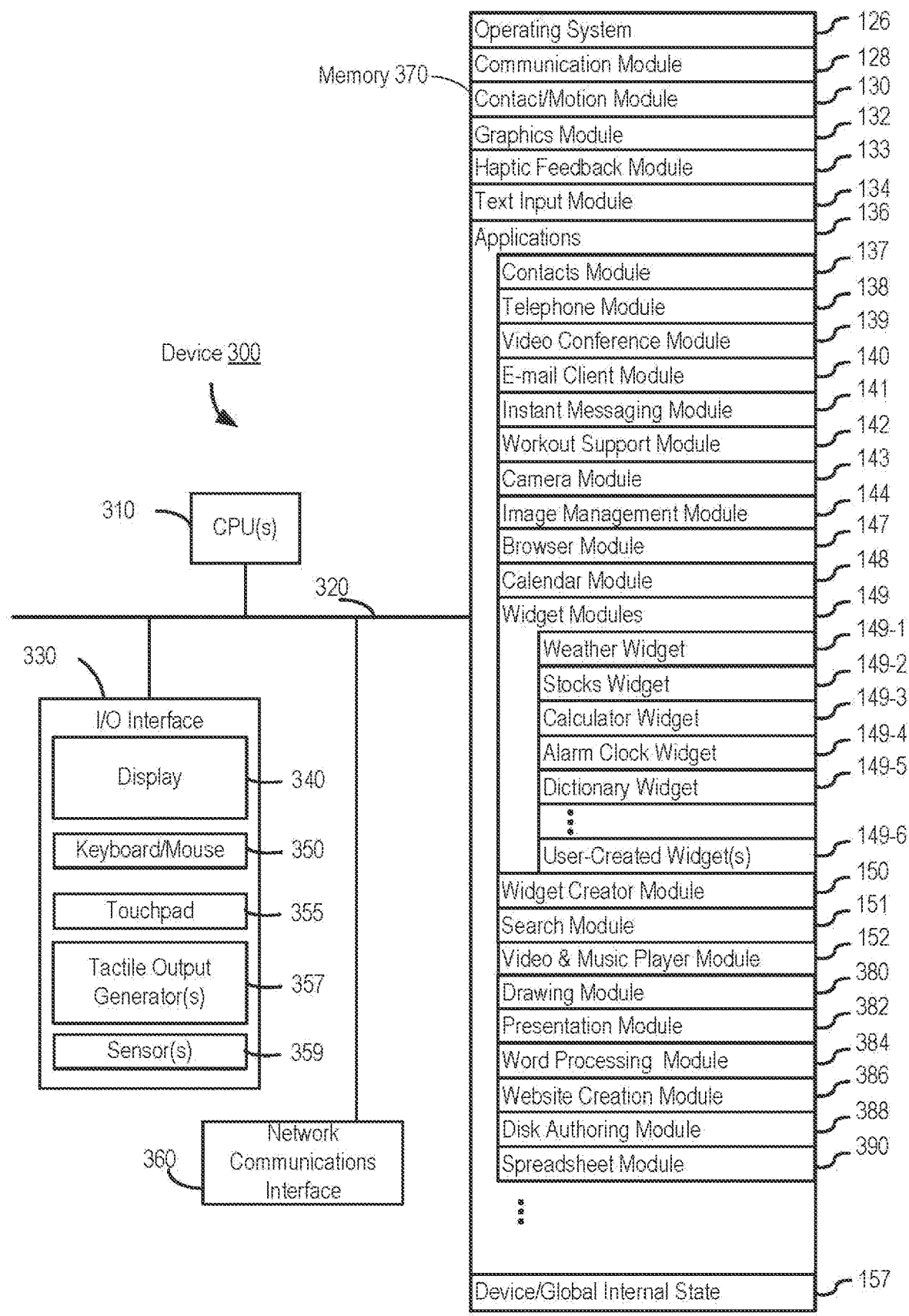
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
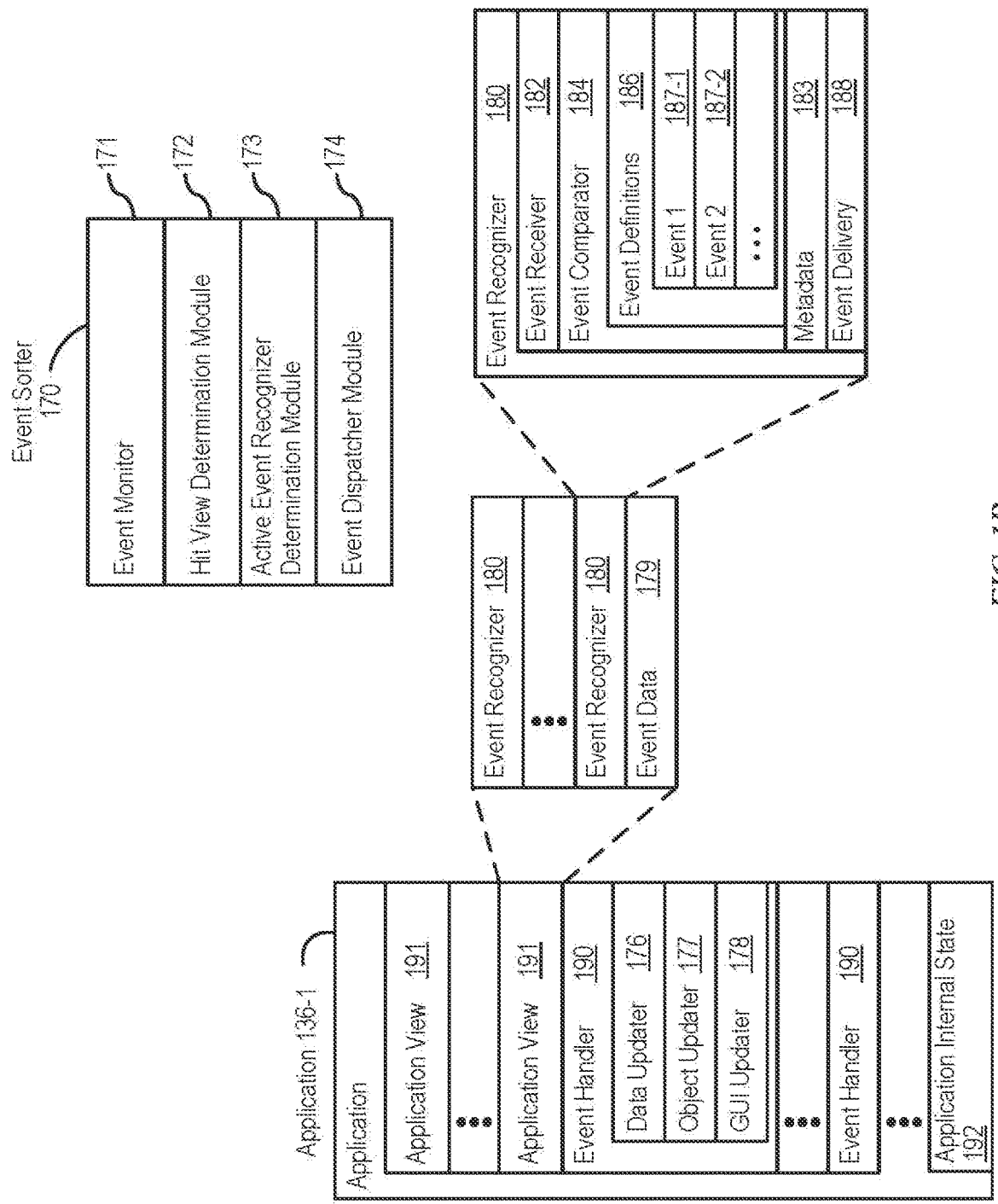
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
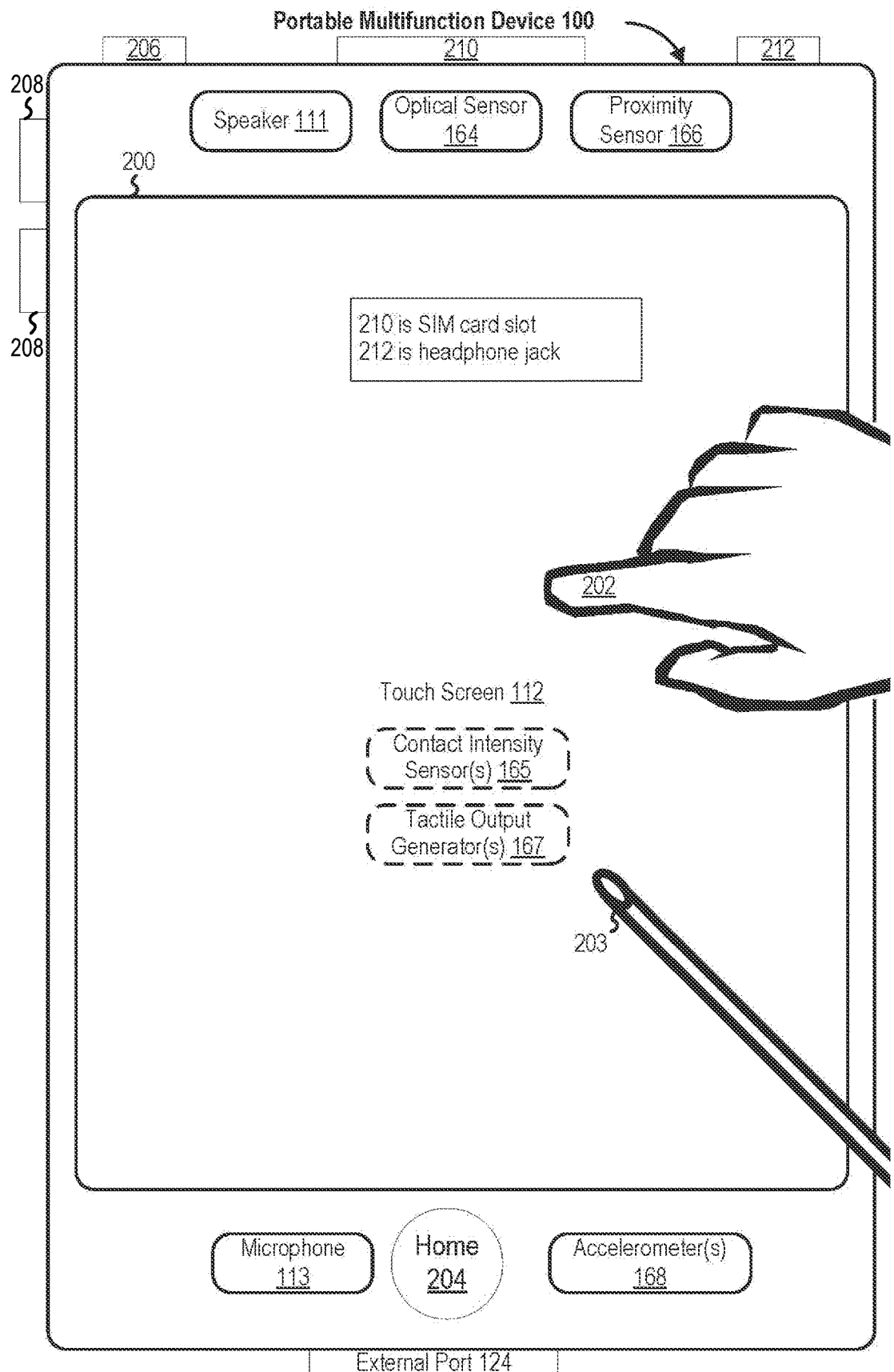
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
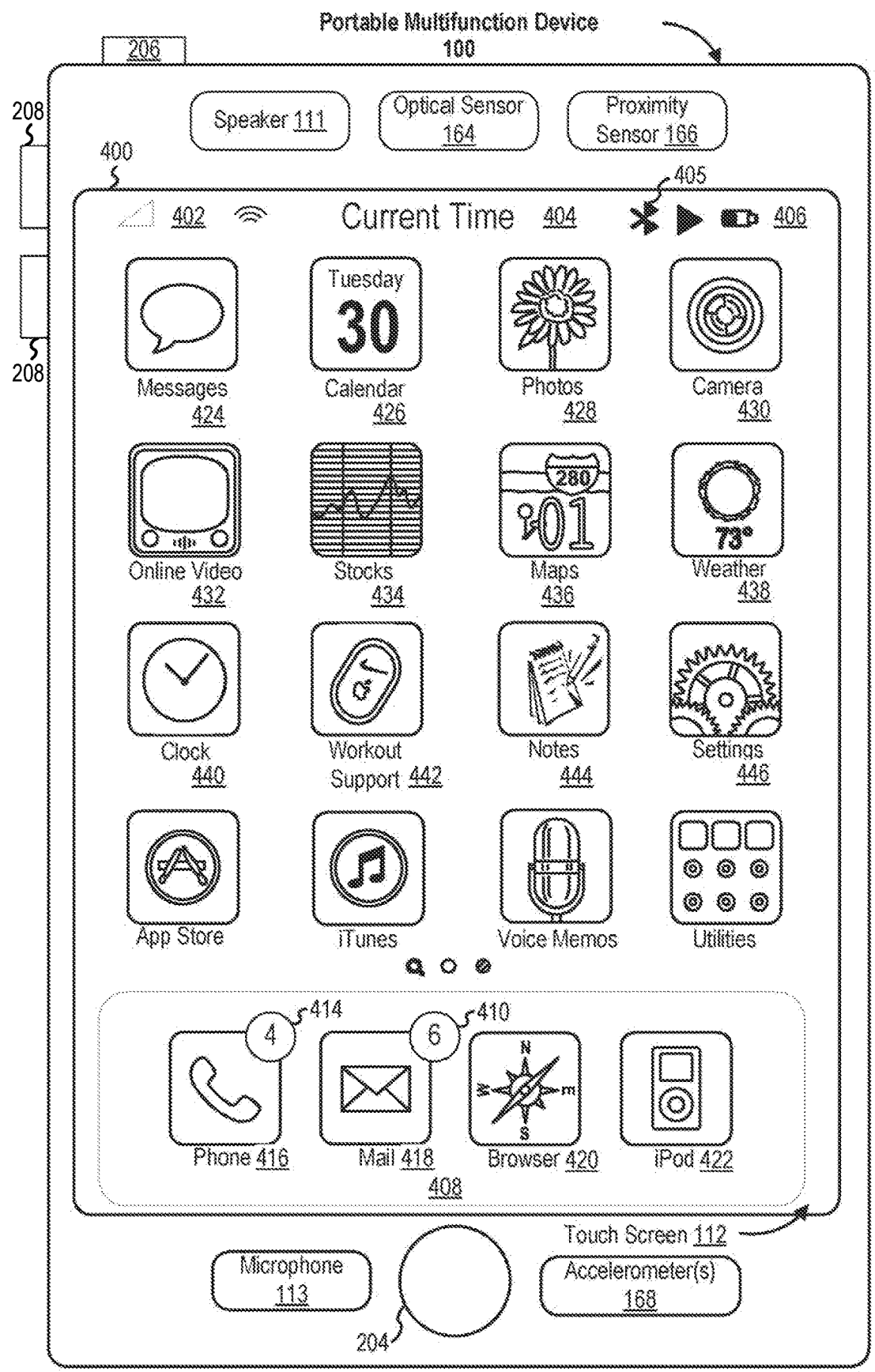
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
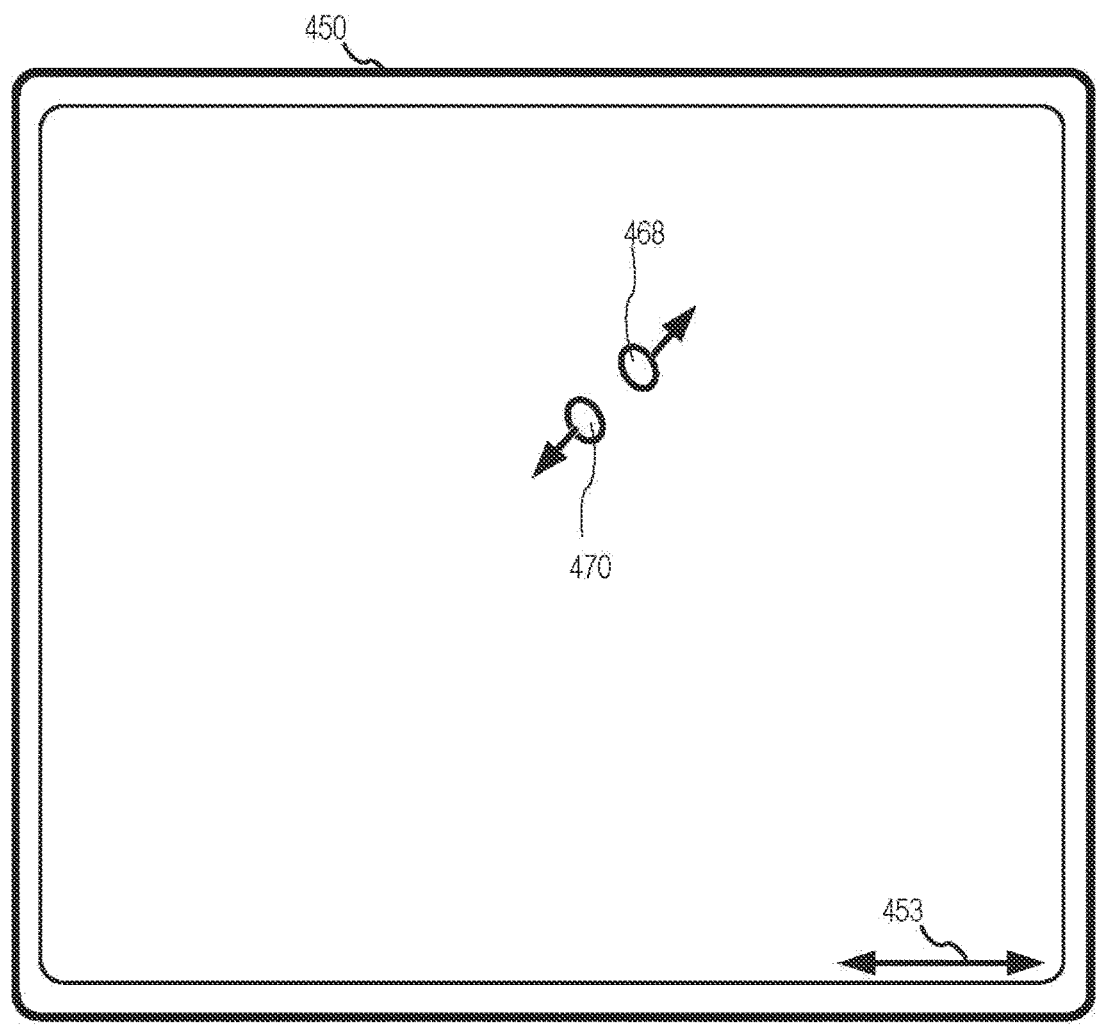
FIG. 4B illustrates an exemplary user interface for a multifunction device with a touch-sensitive surface that is separate from the display in accordance with some embodiments.
Figure 4B:
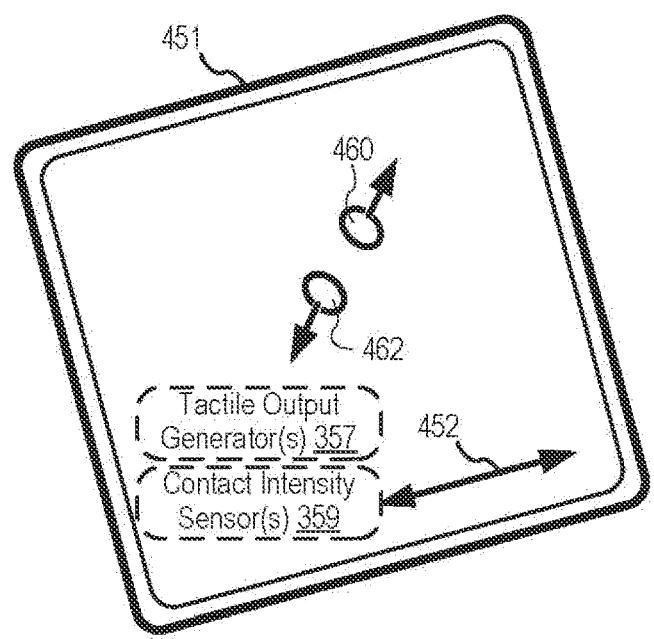

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
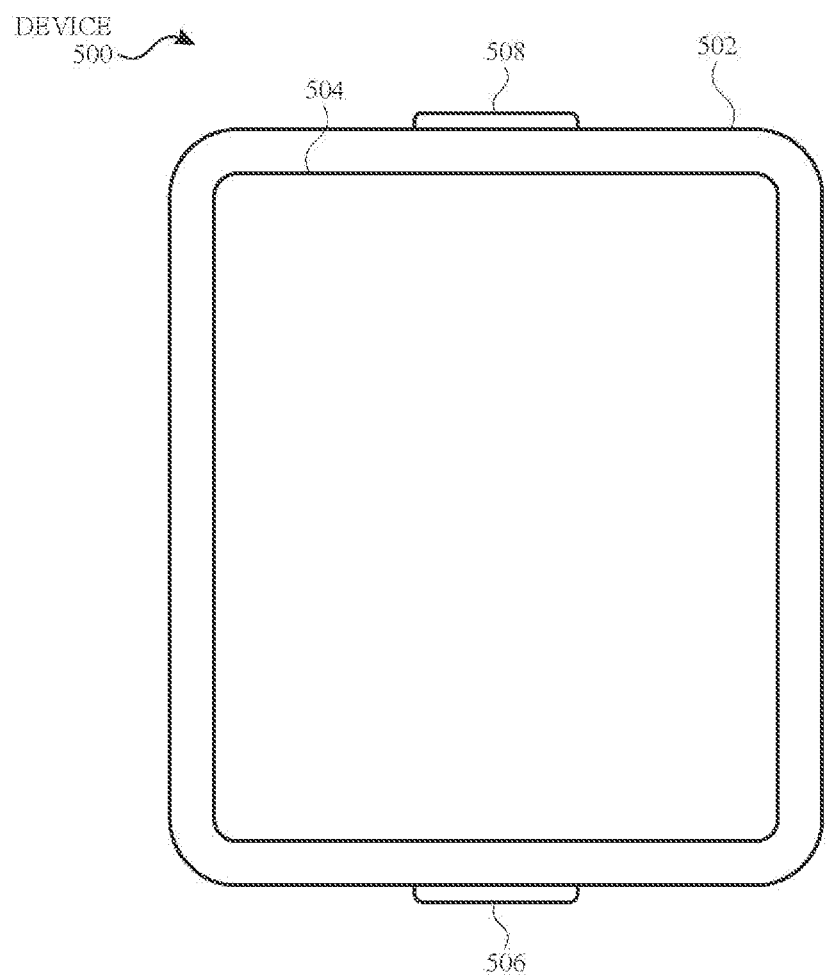
FIG. 5A illustrates a personal electronic device in accordance with some embodiments.
Figure 3B:
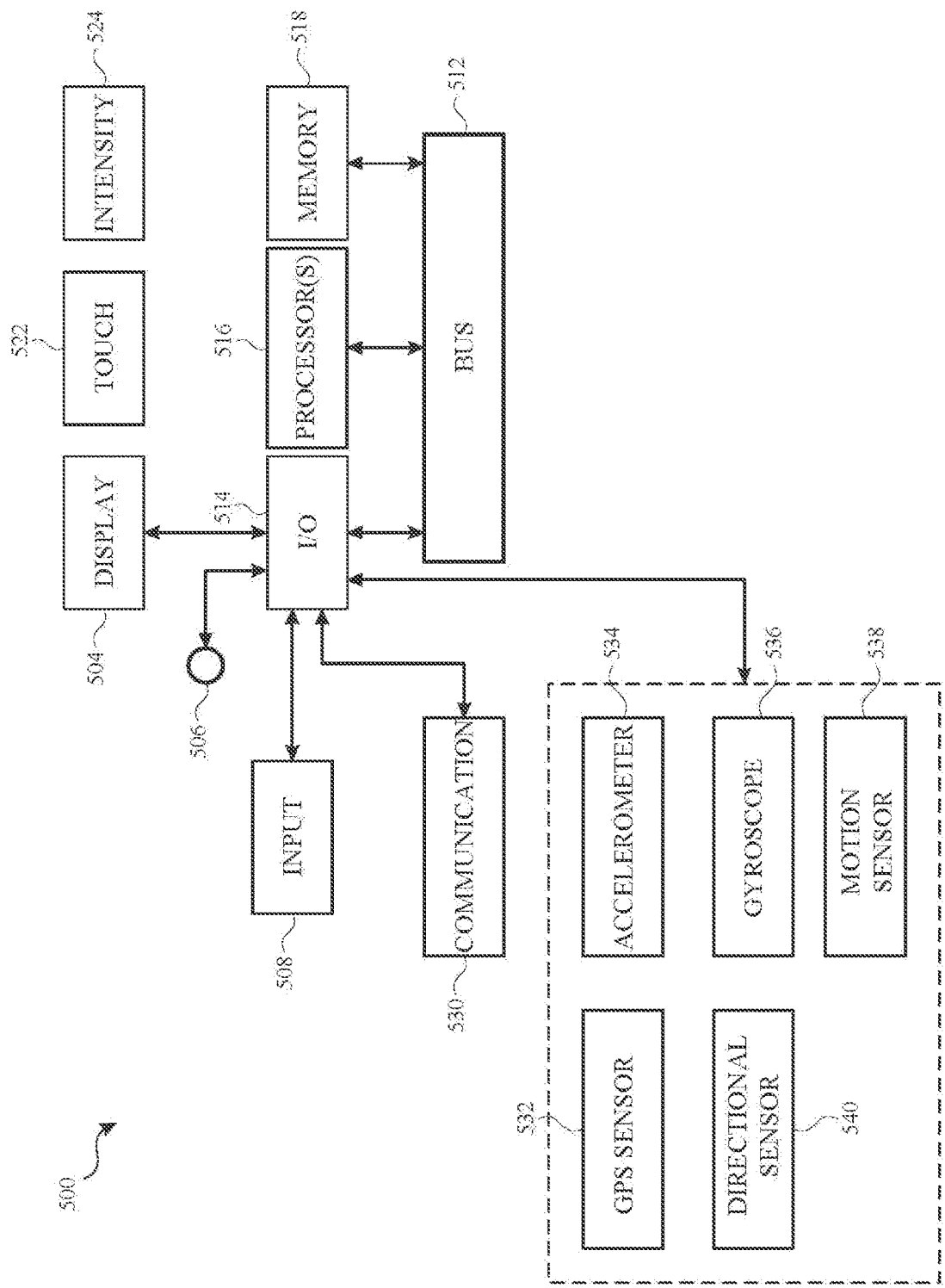
Figure 6A:
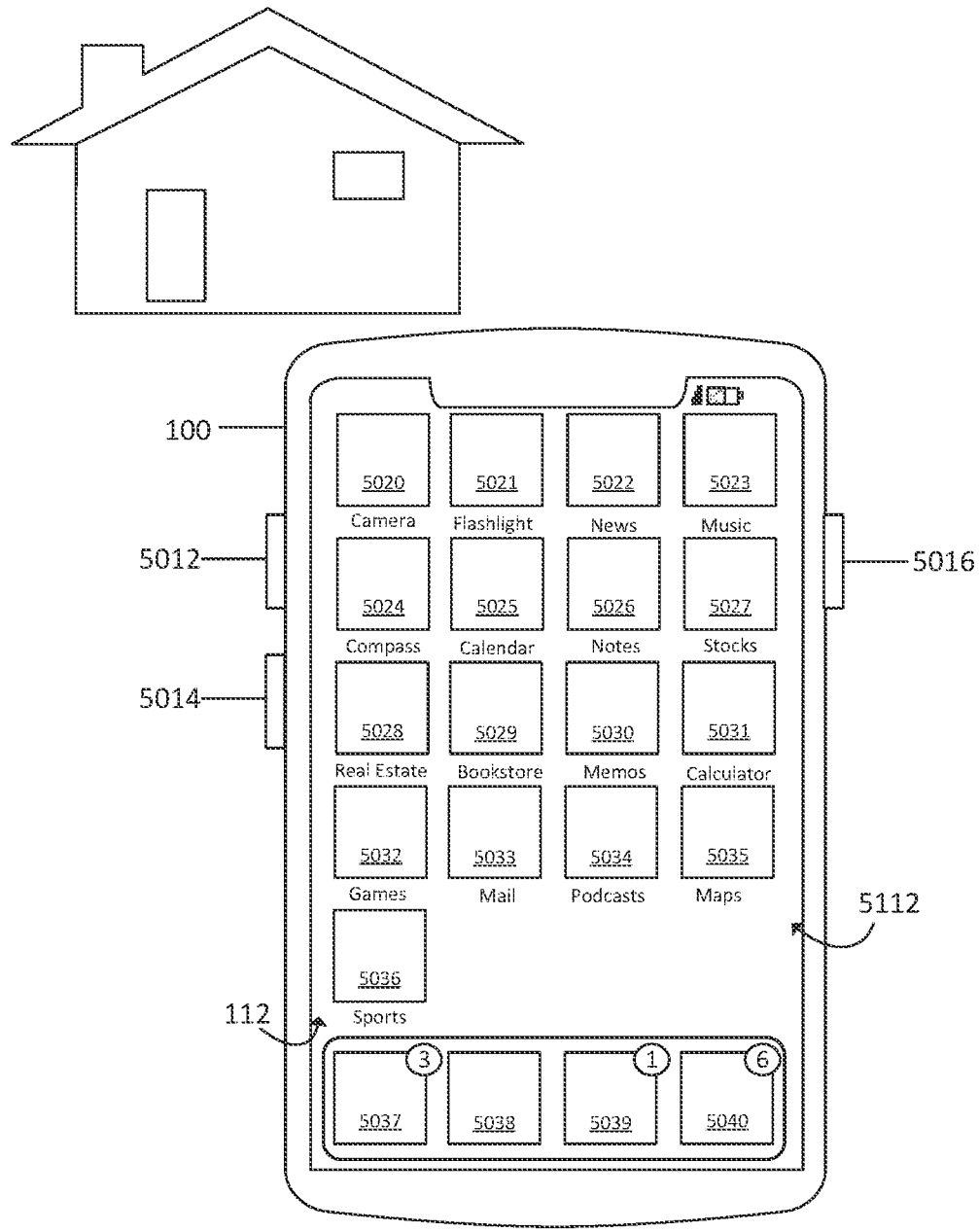
FIGS. 6A-6V illustrate example user interfaces for accessing underwater user interfaces in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
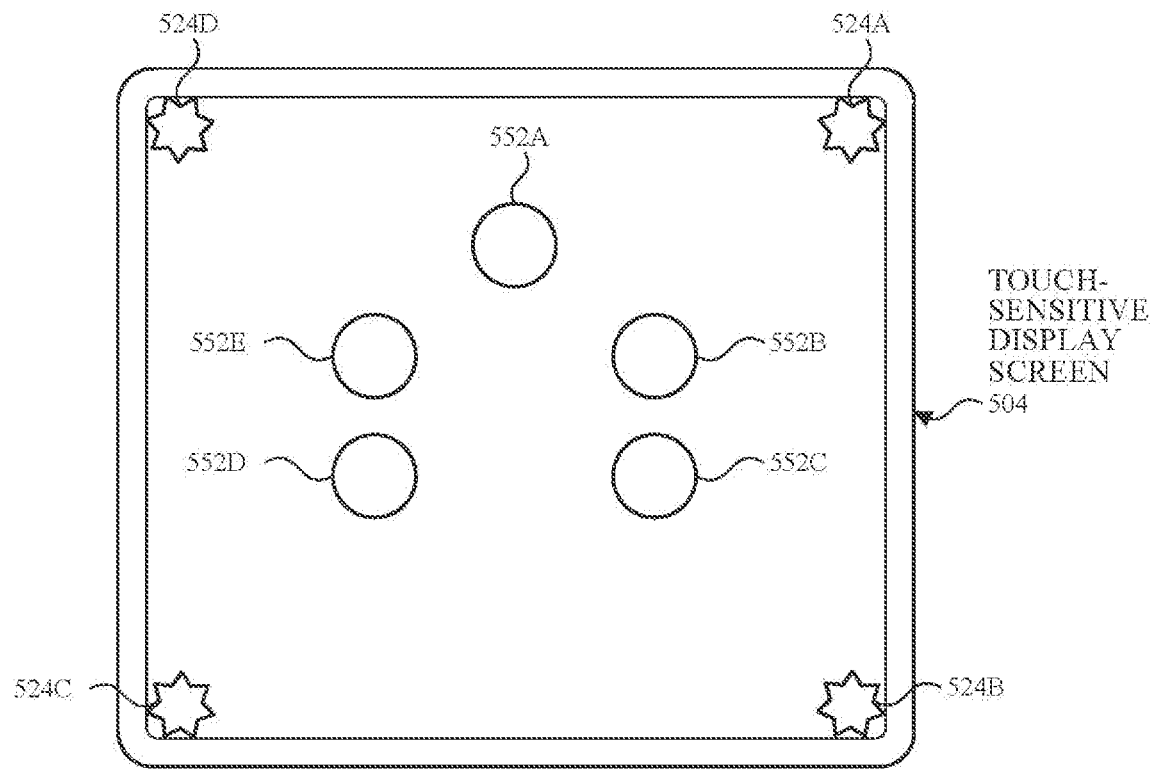
FIGS. 5C-5D illustrate exemplary components of a personal electronic device having a touch-sensitive display and intensity sensors in accordance with some embodiments.
Figure 5C:
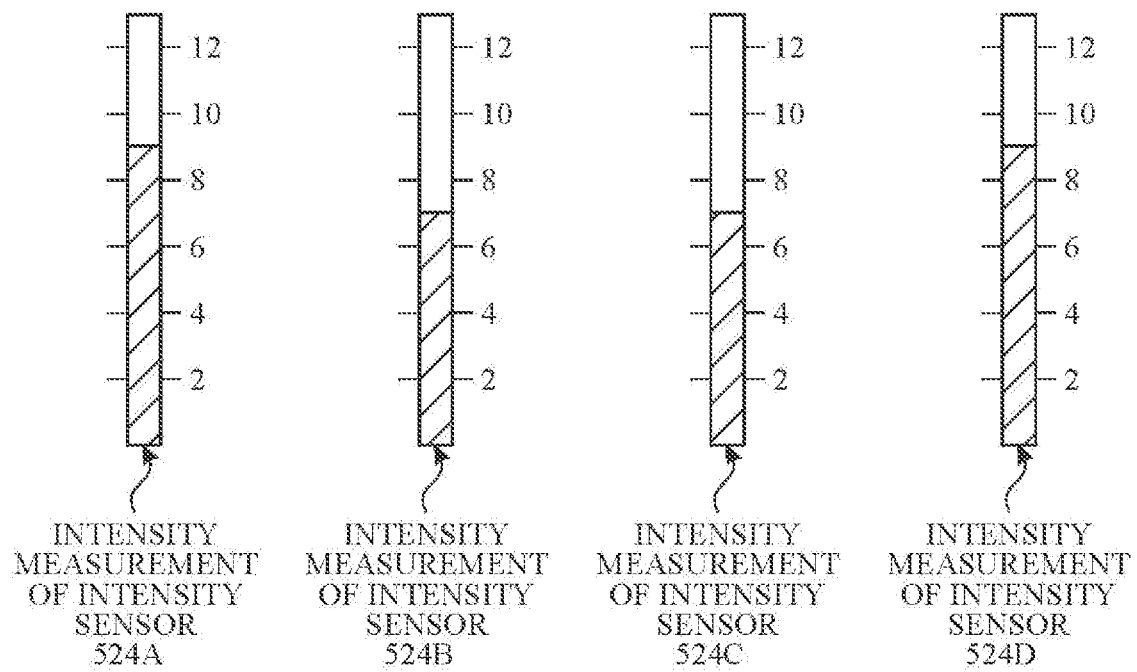
Figure 5D:
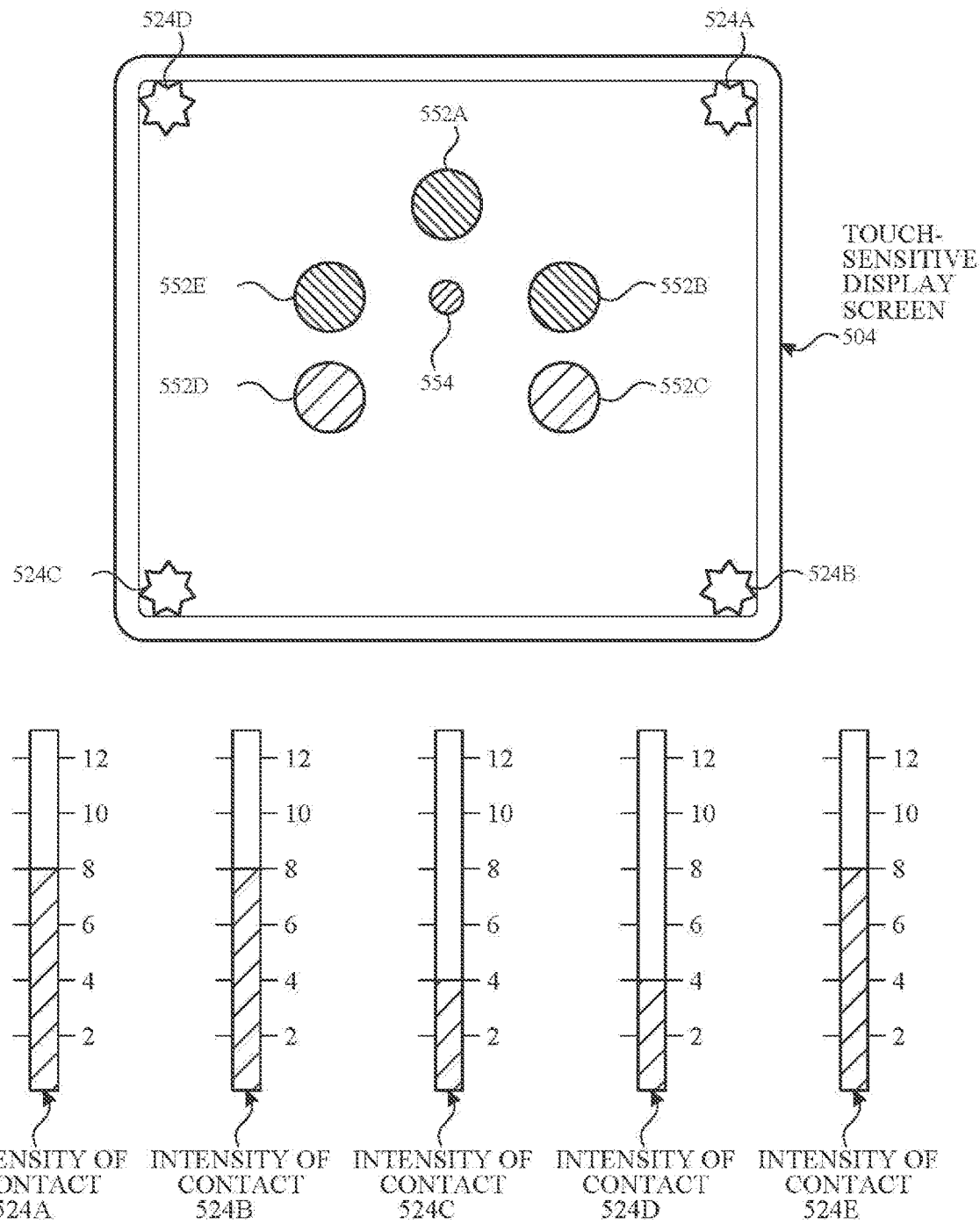

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input.

An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
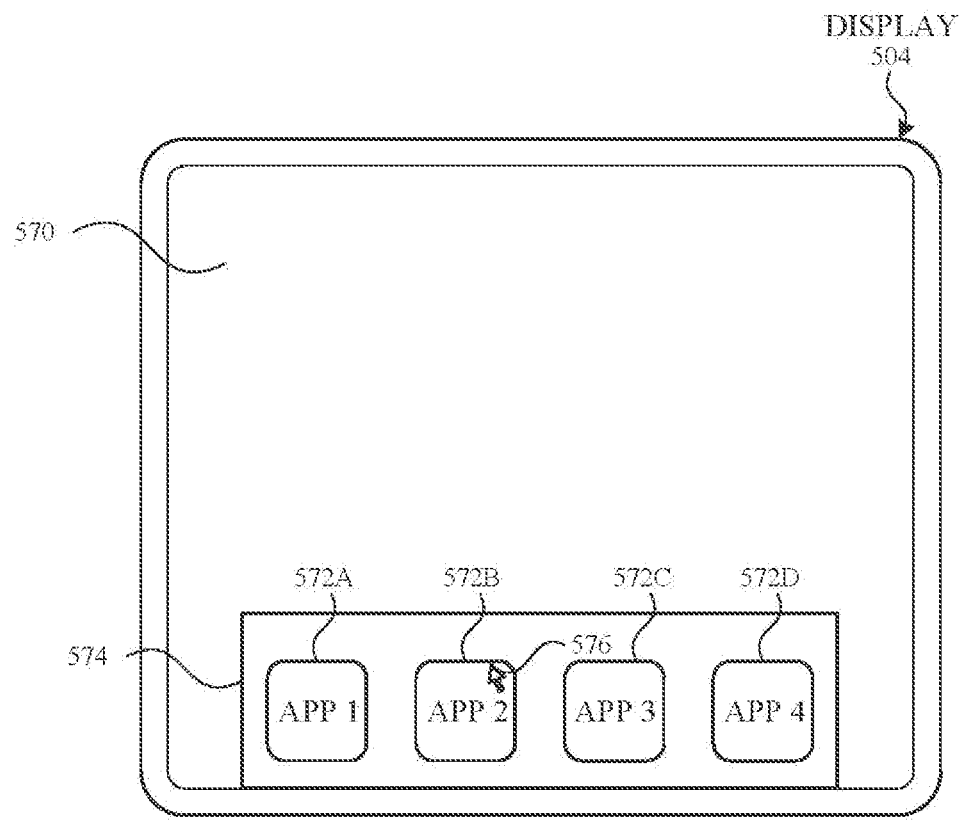
FIGS. 5E-5H illustrate exemplary components and user interfaces of a personal electronic device in accordance with some embodiments.
Figure 5E:
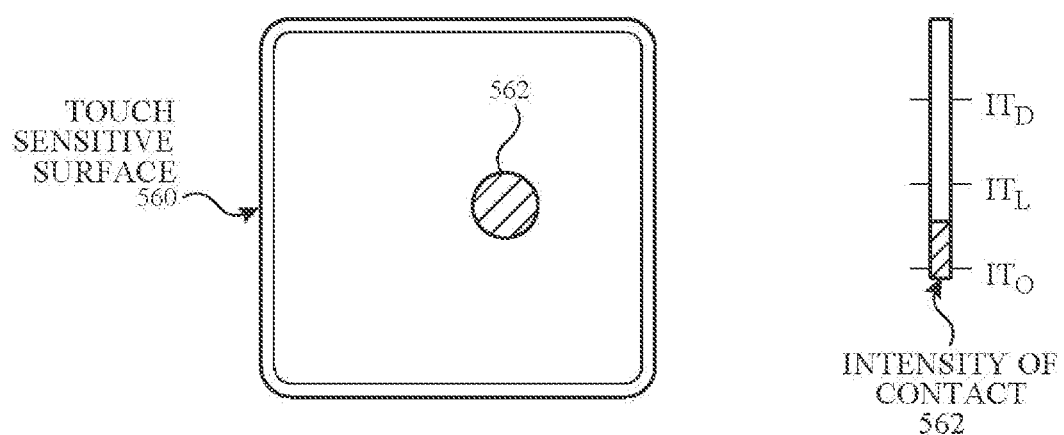
Figure 5F:
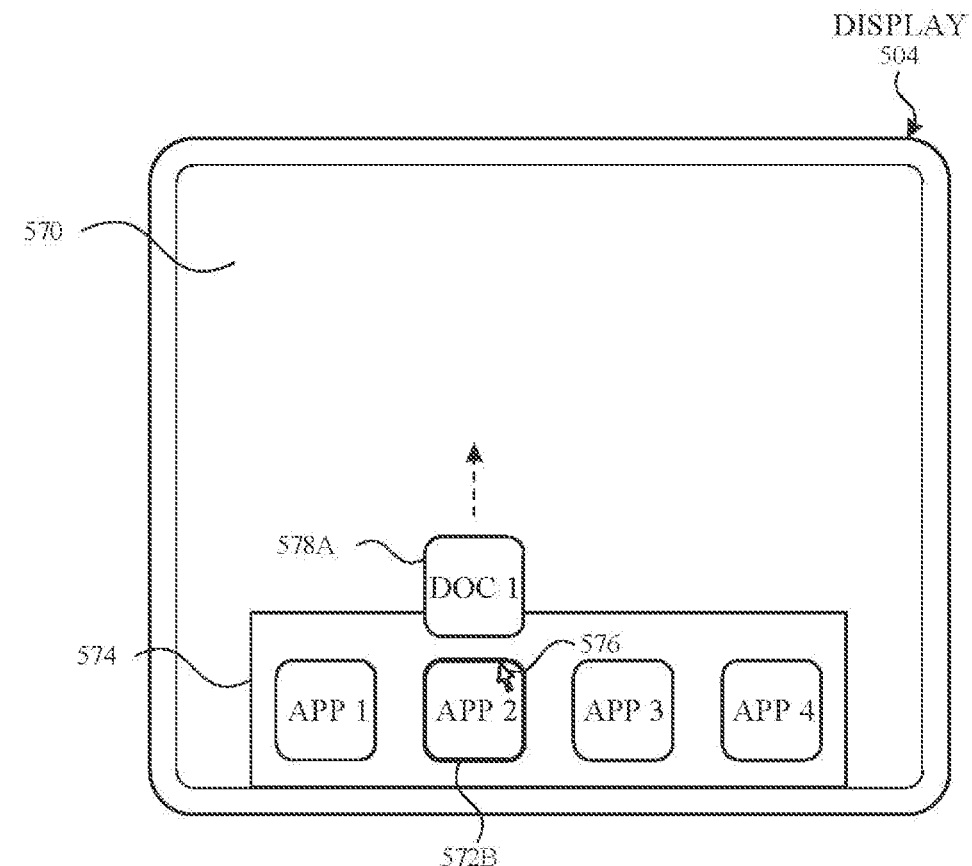
Figure 5F:
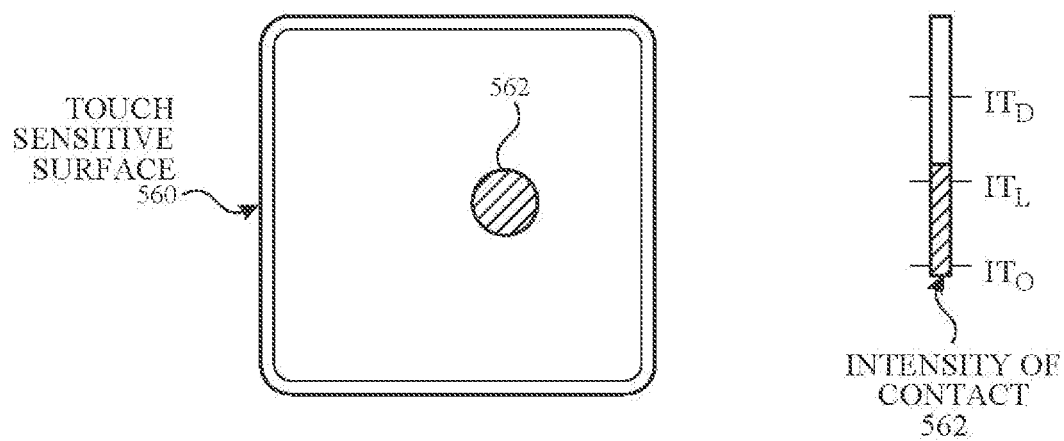
Figure 5G:
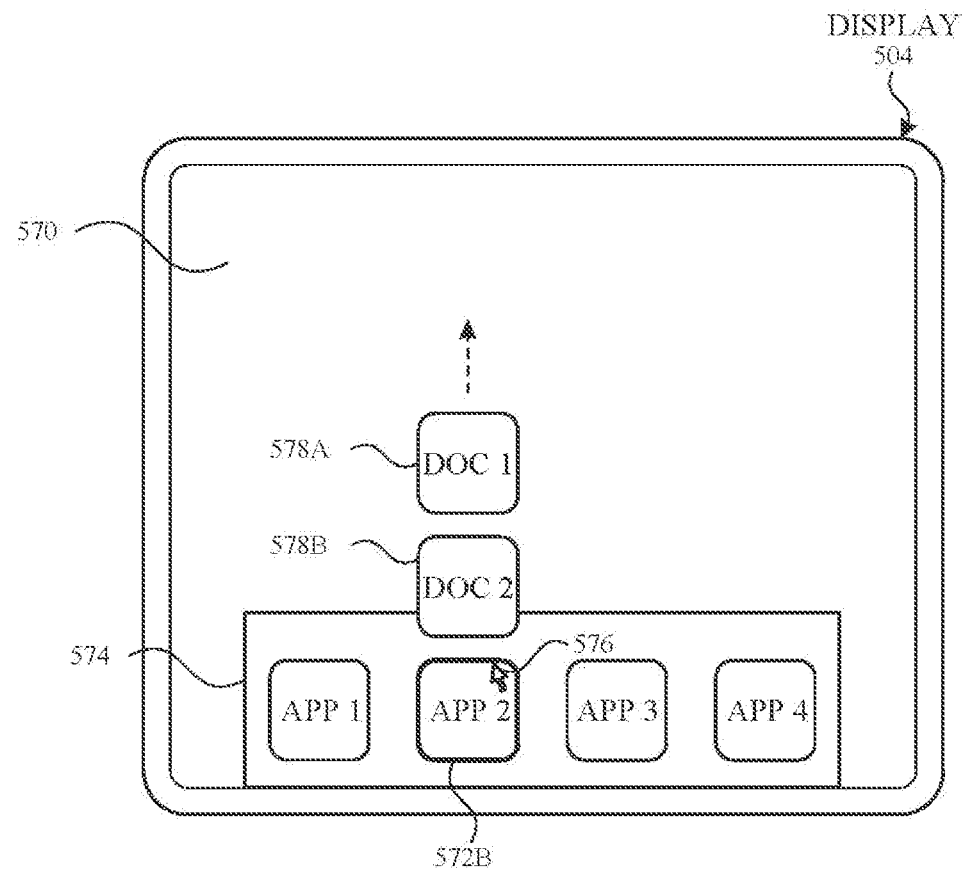
Figure 5G:
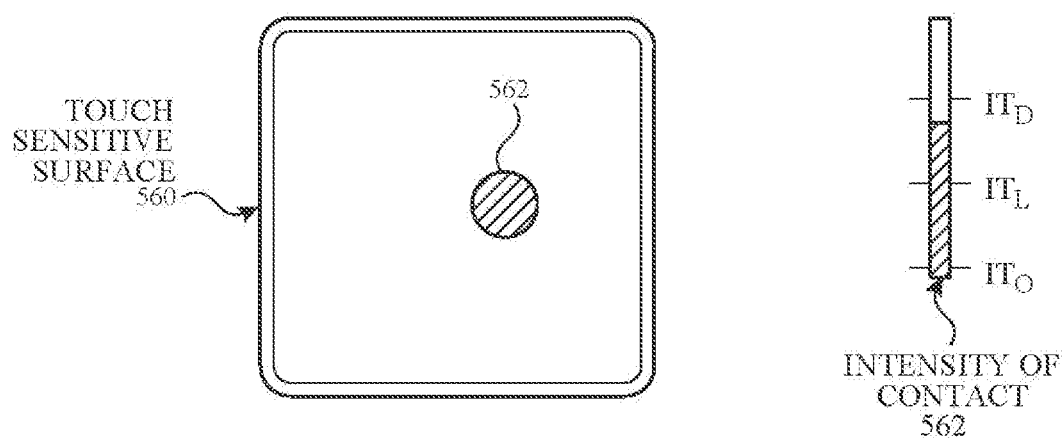
Figure 5H:
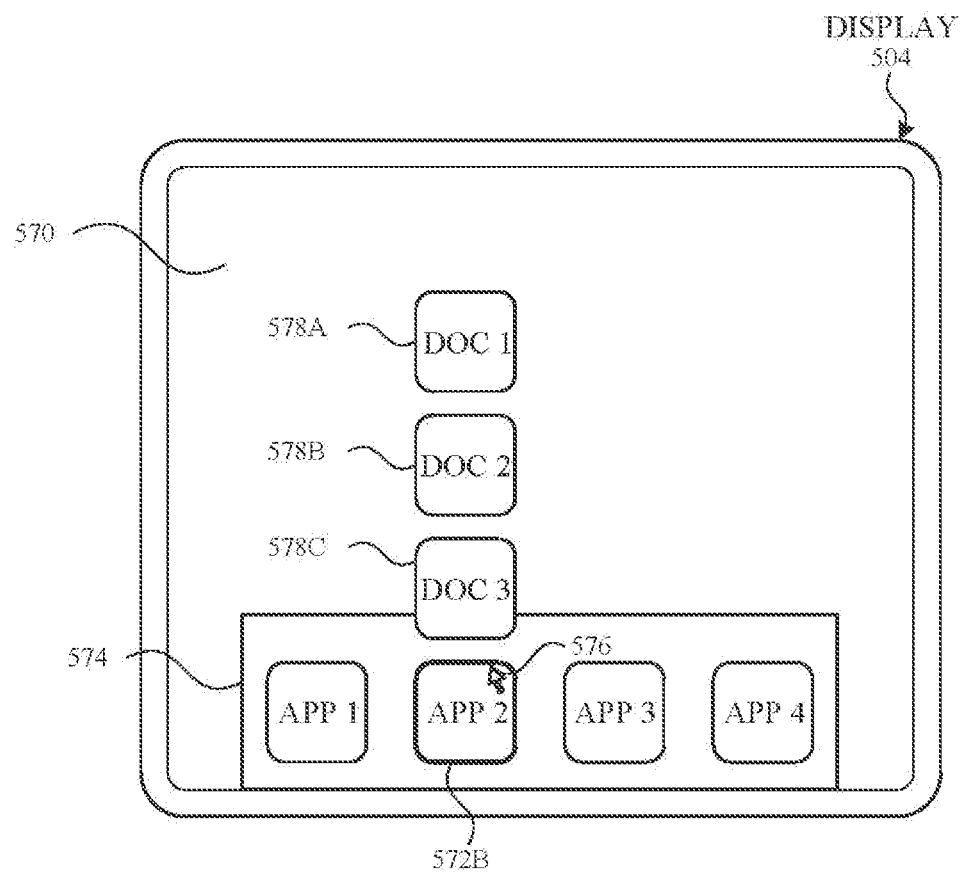
Figure 5H:
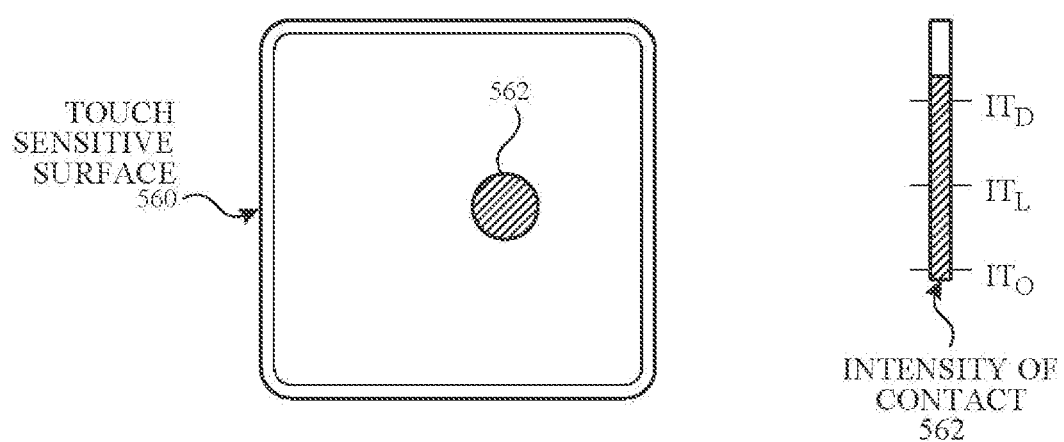

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT'D"). Contact 562 is maintained on touch-sensitive surface 560. In response to the detection of the gesture, and in accordance with contact 562 having an intensity that goes above the deep press intensity threshold (e.g., "IT'D") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6V illustrate exemplary user interfaces for accessing underwater user interfaces while an underwater mode is activated in accordance with some embodiments. The user interfaces in these figures are used to illustrate the processes described below, including the processes in FIGS. 7A-7G. As stated herein, an underwater mode is activated for an electronic device such as device 100 if one or more components of device 100, 300, or 500 of FIGS. 1A and 6A-6V, 3, or 5A, respectively, is wet, or is under water. In some embodiments, an underwater mode is activated for an electronic device if at least a threshold percentage (e.g., 20%, 40%, 75%, or another percentage) of the surface area of the electronic device or a component of the electronic device (e.g., display 112 of device 100) is wet or is under water. In some embodiments, an underwater mode is activated for an electronic device if one or more ports (e.g., charging port 124 as illustrated in FIGS. 1A and 2) of the electronic device are wet. In some embodiments, an electronic device is wet if the ports and a threshold percentage of the surface area of a display of the electronic device are wet. Similarly, an underwater mode is not activated or is deactivated for an electronic device such as device 100, 300, or 500, if at least a threshold percentage of the surface area of the electronic device or a component of the electronic device (e.g., display 112) is not wet, if one or more ports of the electronic device are not wet, or if the ports and at least the threshold percentage of the surface area of the electronic device are not wet.

In some embodiments, an electronic device such as device 100 determines to activate an underwater mode if a first threshold percentage of the surface area (e.g., 35, 90%, etc.) of a display (e.g., display 112) of the electronic device is wet and determines not to activate or to deactivate an underwater mode if a second threshold percentage of the surface area (e.g., 25%, 55%, etc.) of its display is not wet. In some embodiments, an electronic device determines to activate an underwater mode if a first threshold percentage of the surface area of its display (e.g., display 112) is wet for a first threshold period of time (e.g., one second, two seconds, 10 seconds, etc.) and determines not to activate or to deactivate an underwater mode if a second threshold percentage of the surface area of its display is not wet for a second threshold period of time. In one or more of the foregoing embodiments, the values of the first threshold percentage of the surface area and the second threshold percentage of the surface area are different, and the values of the first threshold period of time and the second threshold period of time are different. For example, device 100 determines to activate an underwater mode after determining that charging port 124 is wet and that more than 50% of display 112 is wet. Device 100, after determining to activate the underwater mode, determines to deactivate the underwater mode if it determines that charging port 124 is no longer wet and that at least 75% of display 112 has not been wet for more than five seconds. In one or more of the foregoing embodiments, device 100 automatically determines or adjusts the values of the first and the second thresholds. In one or more of the foregoing embodiments, the values of the first and second thresholds are adjustable by a user of device 100. Additional descriptions of criteria for determining whether to activate or deactivate an underwater mode for an electronic device are provided in the paragraphs below and are illustrated in at least FIGS. 6A-6V.

While underwater mode is activated, an electronic device (e.g., device 100, 300, or 500 or FIGS. 1A and 6A-6V, 3, or 5A, respectively) sometimes displays certain user interfaces (hereafter referred to as "underwater user interfaces") containing user interface elements of applications and modules (e.g., camera, flashlight, alarm, timer, as well as other applications and modules) that are accessible while the electronic device is wet or under water, as well as user interface elements of settings and functions (e.g., camera modes, camera flash, delay shutter, repeat alarm, flashlight intensity, as well as other settings and functions) of the applications and modules. In one or more embodiments, underwater user interfaces contain menus of user interface elements of applications and modules that are accessible to a user while the electronic device is under water. In one or more embodiments, underwater user interfaces have different appearances and features relative to corresponding non-underwater user interfaces, which are user interfaces that are displayed on the electronic device while the electronic device is not under water. For example, a user interface 5112 of FIG. 6A, which is displayed on display 112 while device 100 is not under water, has a different visual appearance relative to user interfaces 5113 and 5114 of FIGS. 6C and 6H, respectively, which are displayed while device 100 is under water.

In some embodiments, the user performs different user inputs to interact with corresponding content and user interfaces elements that are displayed in underwater user interfaces such as user interfaces 5113 and 5114 vs. non-underwater user interfaces that are displayed on the electronic device while the electronic device is not under water. For example, while device 100 is not under water, a user performs a tap gesture to access an application or a function of device 100 (e.g., camera application, timer application, alarm application, flashlight application, or another application or function), whereas while device 100 is under water, the user performs a deep press gesture (defined herein) to access the corresponding application or function of device 100. In one or more of such embodiments, while underwater mode is activated for device 100, device 100 treats a tap gesture as an accidental input, and, in response to detecting the tap gesture, maintains display of the existing user interface without performing operations associated with detecting the tap gesture if the tap gesture was detected while device 100 was not under water. Additional descriptions of underwater user interfaces, corresponding non-underwater user interfaces, and different user inputs performed by the user to interact with an electronic device while the electronic device is under water or not under water are illustrated in at least FIGS. 6A-6V.

Although some of the examples that follow will be given with reference to inputs on a touch-screen display (where the touch-sensitive surface and the display are combined) such as touch-sensitive display 112, in some embodiments, the device detects inputs on a touch-sensitive surface 451 that is separate from the display 450, as shown in FIG. 4B. In other embodiments, the processes described herein may be implemented with devices having physical user interfaces, voice interfaces, or other suitable interfaces. For convenience of explanation, the embodiments described below will be discussed with reference to operations performed on a device with a touch-sensitive display system 112. In such embodiments, a focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces discussed below, along with a focus selector.

FIG. 6A illustrates device 100 having display 112 while device 100 is not under water. In the illustrated embodiment, user interface 5112, which contains application affordances 5020-5040, is displayed on display 112 while device 100 is not under water. As stated herein, an application affordance is a user interface element that the user interacts with to access user interfaces of a corresponding application that runs on device 100. In the illustrated embodiment, camera affordance 5020 is an application affordance of a digital camera application and flashlight affordance 5021 is an application affordance of a flashlight application. The user optionally interacts with one of application affordances 5020-5040 to access user interfaces of a corresponding application. In the illustrated embodiment, device 100 also includes volume adjustment buttons 5012 and 5014 as well as push button 5016. In the illustrated embodiment, and while device 100 is not under water, a longer press of push button 5016 optionally turns power to device 100 on or off, and presses of volume adjustment buttons 5012 and 5014 optionally adjust volume output of device 100.

Figure 6B:
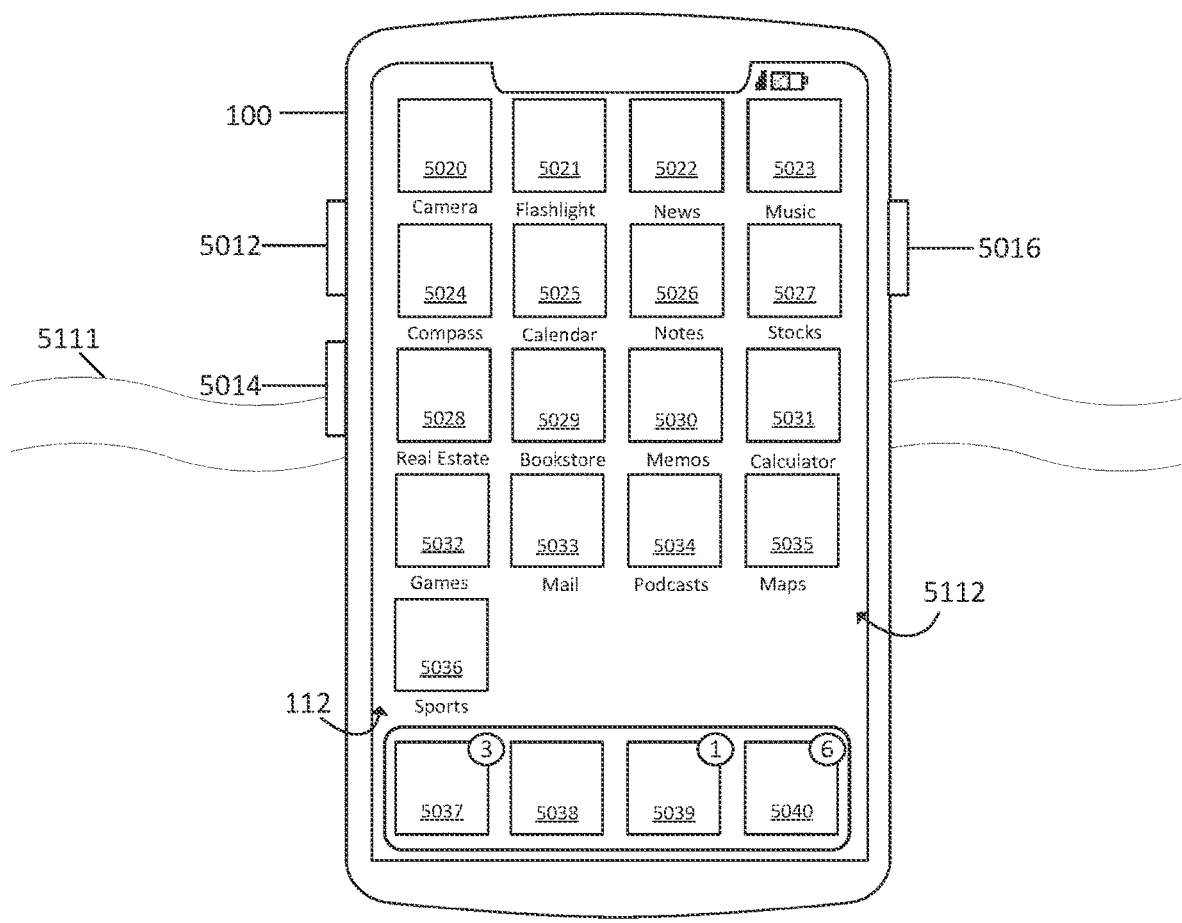

FIG. 6B illustrates device 100 of FIG. 6A after device 100 is partially submerged in water or another liquid. In the illustrated embodiments of FIGS. 6B-6V, waterline 5111 represents a level reached by water or another liquid relative to device 100. More particularly, portions of device 100 below waterline 5111 are submerged in water and are wet, whereas portions of device 100 above waterline 5111 are not submerged in water. As display 112 becomes wet, device 100 determines whether criteria (e.g., whether a threshold percentage of the surface area of display 112 is wet, whether charging port 124 is wet, etc.) for determining whether device 100 is under water are met. In the illustrated embodiment of FIG. 6B, although a portion of device 100 (e.g., approximately 50%) is submerged, device 100 determines that less than a threshold percentage of the surface area of display 112 is wet. Device 100 then concludes that it is not under water. As such, user interface 5112 remains displayed on display 112 even though a portion of device 100 is wet.

Figure 6C:
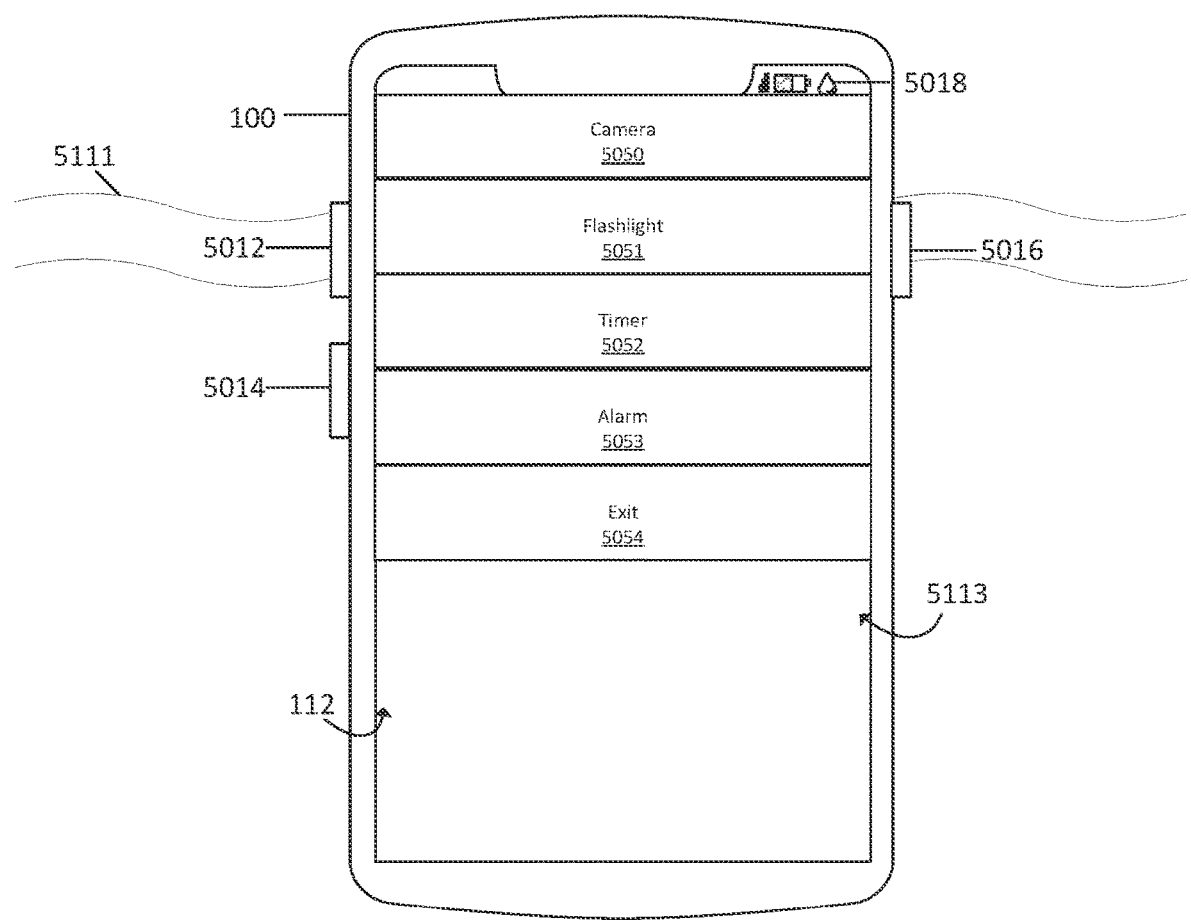

FIG. 6C illustrates device 100 of FIG. 6B after device 100 is further submerged in water. In the embodiment of FIG. 6C, device 100 is approximately 75% submerged in water, which satisfies the threshold percentage of the wet surface area of display 112 for determining that device 100 is under water. In some embodiments, device 100, after determining that a threshold percentage of the surface area of device 100 is wet, displays an underwater indicator, such as underwater indicator 5018 on display 112. As stated herein, an underwater indicator is a user interface element that provides a visual indication that device 100 is under water. Although FIG. 6C illustrates underwater indicator 5018 displayed in a status bar region of device 100, optionally, underwater indicator 5018 is displayed in another region of display 112. In some embodiments, the user optionally performs a gesture with contact over underwater indicator 5018 to manually confirm that device 100 is under water. In the depicted embodiment of FIG. 6C, device 100, after determining that it is under water, automatically removes the display of user interface 5112, and displays underwater user interface 5113 on display 112. In the illustrated embodiment, underwater user interface 5113 includes a menu of application affordances 5050-5053 of applications accessible to the user while device 100 is under water.

Underwater user interfaces, such as underwater user interface 5113 have different appearances and characteristics relative to the appearances and characteristics of non-underwater user interfaces. In one or more of such embodiments, user interface elements that are displayed in underwater user interfaces are arranged in a different order than corresponding non-underwater user interfaces. In one or more of such embodiments, underwater user interfaces have themes (e.g., background images that suggest that device 100 is under water) that are different from themes of non-underwater user interfaces. In one or more embodiments, the display size and shape of user interface elements (e.g., camera affordance 5050) when displayed in underwater user interfaces are different than the display size of corresponding user interface elements (e.g., camera affordance 5020) that are displayed in non-underwater user interfaces. In one or more embodiments, user interface elements of underwater user interfaces are displayed in menu formats, where the user optionally switches between different user interface elements by pressing one or more physical buttons, such as volume adjustment buttons 5012 and 5014.

In one or more embodiments, only user interface elements of applications and functions that are available while device 100 is under water are displayed in underwater user interfaces to help the user identify applications and functions that are available while device 100 is under water. For example, where a jukebox application is not available while device 100 is under water, a jukebox affordance associated with the jukebox application and user interface elements associated with different settings of the jukebox application are not displayed in underwater user interfaces. Similarly, where a telephone module is disabled while device 100 is under water, user interface elements associated with a telephone application and different settings and functions of the telephone module are not displayed in underwater user interfaces. In one or more embodiments, underwater user interfaces contain user interface elements of applications and functions that are not displayed on corresponding user interfaces while device 100 is not under water. For example, where underwater user interface 5113 and user interface 5112 are both wake screen user interfaces, which are interfaces that are displayed on device 100 after device 100 is accessed after a certain period of inactivity, underwater user interface 5113 includes timer affordance 5052, alarm affordance 5053, and exit affordance 5054. However, user interface 5112 as illustrated in FIG. 6A does not include a corresponding timer affordance, alarm affordance, or exit affordance. In one or more embodiments, underwater user interfaces include user interface elements of applications and functions that are useful to the user or that are more useful to the user while device 100 is under water. In one or more embodiments, the different appearances and characteristics of underwater user interfaces help the user to identify that device 100 is under water. In one or more embodiments, user interface elements are displayed in underwater user interfaces in a particular arrangement or format to assist the user to select the user interface elements while device 100 is under water. For example, the display size of camera affordance 5050 is larger relative to the display size of corresponding camera affordance 5020 of FIG. 6A to provide the user with a greater contact area to select camera affordance 5050 while device 100 is under water.

While device 100 is under water, the user performs certain user inputs to select application affordances 5050-5053 or an exit affordance 5054. In some embodiments, the user selects one of the application affordances (e.g., camera affordance 5050) by pressing a physical button, such as by pressing push button 5016. In some embodiments, the user switches between application affordances 5050-5053 and exit affordance 5054 by pressing a volume adjustment button 5012 or 5014. In some embodiments, the user selects any of the application affordances 5050-5053 or exit affordance 5054 by performing a deep press gesture. As referred to herein, a deep press gesture is a gesture performed with an intensity that is greater than or equal to a deep press intensity threshold. In one or more embodiments, while underwater mode is activated for device 100, device 100 does not respond to user inputs on display 112 that have intensities less than the deep press intensity threshold (e.g., tap or drag gestures that have less than the deep press intensity threshold) to avoid performing certain operations in response to accidental input while device 100 is under water. Additional descriptions of user inputs to interact with user interface elements displayed in underwater user interface 5113 of FIGS. 6C, 6G, 6P, 6Q, and underwater user interface 5114 of FIG. 6H are described in paragraphs below and are illustrated in at least FIGS. 6C, 6H, 6G, 6P, and 6Q.

In some embodiments, device 100, after determining that it is under water, adjusts certain settings and functions of device 100 to improve performance and battery life while under water. In one or more embodiments, device 100 automatically turns off certain modules and applications that are unlikely to be used while under water or unavailable while under water. For example, device 100, after determining that it is under water, automatically turns off acoustic, touch, and telephone modules, and closes music, podcast, and diary applications to conserve battery life. In one or more embodiments, device 100 automatically adjusts the functions of certain applications and modules while under water. For example, device 100, after determining it is under water, automatically turns off display 112, or reduces the period of inactivity to turn off display 112 to conserve battery life. Further, device 100 also adjusts certain default settings of applications and modules accessible to the user while device 100 is under water to improve performance while device 100 is under water. For example, device 100 automatically adjusts flash, shutter, zoom, as well as other camera settings while device 100 is under water to improve underwater photography.

In some embodiments, device 100, while under water, activates a lost phone mode, which after a threshold period of inactivity (e.g., after one minute, five minutes, or another threshold period of inactivity), causes device 100 to periodically emit a flash from device 100. In one or more of such embodiments, device 100 automatically activates the lost phone mode after device 100 determines that it is under water. In one or more embodiments, device 100 activates the lost phone mode after a threshold period (e.g., one minute, two minutes, five minutes, or another period) of inactivity. In one or more embodiments, device 100, while in lost phone mode, emits a pattern of light beams (e.g., a strobe pattern) that alternates one or more characteristics (e.g., intensity, color, frequency, or another characteristic) of the emitted light beams.

In some embodiments, device 100, while under water, or optionally, while lost phone mode is activated, receives communication (e.g., a text message, a phone call, etc.) transmitted by an electronic device (e.g., a second electronic device) of the user or a third party (e.g., a contact of the user, an emergency personnel, a nearby user, or another third party). In one or more of such embodiments, device 100, in response to receiving the communication, displays the communication on display 112. For example, device 100, in response to detecting a text message from the user's wife, overlays underwater user interface 5113 with a message bubble containing the text message from the user's wife. In one or more embodiments, device 100, in response to receiving the communication transmitted from a second electronic device, also determines a current position of device 100, and transmits signals indicative of the current position of device 100 to the second electronic device. For example, device 100, in response to detecting a request to initiate a phone call with the user's wife, overlays underwater user interface 5113 with a message bubble indicating that the user's wife is calling. Further, device 100 also transmits signals indicative of the current position of device 100 to the second electronic device together with a request to display the current position of device 100 on a display of the second electronic device. In one or more of such embodiments, device 100 also transmits an indication that device 100 is currently under water to the second electronic device.

In some embodiments, device 100, while under water, or optionally, while lost phone mode is activated, periodically transmits signals indicative of the current position of device 100. In some embodiments, device 100, while under water, or optionally, while lost phone mode is activated, also periodically determines the position of device 100 relative to the position of the second electronic device. In one or more embodiments, signals are automatically transmitted to electronic devices belonging to one or more contacts (e.g., family members, friends, or other contacts) of the user. In one or more embodiments, signals indicative of the current position of device 100, the relative position of device 100, and a request for aid, are automatically transmitted to electronic devices of emergency responders. In one or more embodiments, device 100 displays a request to transmit signals indicative of the current position of device 100 on display 112. Device 100, after receiving an input confirming the request or after not receiving any input for a threshold period of time, transmits signals indicative of the current position of device 100 to other electronic devices of contacts of the user, emergency personnel, or other third parties.

In some embodiments, device 100, while under water, or optionally, while lost phone mode is activated, also requests other electronic devices of one or more contacts to transmit a current location of the respective electronic devices. For example, where the user is diving with a diving instructor, device 100, periodically requests an electronic device (e.g., smartwatch) of the diving instructor to transmit a current location of the diving instructor. Device 100 optionally displays the current location of other electronic devices on display 112. Continuing with the foregoing example, device 100, where device 100 periodically requests the current location of the electronic device of the user's diving instructor, device 100 also displays the current location of the diving instructor's electronic device on display 112 to help the user track the location of the diving instructor.

Figure 6D:
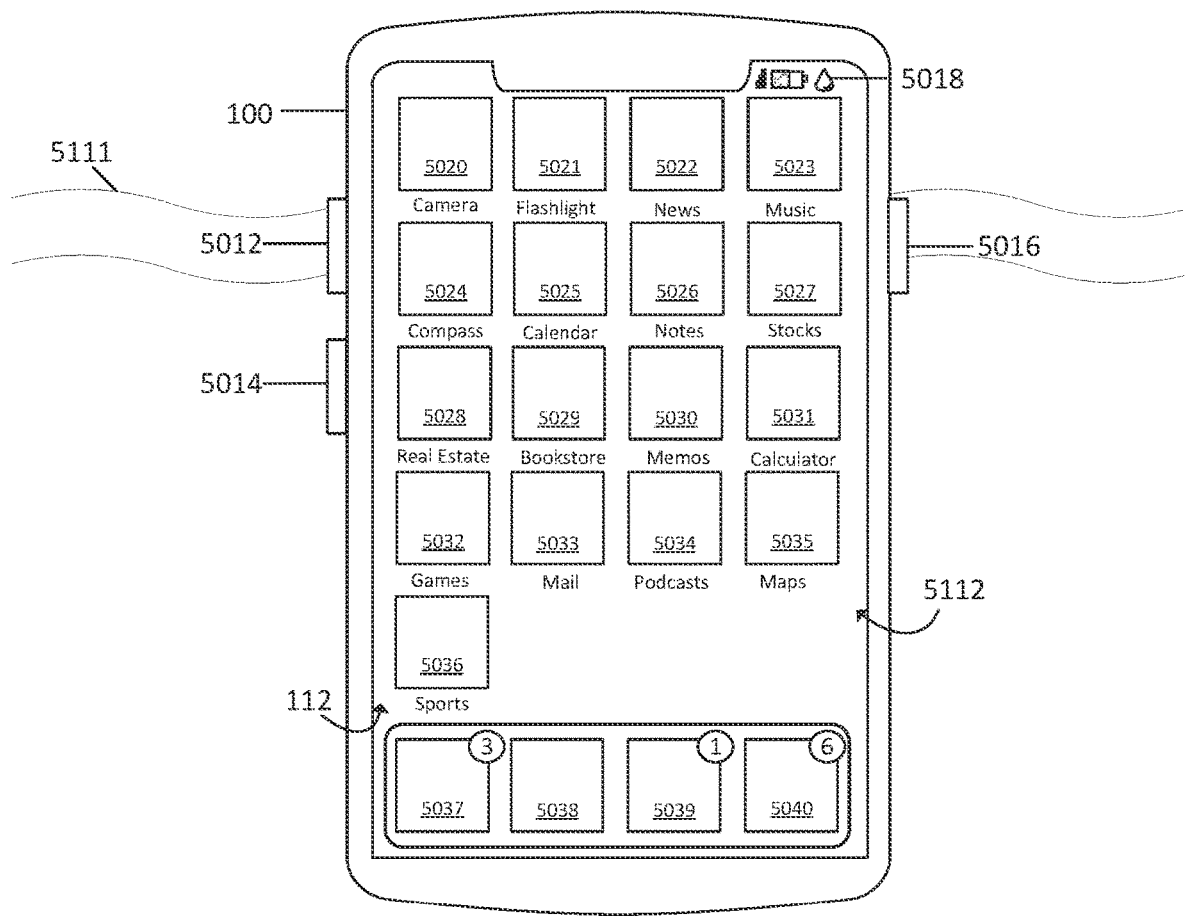

FIG. 6D illustrates an alternative embodiment of FIG. 6C, where user interface 5112 remains displayed in display 112 after device 100 is further submerged in water. In the illustrated embodiment of FIG. 6D, device 100 is approximately 75% submerged in water, which satisfies the criteria for determining that device 100 is under water. Underwater indicator 5018 is displayed in the status bar of device 100 to indicate that device 100 is under water. However, although device 100 has determined that it is under water, device 100 does not automatically display an underwater user interface, such as underwater user interface 5113 of FIG. 6C. In one or more embodiments, device 100, after determining that a threshold percentage of the surface area of display 112 is wet, requests the user to confirm that device 100 is under water. For example, device 100, after determining that the threshold percentage of the surface area of display 112 is wet, displays a message box with user interface elements that the user optionally selects to confirm or to deny that device 100 is under water. Device 100 then displays an underwater user interface after receiving the user's confirmation that the device is under water. In one or more of such embodiments, device 100 displays an underwater user interface after detecting certain user inputs to access an underwater user interface, such as after detecting a deep press gesture with contact over an application affordance (e.g., camera affordance 5020) that is associated with an application accessible while device 100 is under water.

Figure 6E:
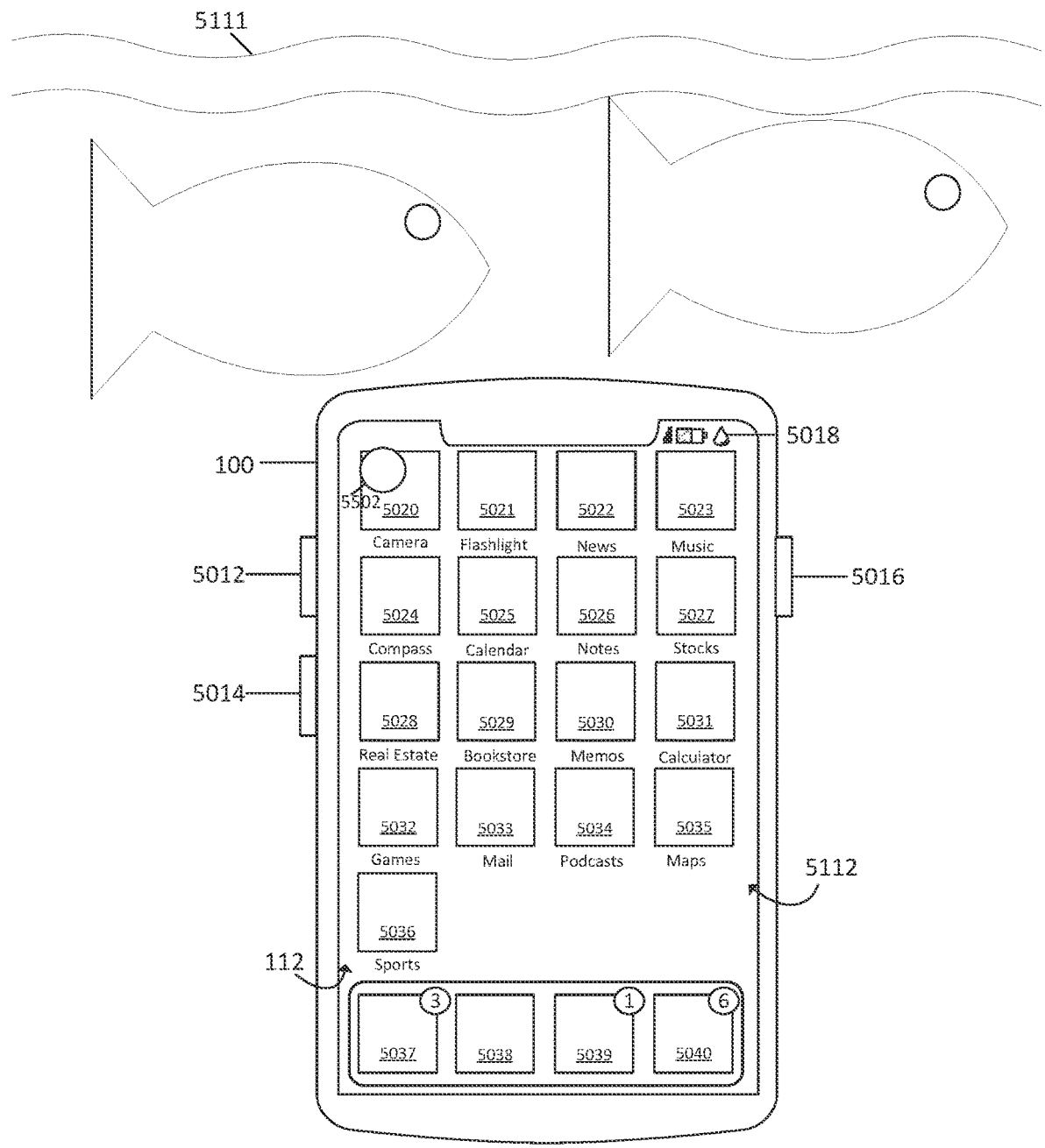
Figure 6F:
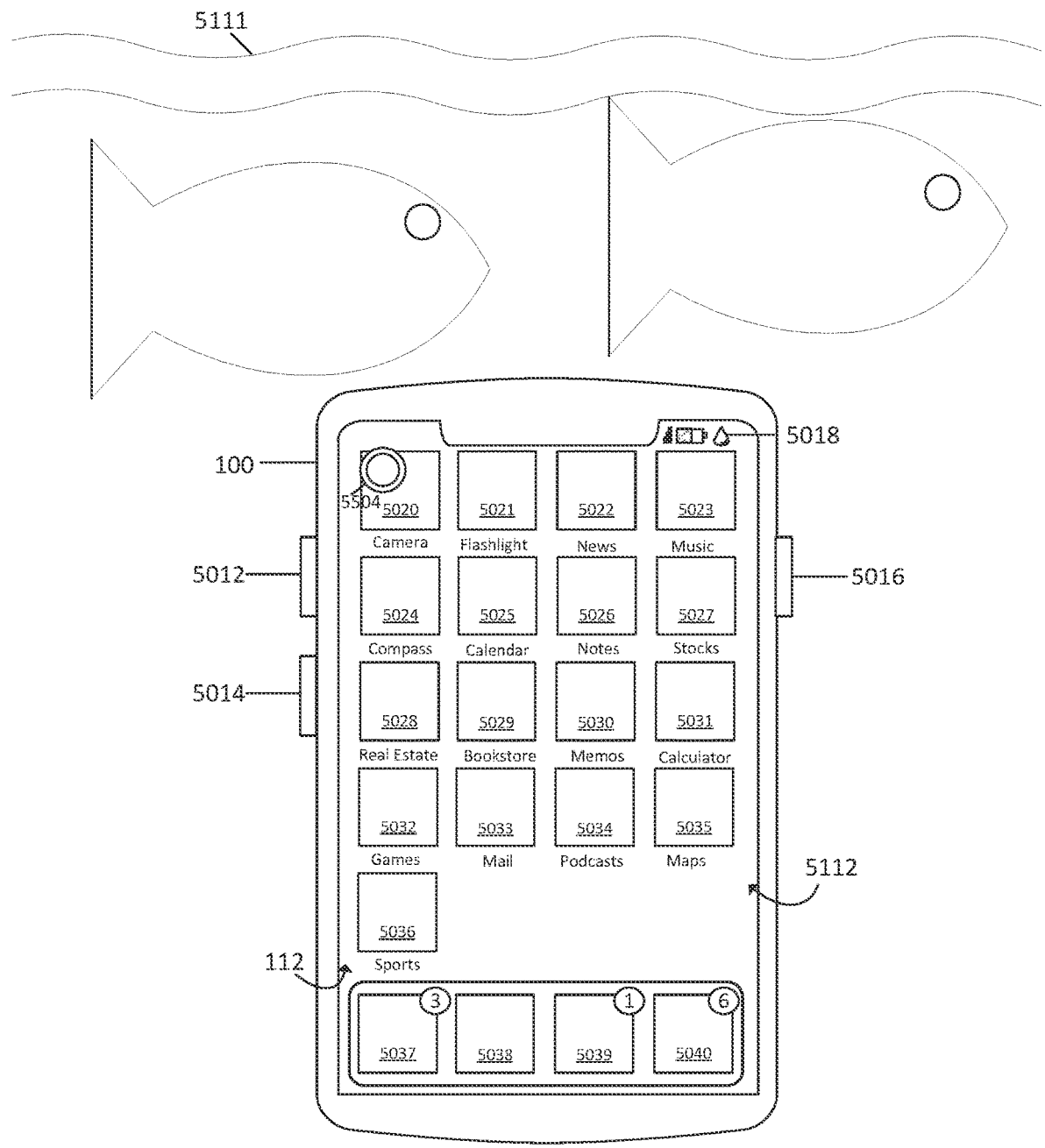

FIG. 6E illustrates device 100 of FIG. 6D after device 100 is completely submerged in water. Underwater indicator 5018 is displayed in the status bar of device 100 to indicate that device 100 is under water. Further, similar to FIG. 6D, although device 100 has determined that it is under water, device 100 does not automatically display an underwater user interface, such as underwater user interface 5113 of FIG. 6C. In the illustrated embodiment of FIG. 6E, device 100 maintains display of user interface 5112 after it is initially submerged under water. FIGS. 6E-6F illustrate detecting a tap gesture with contact 5502 over camera affordance 5020, where the intensity of the tap gesture is less than the deep press intensity threshold, and in response to detecting the tap gesture, maintaining display of user interface 5112 without accessing the camera application or displaying an underwater user interface. In the illustrated embodiment of FIGS. 6E-6F, user inputs with intensities that are less than the deep press intensity threshold are treated by device 100 as accidental input while device 100 is under water, and do not cause device 100 to perform any operation in response to detecting such inputs. As such, device 100, in response to detecting the tap gesture illustrated in FIG. 6E, or any other gestures with contact intensities less than the deep press intensity threshold, maintains display of user interface 5112 without performing any operations associated with the performed gesture if the performed gesture was detected while device 100 is not under water.

Figure 6G:
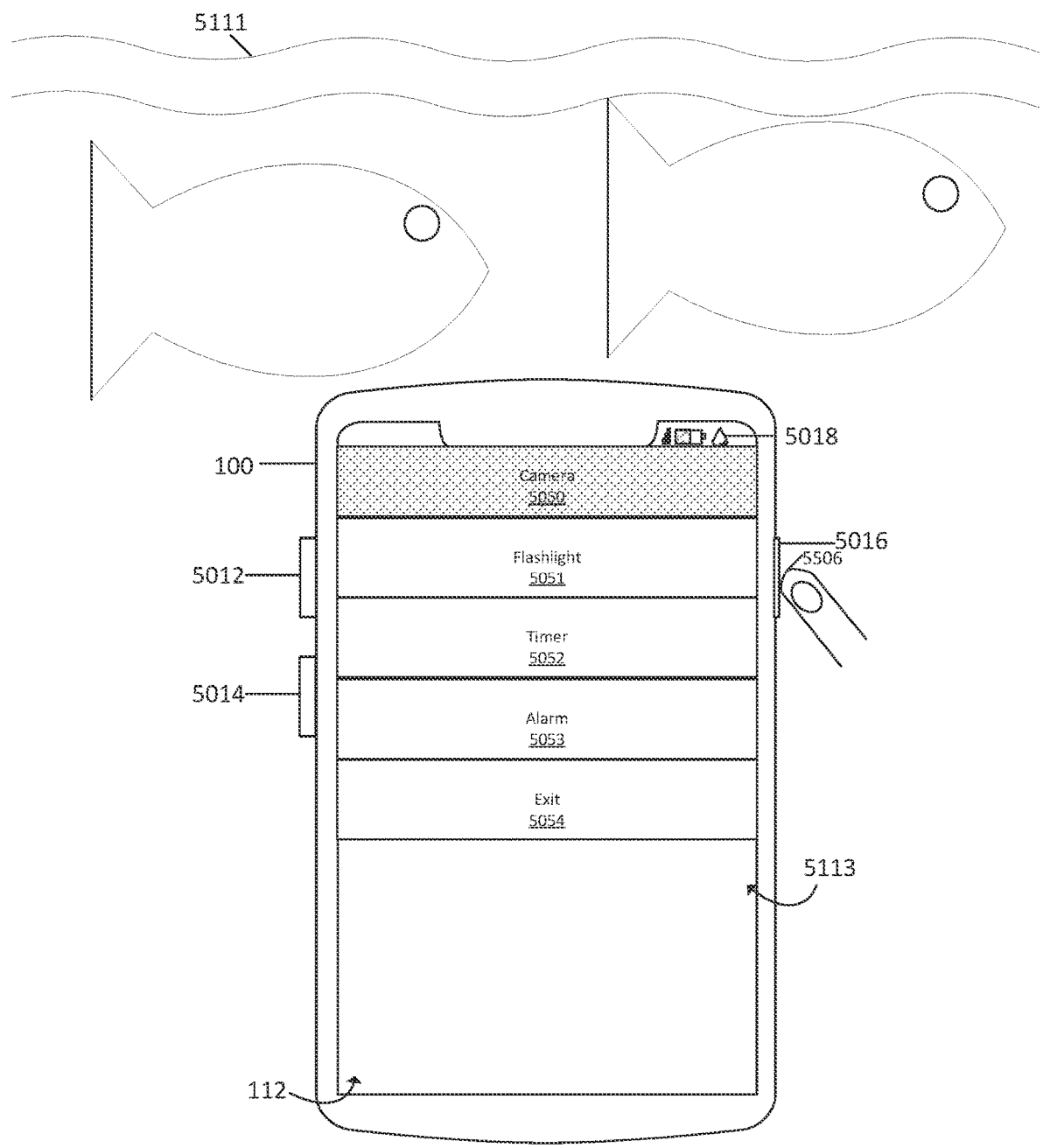
Figure 6H:
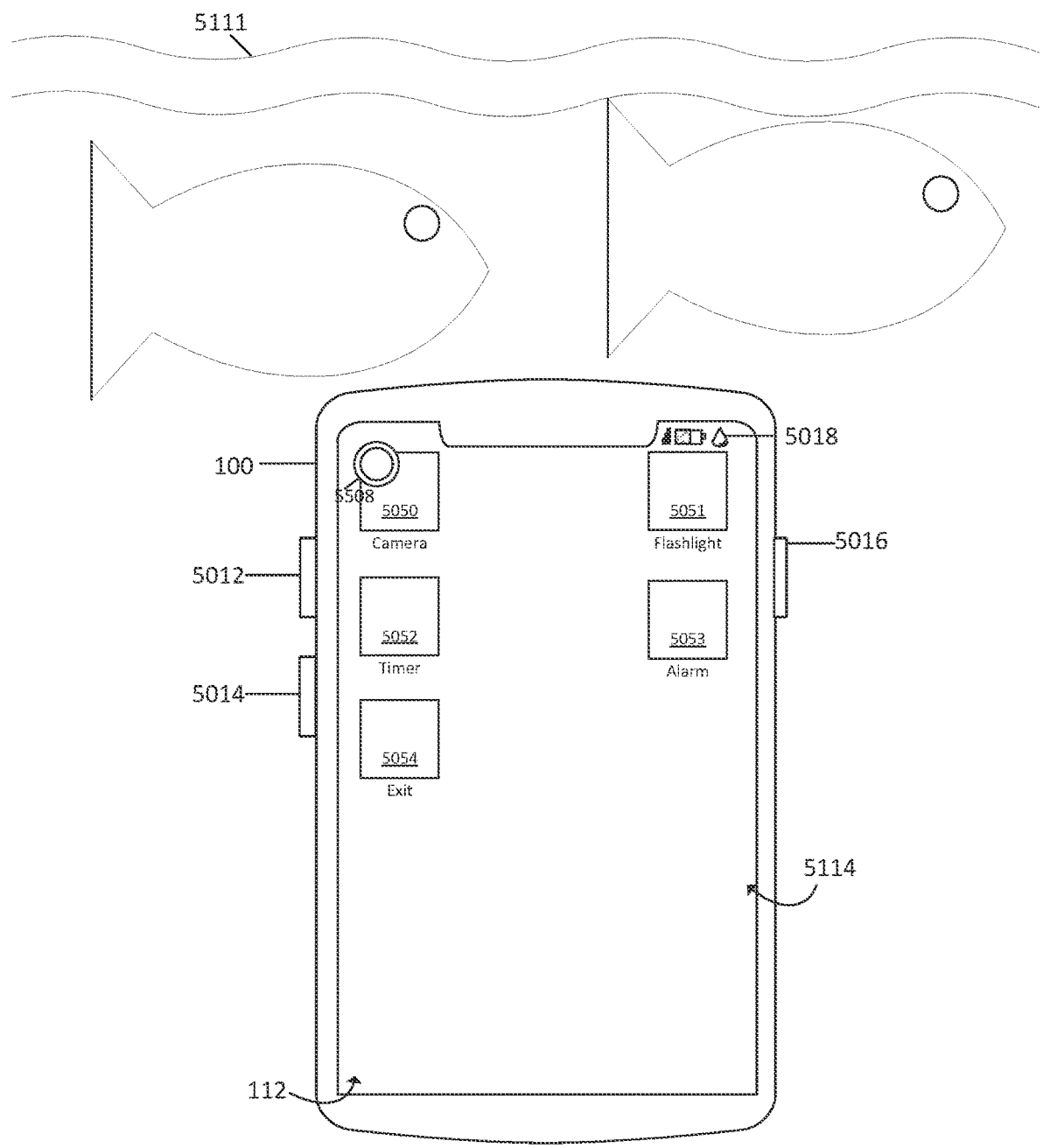

FIGS. 6F-6G illustrate detecting a deep press gesture with contact 5504 over camera affordance 5020, where the intensity of the deep press gesture is greater than or equal to the deep press intensity threshold, and in response to detecting the deep press gesture, displaying underwater user interface 5113 on display 112. In the illustrated embodiment of FIG. 6G, camera affordance 5050 is highlighted to indicate focus on camera affordance 5050. While underwater user interface 5113 is displayed on display 112, the user optionally switches between application affordances 5050-5053 by pressing volume adjustment buttons 5012 and 5014. Device 100, in response to detecting a press of a volume adjustment button 5012 or 5014, moves focus to a different application affordance 5051-5053, or to exit affordance 5054. For example, where the user optionally presses volume adjustment button 5014 while focus is on camera affordance 5050, device 100, in response to detecting the press of volume adjustment button 5014, sets focus on flashlight affordance 5051. Continuing with the foregoing example, where the user optionally presses push button 5016 while focus is on flashlight affordance 5051, device 100, in response to detecting the press of push button 5016, accesses the flashlight application of device 100 and displays an underwater flashlight user interface on display 112. Alternatively, where the user optionally presses volume adjustment button 5014 while focus is on flashlight affordance 5051, device 100, in response to detecting the press of volume adjustment button 5014, moves focus to timer application 5052. Continuing with the foregoing example, where the user optionally presses push button 5016 while focus is on timer affordance 5052, device 100, in response to detecting press of push button 5016, accesses the timer application of device 100 and displays an underwater timer user interface on display 112.

In some embodiments, the user optionally selects an application affordance by performing a deep press gesture with contact over the application affordance. In some embodiments, where the user optionally presses a volume adjustment button (e.g., volume adjustment button 5014) and holds the volume adjustment button for more than a threshold period of time (e.g., one second, two seconds, etc.), device 100, in response to detecting the press and hold of the volume adjustment button in a depressed state, toggles between application affordances 5050-5053 and exit affordance 5054. For example, where the user optionally presses and holds volume adjustment button 5014, device 100, in response to detecting the press and hold of volume adjustment button 5014, sets focus on a different affordance for each one second increment (or another threshold increment) the user holds volume adjustment button 5014. For example, device 100, after detecting an initial press of volume adjustment button 5014 while focus is on camera affordance 5050, moves focus to flashlight affordance 5051. Further, device 100, after detecting the volume adjustment button 5014 is in the depressed state for one second after the user pressed volume adjustment button 5014, moves focus to timer affordance 5052. Further, device 100, after detecting that the volume adjustment button 5014 is in the depressed state for two seconds after the user pressed volume adjustment button 5014, moves focus to alarm affordance 5053. Device 100 continues to move focus to different affordances 5050-5054 until device 100 detects that volume adjustment button 5014 is no longer in the depressed state. The user optionally presses push button 5016 or performs a deep press gesture with contact over the selected application affordance to access an application associated with the selected application affordance.

In the embodiment of FIG. 6G, a list of application affordances 5050-5053 and exit affordance 5054 is displayed in underwater user interface 5113. In some embodiments, the underwater user interface has a different appearance than the appearance of underwater user interface 5113. In that regard, FIGS. 6F and 6H illustrate detecting the deep press gesture with contact 5504 over camera affordance 5020, and in response to detecting the deep press gesture, displaying underwater user interface 5114 on display 112. In the illustrated embodiment of FIG. 6H, icons of application affordances 5050-5053 and exit affordance 5054 are displayed in underwater user interface 5114. The user optionally performs a deep press gesture with contact over any of application affordances 5050-5053 or exit affordance 5054 to access a corresponding application or to exit underwater user interface 5114. Underwater user interfaces 5113 and 5114 of FIGS. 6G and 6H, respectively, each represents an exemplary embodiment of an underwater user interface that has a different appearance than non-underwater user interfaces, such as user interface 5112 of FIG. 6A. In one or more embodiments, device 100, in response to detecting the deep press gesture with contact 5504 as illustrated in FIG. 6F, displays a different underwater user interface having a different appearance than the appearances of underwater user interfaces 5113 and 5114.

Figure 6I:
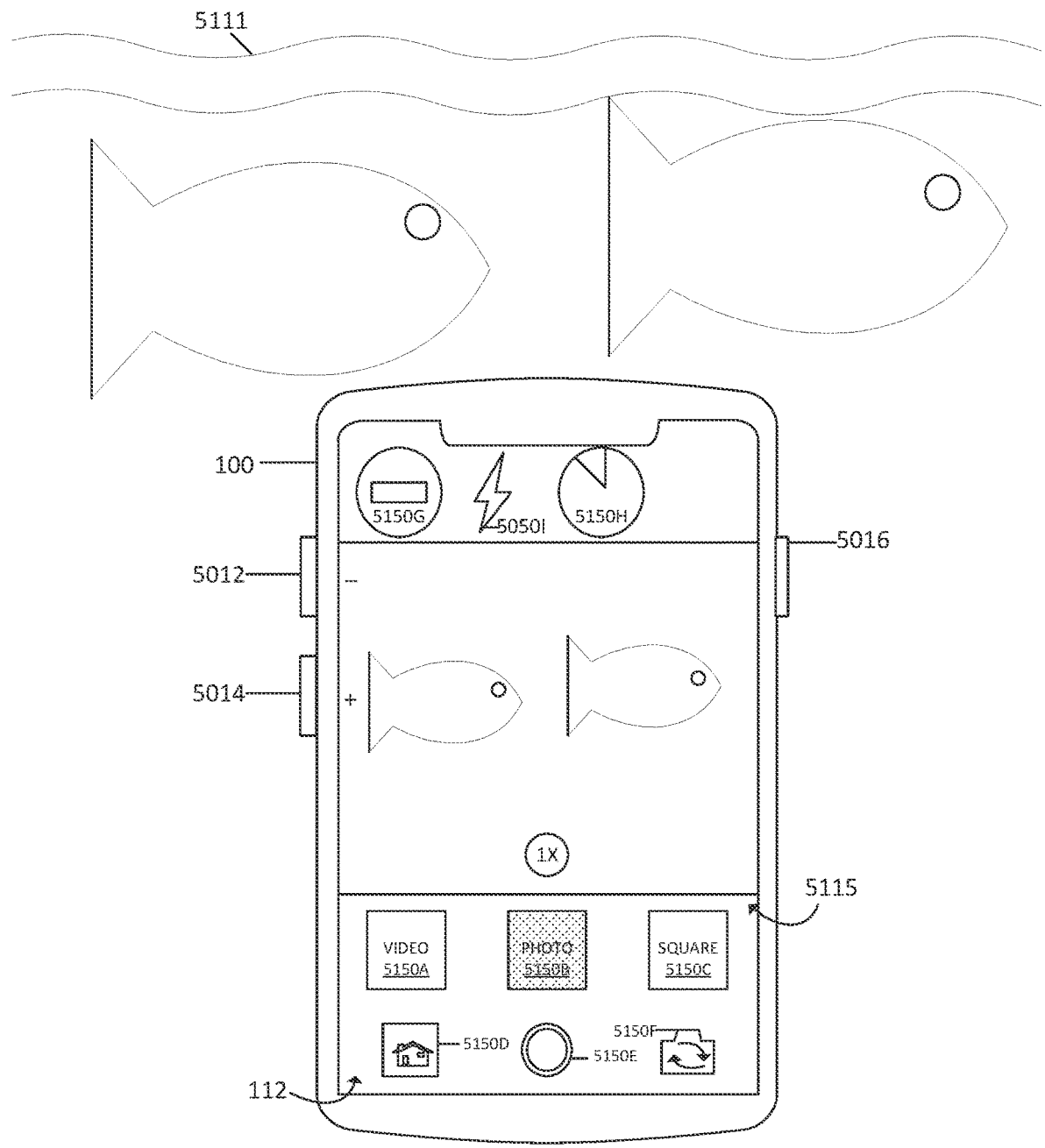

FIGS. 6G and 6I illustrate, while underwater user interface 5113 is displayed on device 100, detecting a press of push button 5016 with contact 5506 on push button 5016, and in response to detecting the press of push button 5016, displaying an underwater camera user interface 5115. Similarly, FIGS. 6H-6I illustrate detecting, while underwater user interface 5114 is displayed on device 100, a deep press gesture with contact 5508 over camera affordance 5050, and in response to detecting the deep press gesture, displaying underwater camera user interface 5115. As stated herein, an underwater camera user interface is a camera user interface that is displayed while device 100 is under water. Further, while an underwater camera user interface such as underwater camera user interface 5115 is displayed on display 112, the user performs certain inputs (such as by pressing physical buttons 5012, 5014 and 5016, or by performing deep press gestures) to access different camera features and settings. In the illustrated embodiment of FIG. 6I, three mode affordances 5150A-5150C (video mode affordance, photo mode affordance, and square mode affordance, respectively) are displayed in underwater camera user interface 5115. In the illustrated embodiment, focus is on photo mode affordance 5150B to indicate the current camera mode (photo mode) of device 100. The user optionally performs a deep press gesture with contact over a different mode to change the camera mode. For example, device 100, in response to detecting a deep press gesture with contact over video mode affordance 5150A, switches from photo mode to video mode. In one or more embodiments, device 100, in response to detecting a deep press gesture with contact over a different mode affordance (e.g., video mode affordance 5150A), also displays another underwater user interface (e.g., underwater video user interface) that is associated with the selected camera mode (e.g., video mode).

In some embodiments, where a non-underwater camera user interface is displayed on display 112, the user optionally scrolls through different mode affordances such as mode affordances 5150A-5150C by performing a swipe gesture with contact from one mode affordance to another mode affordance. For example, where a non-underwater camera user interface also contains mode affordances 5150A-5150C of FIG. 6I, the user optionally performs a slide or drag gesture with contact from a region of display 112 over photo mode affordance 5150B to another region of display 112 over video mode affordance 5150A. Device 100, in response to detecting the slide or drag gesture, switches from photo mode to video mode. However, in the embodiment of FIG. 6I, device 100, while under water, treats slide and drag gestures as accidental input from the user, and in response to detecting a slide or a drag gesture, such as the previously described gesture with contact from a region of display 112 over photo mode affordance 5150B to another region of display 112 over video mode affordance 5150A, maintains display of underwater camera user interface 5115 and maintains the current camera mode (photo mode).

In the illustrated embodiment of FIG. 6I, a preview affordance 5150D, which contains a preview of a previously taken image, a take photo affordance 5150E, which is an affordance the user interacts with to take a photo, and a switch camera affordance 5150F, which is an affordance the user interfaces with to switch between different cameras (e.g., front facing camera and rear facing camera) of device 100, are also displayed in underwater camera user interface 5115. Further, an exit affordance 5150G, which is an affordance the user interacts with to exit underwater camera user interface 5115, a flash affordance 5150I, which is an affordance the user interacts with to select flash settings, and a timer affordance 5150H, which is an affordance the user interacts with to delay the camera shutter, are also displayed in underwater camera user interface 5115. In the illustrated embodiment, the user optionally performs a deep press gesture with contact over any of affordances 5150A-5150I, and device 100, in response to detecting the deep press gesture with contact over a respective affordance, performs a corresponding function associated with the selected affordance. For example, while a rear facing camera of device 100 is activated, the user optionally performs a deep press gesture with contact over switch camera affordance 5150F to activate a front facing camera of device 100. The user then optionally performs a deep press gesture with contact over take photo affordance 5150E to take a photo captured by the front facing camera. However, device 100, while under water, ignores gestures with intensities that are less than the deep press intensity threshold. For example, if device 100, after detecting a tap gesture with contact over preview affordance 5150D, determines that the intensity of the tap gesture is not greater than or equal to the deep press intensity threshold, device 100 then maintains display of underwater camera user interface 5115 as illustrated in FIG. 6I without displaying the previously taken photo (photo of a house) on display 112.

Figure 6J:
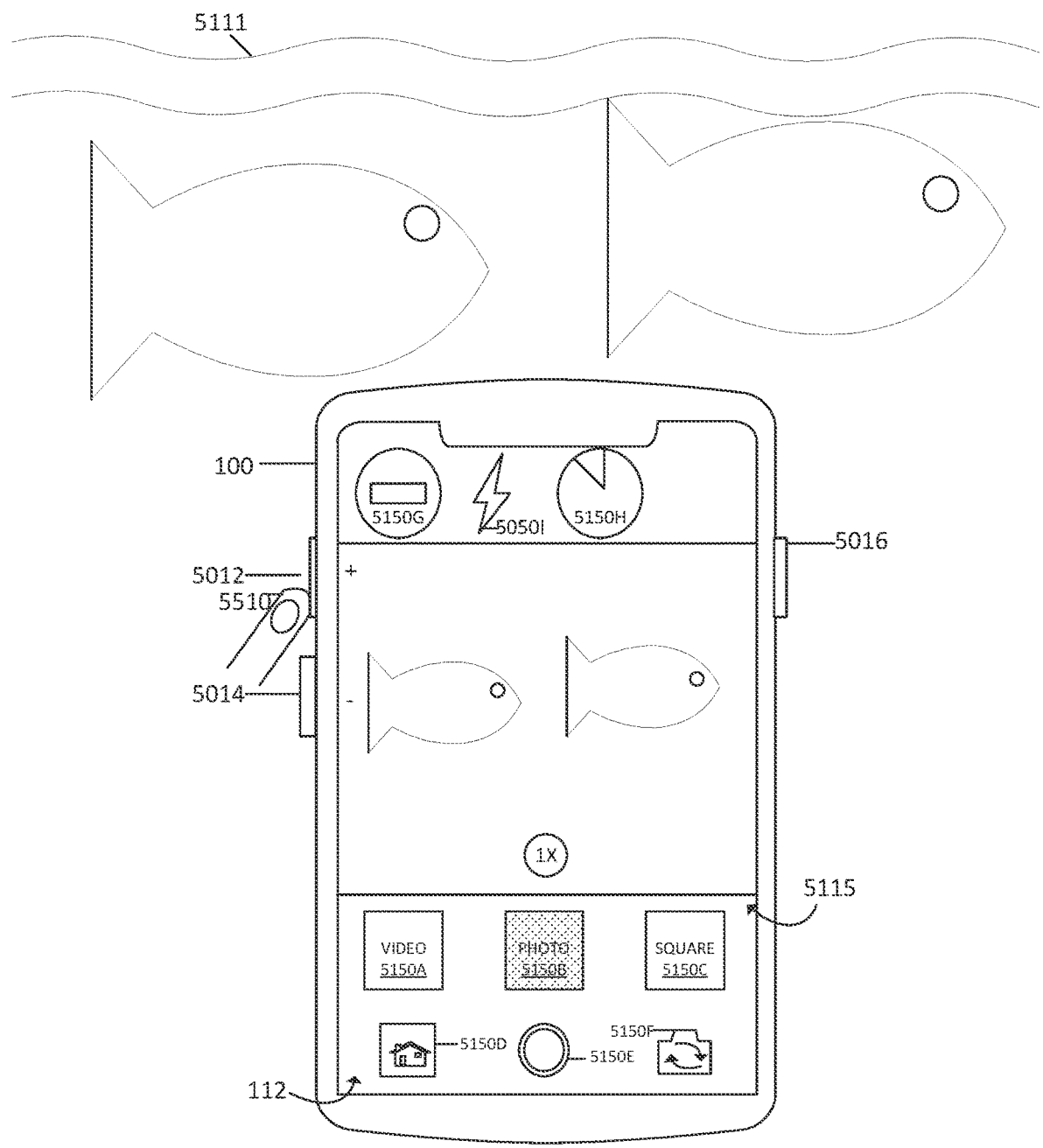
Figure 6K:
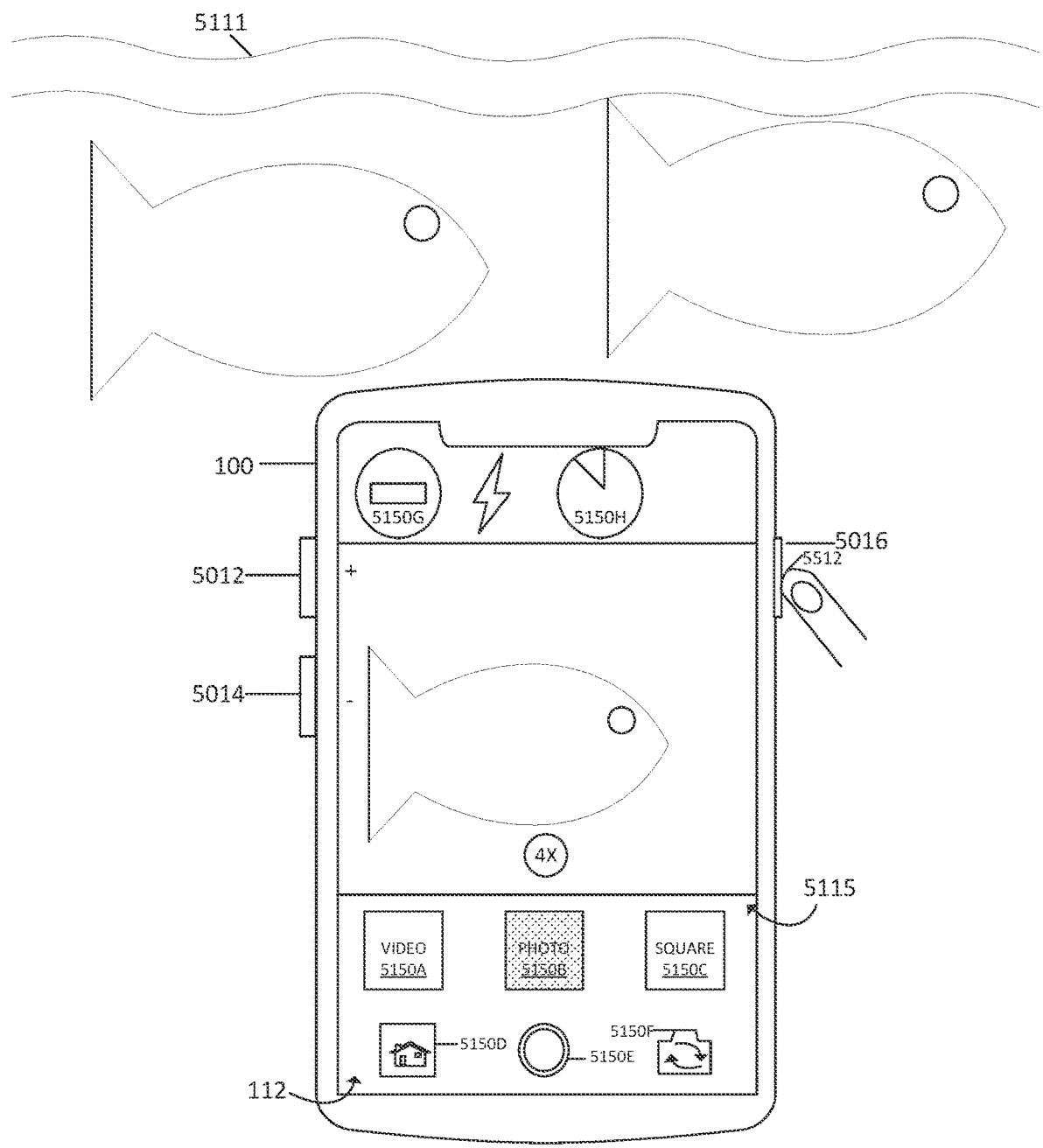

In the embodiment of FIG. 6I, the user optionally presses volume adjustment buttons 5012 and 5014, or push button 5016 to initiate different camera functions of device 100. In that regard, FIGS. 6J-6K illustrate detecting a press of volume adjustment button 5012 with contact 5510 on volume adjustment button 5012, and in response to detecting the press of volume adjustment button 5012, increasing a zoom level of the camera from 1× zoom to 4× zoom.

Figure 6L:
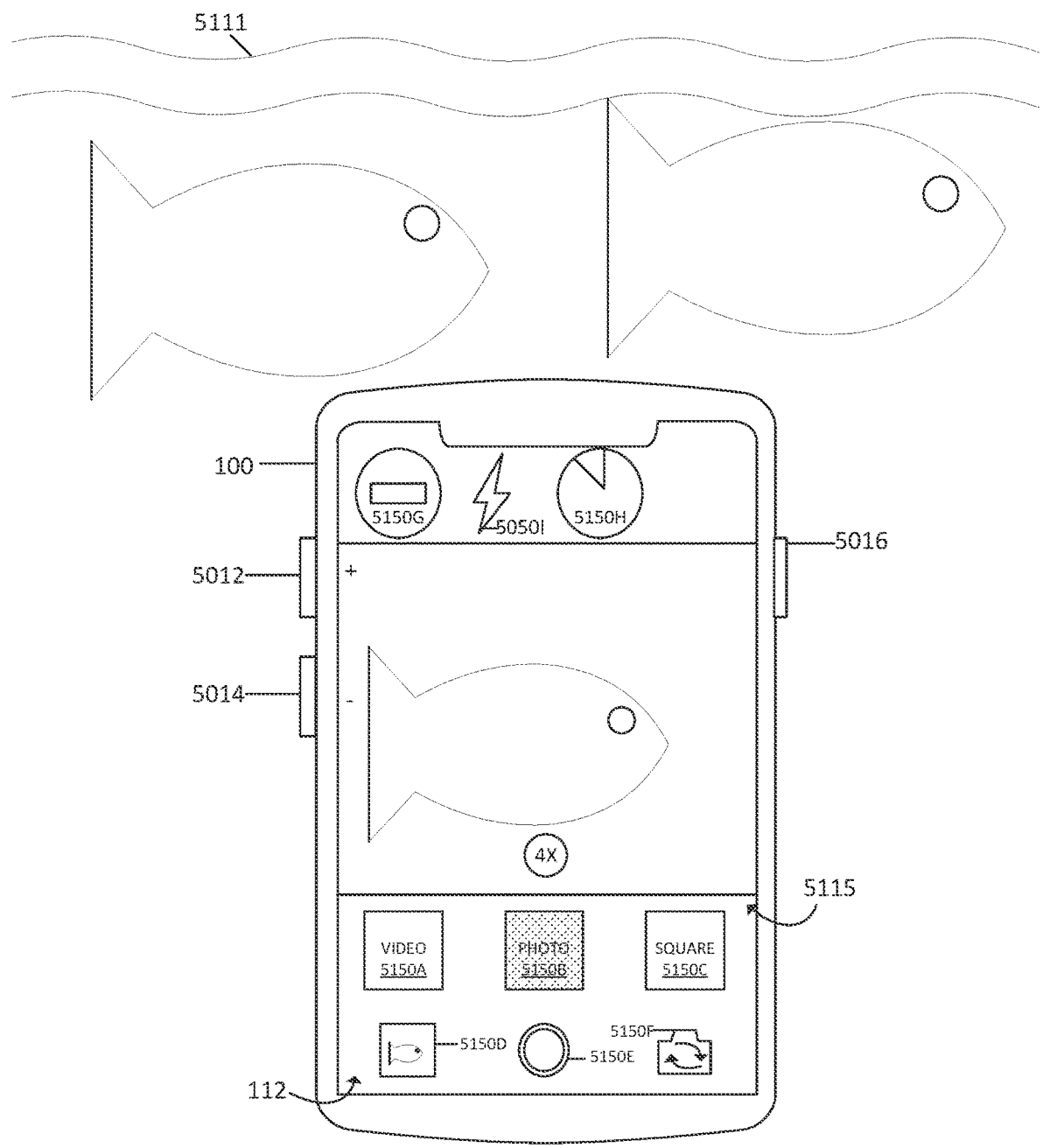

In some embodiments, where a non-underwater camera user interface is displayed on display 112 while device 100 is not under water, the user optionally performs a pinch gesture to adjust the current zoom level of the camera. For example, device 100, in response to detecting a pinch gesture with contact over a region of display 112 while device 100 is not under water, adjusts the zoom level of the camera based on the magnitude of the pinch gesture. Further, where a non-underwater camera user interface is displayed on display 112 while device 100 is not under water, pressing the volume adjustment buttons does not cause device 100 to adjust the zoom level of the camera. As such, device 100, in response to detecting a press of volume adjustment button 5012 or 5014 while a non-underwater camera user interface is displayed on device 112, maintains display of the camera user interface without adjusting the zoom level of the camera. However, in the embodiment of FIG. 6K, where device 100 is under water, device 100 treats pinch gestures as accidental input from the user, and in response to detecting a pinch gesture, maintains display of underwater camera user interface 5115, and maintains the current zoom level of the camera. In the illustrated embodiment, the user optionally presses volume adjustment button 5012 again (or holds volume adjustment button 5012 after pressing volume adjustment button 5012) to further increase the zoom level of the camera. The user optionally presses volume adjustment button 5014 to decrease the zoom level of the camera, such as from 4× zoom to 2× zoom. The user optionally presses push button 5016 to take a photo at 4× zoom. In that regard, FIGS. 6K-6L illustrate detecting a press of push button 5016 with contact 5512 on push button 5016, and in response to detecting the press gesture, taking a photo with the rear facing camera of device 100. Further, in the illustrated embodiment of FIG. 6L, preview affordance 5150D has been updated to illustrate a photo of the most recently taken photo (photo of fish taken by rear facing camera at 4× zoom).

Figure 6M:
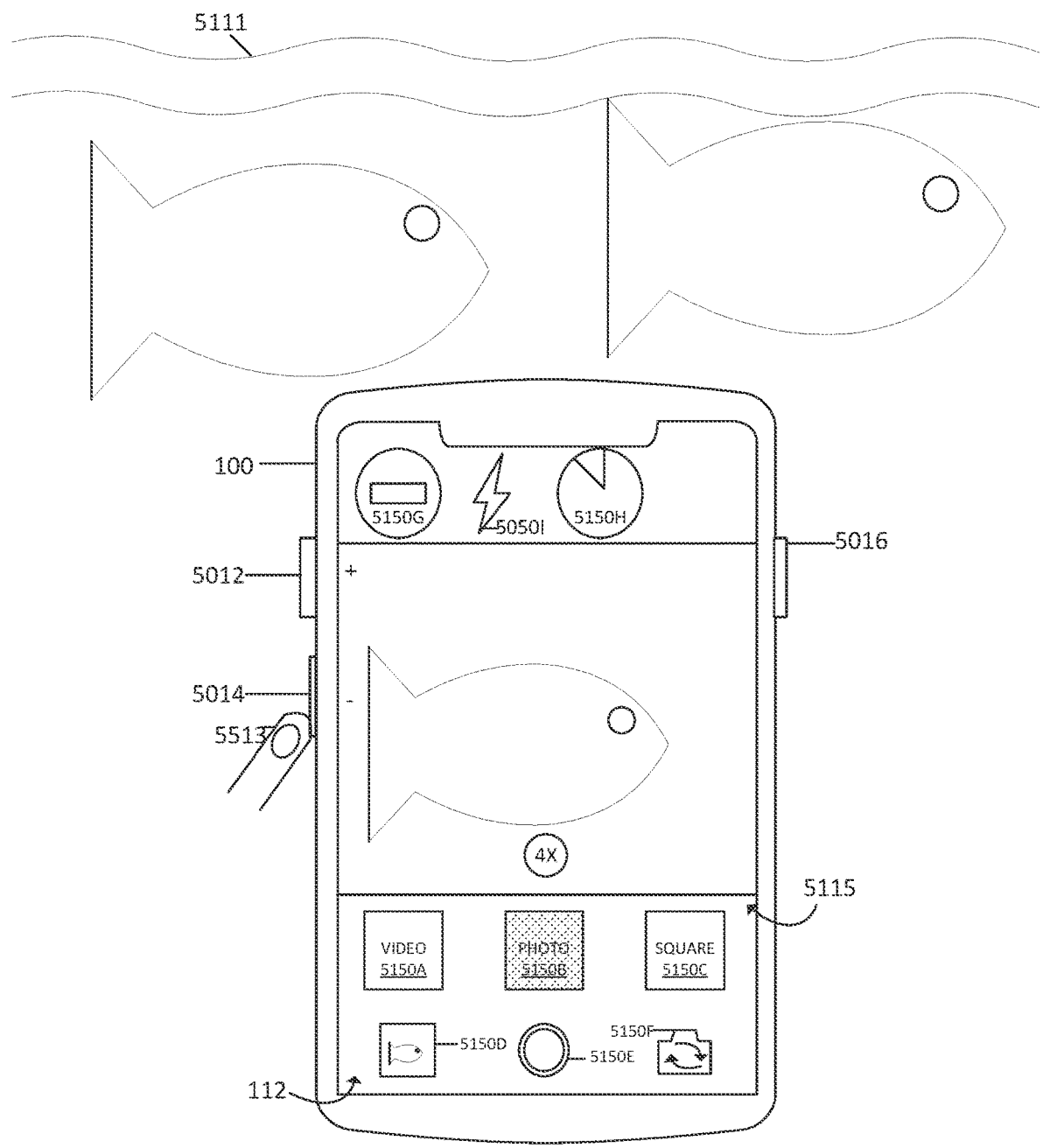
Figure 6N:
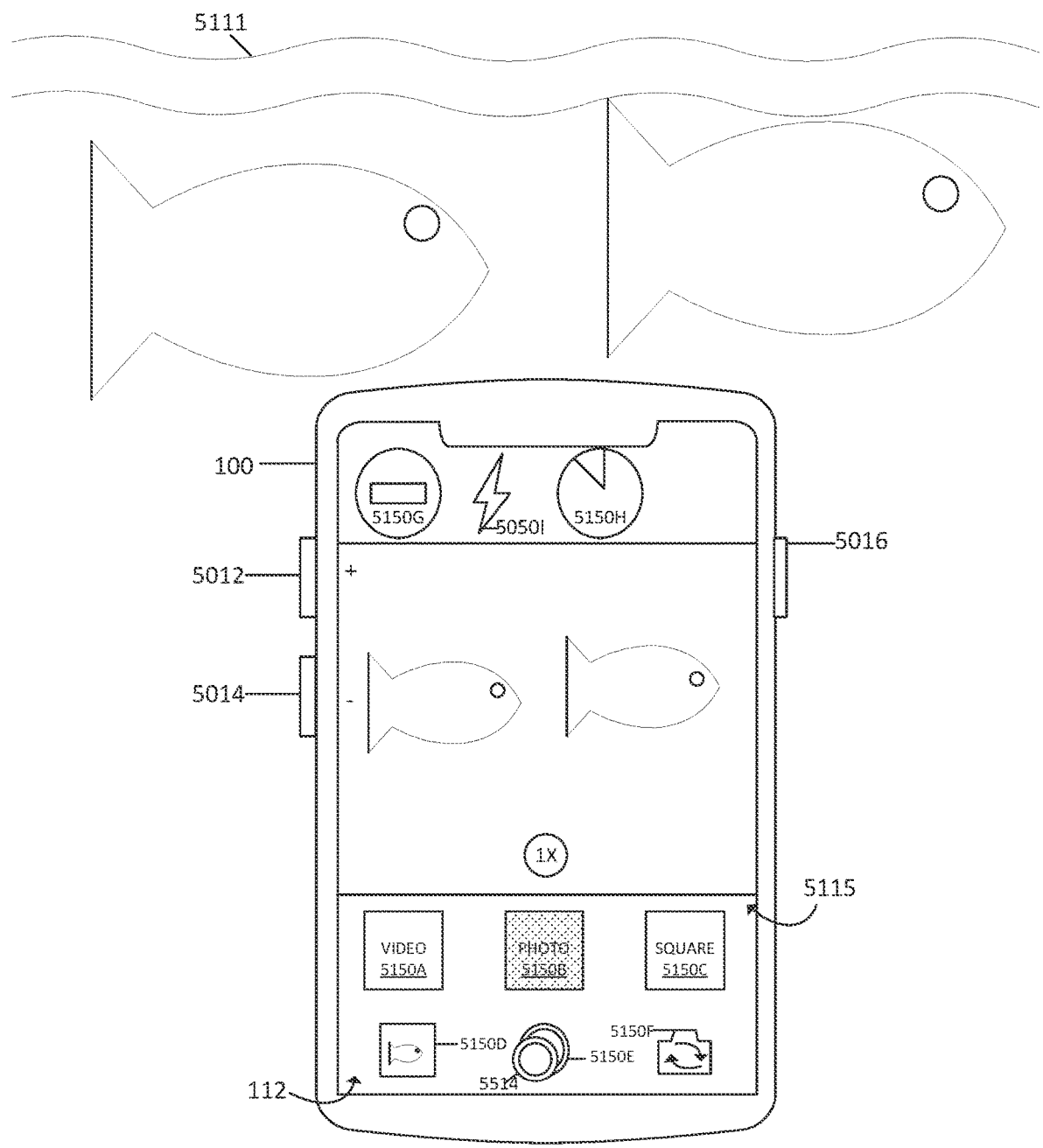
Figure 6O:
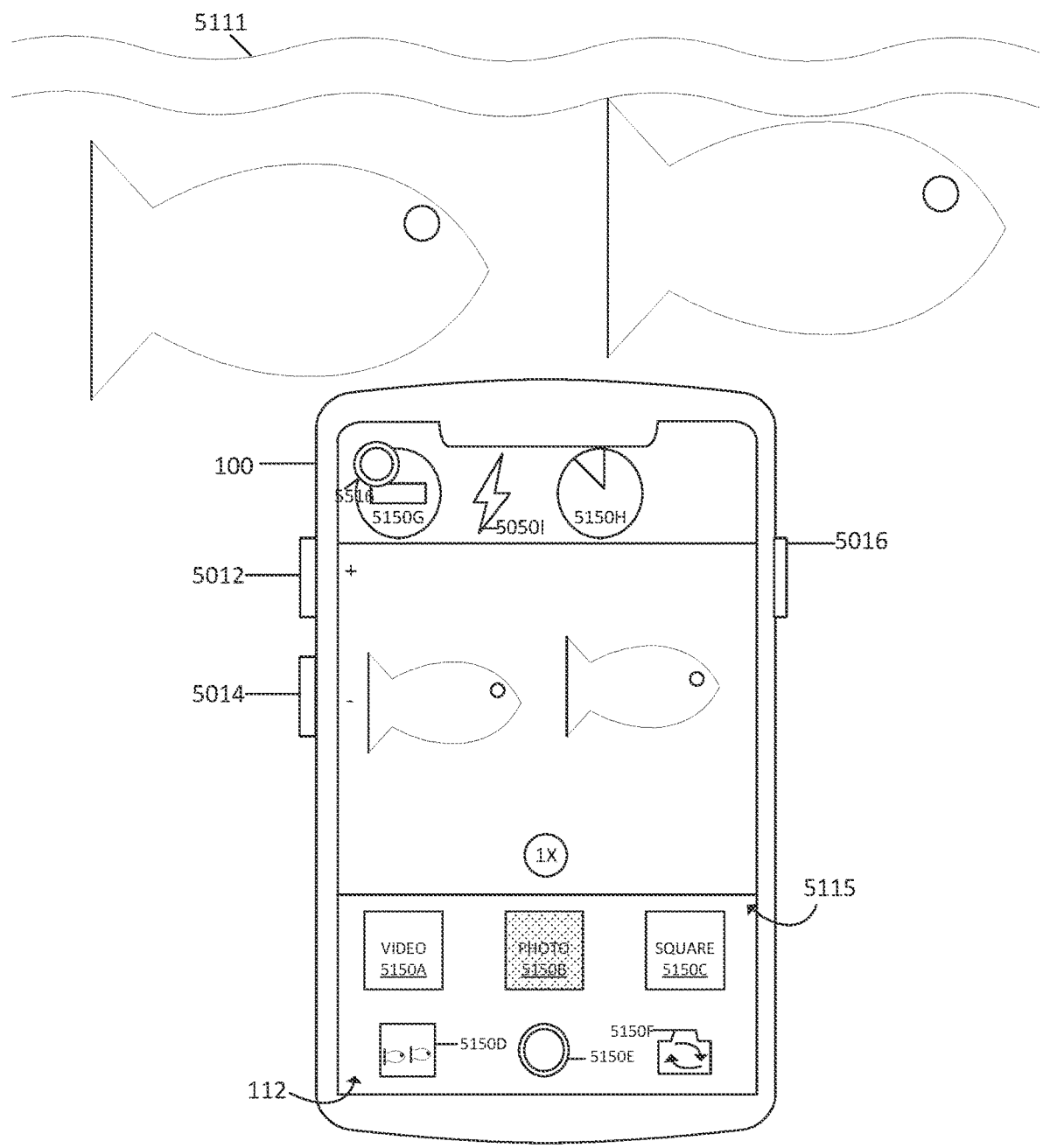

The user optionally presses physical buttons 5012, 5014, or 5016, or performs deep press gestures over affordances 5150A-5150C and 5150E-5150H to take additional photos or to adjust one or more camera settings of device 100. In that regard, FIGS. 6M-6N illustrate detecting a press of volume adjustment button 5014 with contact 5513 on volume adjustment button 5014, and in response to detecting the press of volume adjustment button 5014, reducing the zoom level of the camera from 4× zoom to 1× zoom. Further, FIGS. 6N-6O illustrate detecting a deep press gesture with contact over take photo affordance 5150E, and in response to detecting the deep press gesture, taking a photo with the rear facing camera of device 100 at 1× zoom level. Further, in the illustrated embodiment of FIG. 6O, preview affordance 5150D has been updated to illustrate a photo of the most recently taken photo (photo of two fish taken by the rear facing camera of device 100 at 1× zoom). The user optionally performs additional deep press gestures or presses of physical buttons 5012, 5014, and 5016 to adjust one or more camera settings and modes, and to take additional photos or videos of the user's surroundings.

Figure 6P:
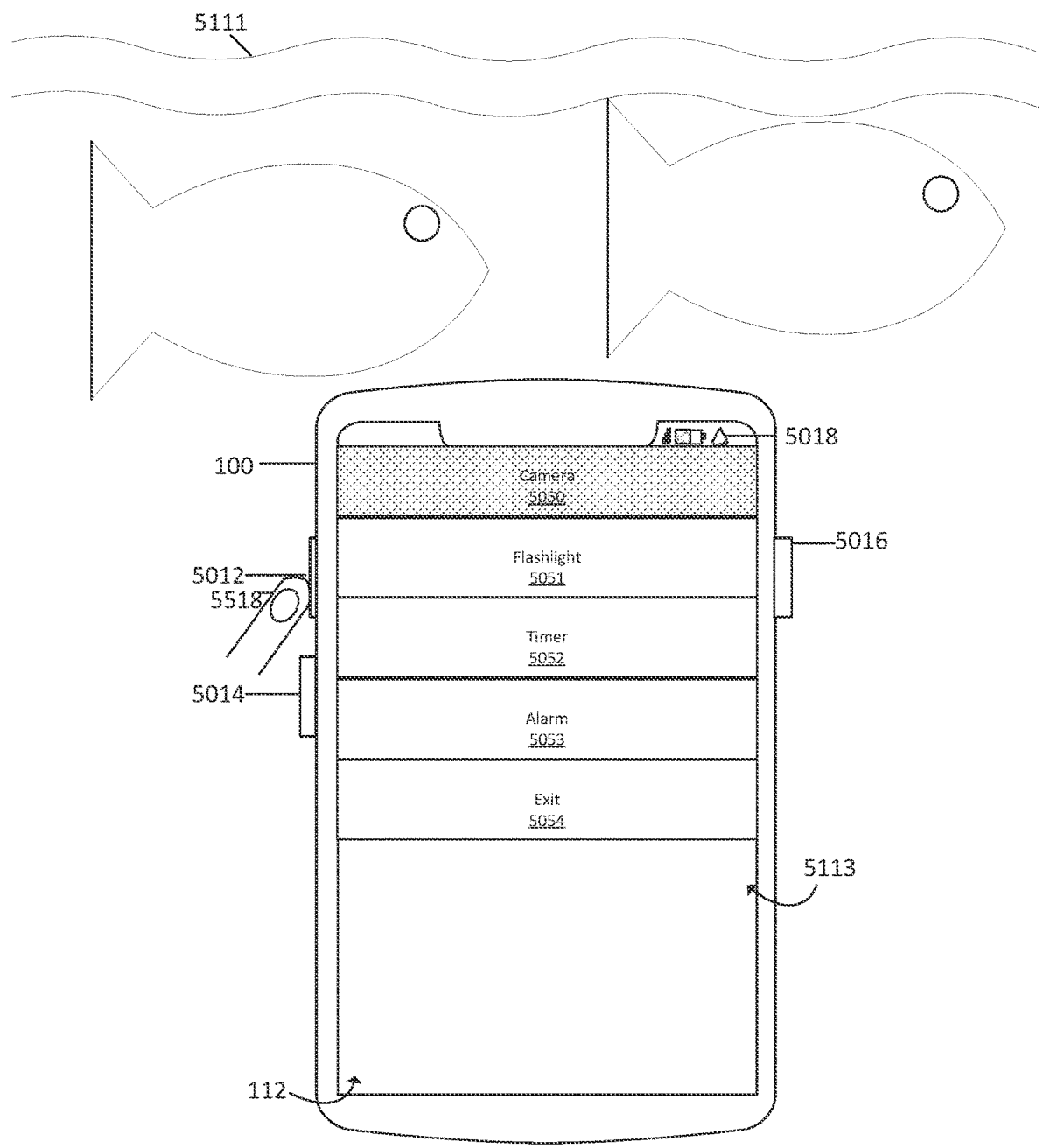

FIGS. 6O-6P illustrate detecting a deep press gesture with contact 5516 over exit affordance 5150G, and in response to detecting the deep press gesture, removing display of underwater camera user interface 5115, and re-displaying underwater user interface 5113. Although FIG. 6P illustrates displaying underwater user interface 5113, in one or more embodiments, device 100, in response to detecting the deep press gesture as illustrated in FIG. 6O, displays underwater user interface 5114, or another underwater user interface having a different appearance. While underwater user interface 5113 is displayed on display 112, the user optionally selects different application affordances 5050-5053 by pressing volume adjustment buttons 5012 and 5014. For example, where the user optionally presses volume adjustment button 5014 while focus is on camera affordance 5050, device 100, in response to detecting the press of volume adjustment button 5014, sets focus on flashlight affordance 5051. Continuing with the foregoing example, where the user optionally presses push button 5016 while focus is on flashlight affordance 5051, device 100, in response to detecting the press of push button 5016, accesses the flashlight application of device 100 and displays an underwater flashlight user interface on display 112.

In some embodiments, while underwater flashlight user interface is displayed, the user optionally presses one or more of physical buttons to adjust settings of the flashlight application. For example, where device 100, after detecting a press of push button 5016 while focus is on flashlight affordance 5051, displays an underwater flashlight user interface and emits beams of light at a default intensity, the user optionally presses volume adjustment button 5012 or volume adjustment button 5014 to increase or decrease the intensity of the emitted beam of light. In one or more embodiments, user interface elements associated with different flashlight settings are displayed in the underwater flashlight user interface. For example, an increase light intensity affordance and a decrease light intensity affordance are displayed in the underwater flashlight user interface. The user optionally performs a deep press gesture with contact over the increase light intensity affordance to increase the light intensity of the flashlight, and optionally, performs a deep press gesture with contact over the decrease light intensity affordance to decrease the light intensity of the flashlight.

Similarly, where the user optionally presses push button 5016 while focus is on timer affordance 5052, device 100, in response to detecting the press of push button 5016, accesses the timer application of device 100 and displays an underwater timer user interface on display 112. In some embodiments, while the underwater timer user interface is displayed on display 112, the user optionally presses one or more of physical buttons to adjust settings of the timer application. For example, the user optionally presses volume adjustment button 5012 or volume adjustment button 5014 to increase or decrease the time (e.g., in one second increments, in one minute increments, in one hour increments, or another increment of time) on the timer. The user, after pressing volume adjustment button 5012 or 5014, optionally holds the depressed volume adjustment button 5012 or 5014 to increase or decrease the time on the timer. Further, the user, after inputting a desired time on the timer, optionally sets the timer by pressing push button 5016. In one or more embodiments, user interface elements associated with different timer settings are displayed in the underwater timer user interface. For example, an increase second affordance, an increase minute affordance, an increase hour affordance, a decrease second affordance, a decrease minute affordance, and a decrease hour affordance are displayed in the underwater timer user interface. The user optionally performs a deep press gesture with contact over the increase second affordance, the increase minute affordance, or the increase hour affordance, respectively, to increase the timer in one second, one minute, or one hour increments, respectively. Similarly, the user optionally performs a deep press gesture with contact over the decrease second affordance, the decrease minute affordance, or the decrease hour affordance, respectively, to decrease the timer in one second, one minute, or one hour increments, respectively.

Similarly, where the user optionally presses push button 5016 while focus is on alarm affordance 5053, device 100, in response to detecting the press of push button 5016, accesses the alarm application of device 100 and displays an underwater alarm user interface on display 112. In some embodiments, while the underwater alarm user interface is displayed on display 112, the user optionally presses one or more of physical buttons to adjust one or more settings of the alarm application. For example, the user optionally presses volume adjustment button 5012 or volume adjustment button 5014 to increase or decrease the scheduled alarm time (e.g., in one second increments, in one minute increments, in one hour increments, or another increment of time). Further, the user, after inputting a desired alarm time, optionally sets the alarm to go off at the desired alarm time by pressing push button 5016. In one or more embodiments, user interface elements associated with different alarm settings are displayed in the underwater alarm user interface. For example, an AM affordance, a PM affordance, and a repeat alarm affordance are displayed in the underwater alarm user interface. The user optionally performs a deep press gesture with contact over the AM affordance to designate the alarm to go off before midday, performs a deep press gesture with contact over the PM affordance to designate the alarm to go off after midday, and performs a deep press gesture with contact over the repeat alarm affordance to designate the alarm to go off every cycle (e.g., once every 24 hours, once every 12 hours or once every predetermined or user defined period of time). In some embodiments, an increase second affordance, an increase minute affordance, an increase hour affordance, a decrease second affordance, a decrease minute affordance, and a decrease hour affordance are also displayed in the underwater alarm user interface. In one or more embodiments, user interface elements associated with a number pad are displayed in the underwater alarm user interface. The user optionally performs deep press gestures over numbers associated with the desired time for the alarm to go off to input the desired alarm time.

Figure 6Q:
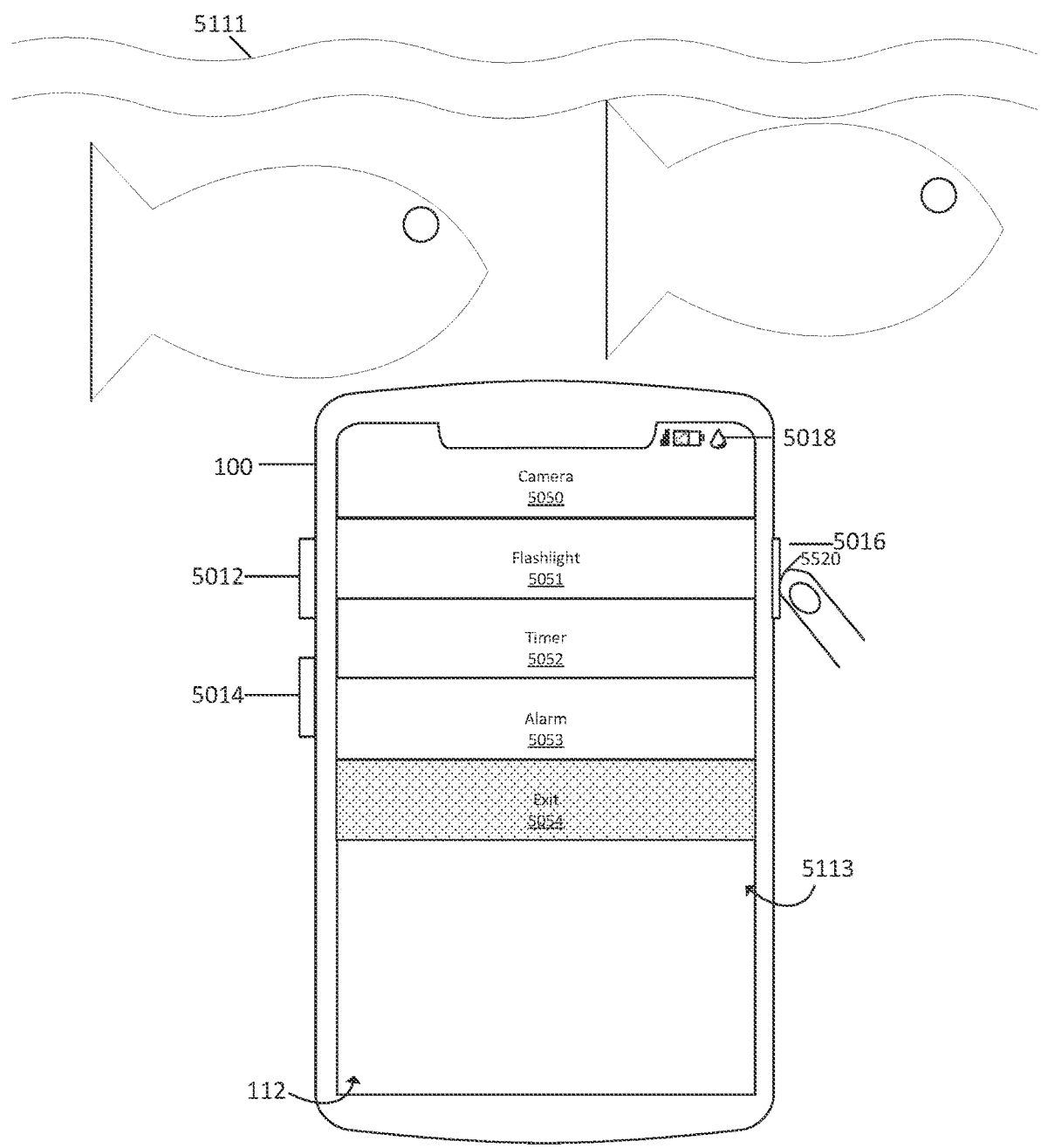
Figure 6R:
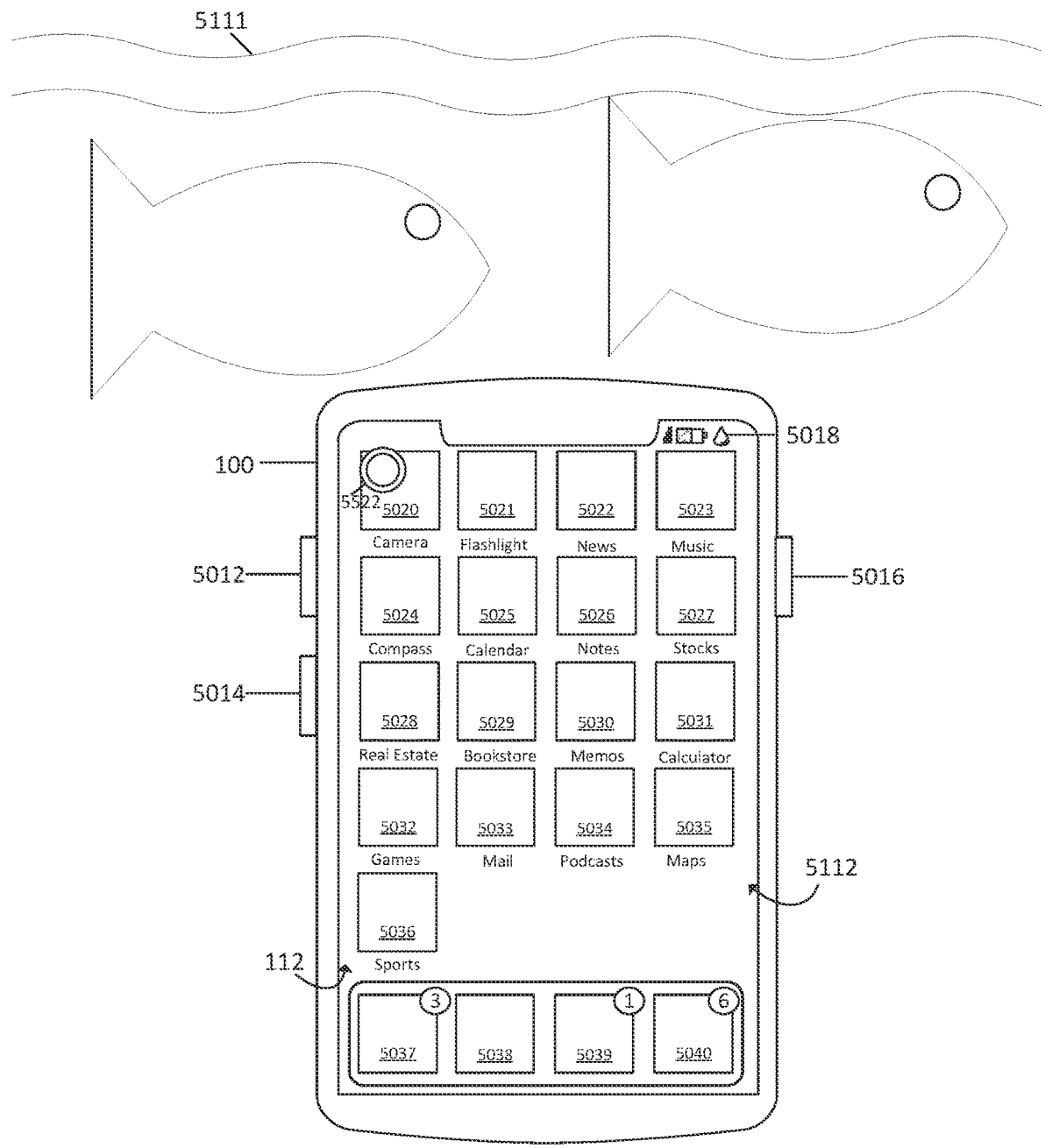
Figure 6S:
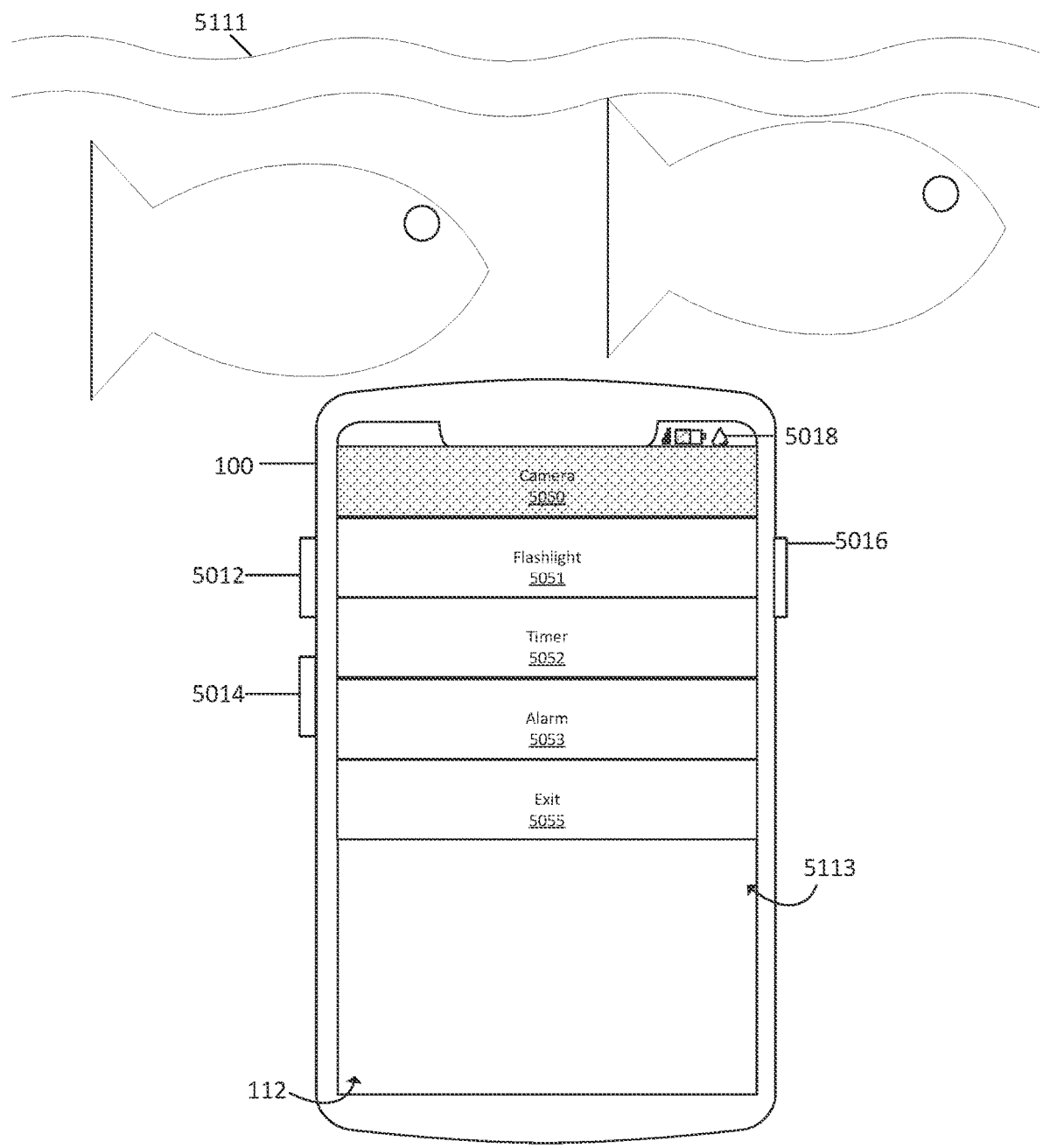

FIGS. 6P-6Q illustrate detecting a press of volume adjustment button 5012 with contact 5518 on volume adjustment button 5012, and in response to detecting the press of volume adjustment button 5012, setting focus on exit affordance 5054. Further, FIGS. 6Q-6R illustrate detecting a press of push button 5016 with contact 5520 on push button 5016, and in response to detecting the press of push button 5016, displaying user interface 5112 on display 112. In the embodiment of FIG. 6R, although the user has manually exited underwater user interface 5113, device 100 remains under water. As such, device 100 treats gestures having intensities less than the deep press gesture intensity threshold as accidental input. For example, while device 100 is under water, device 100 detects a tap gesture similar to the tap gesture illustrated in FIG. 6E with contact 5502 over camera affordance 5020. Device 100, in response to detecting the tap gesture, treats the tap gesture as an accidental input and maintains display of user interface 5112 without displaying an underwater camera user interface or an underwater user interface to access the camera of device 100. However, while device 100 is under water, the user optionally performs deep press gestures to access applications (e.g., camera application) associated with user interface elements that are displayed in user interface 5112. In that regard, FIGS. 6R-6S illustrate detecting a deep press gesture with contact 5522 over camera affordance 5020, and in response to detecting the deep press gesture, re-displaying underwater user interface 5113 on display 112.

Figure 6T:
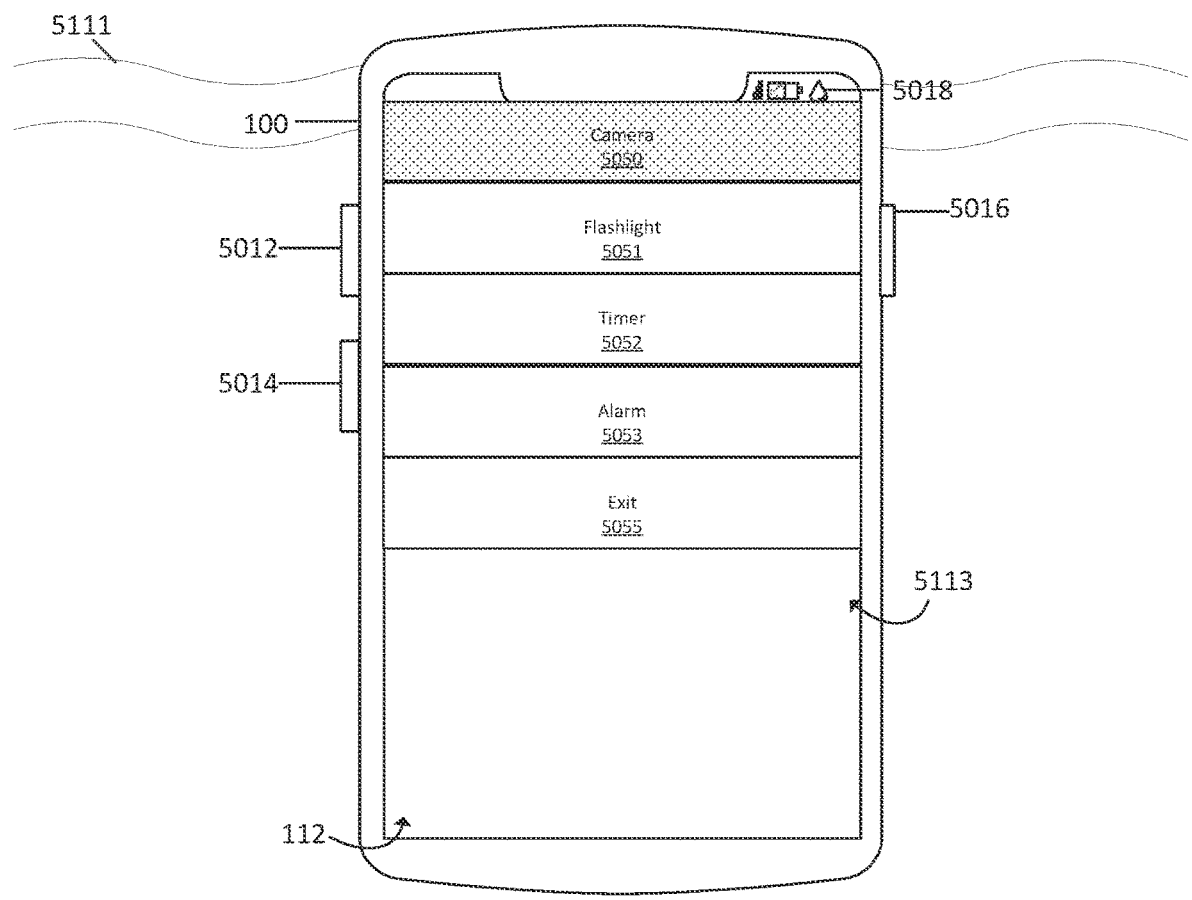
Figure 6U:
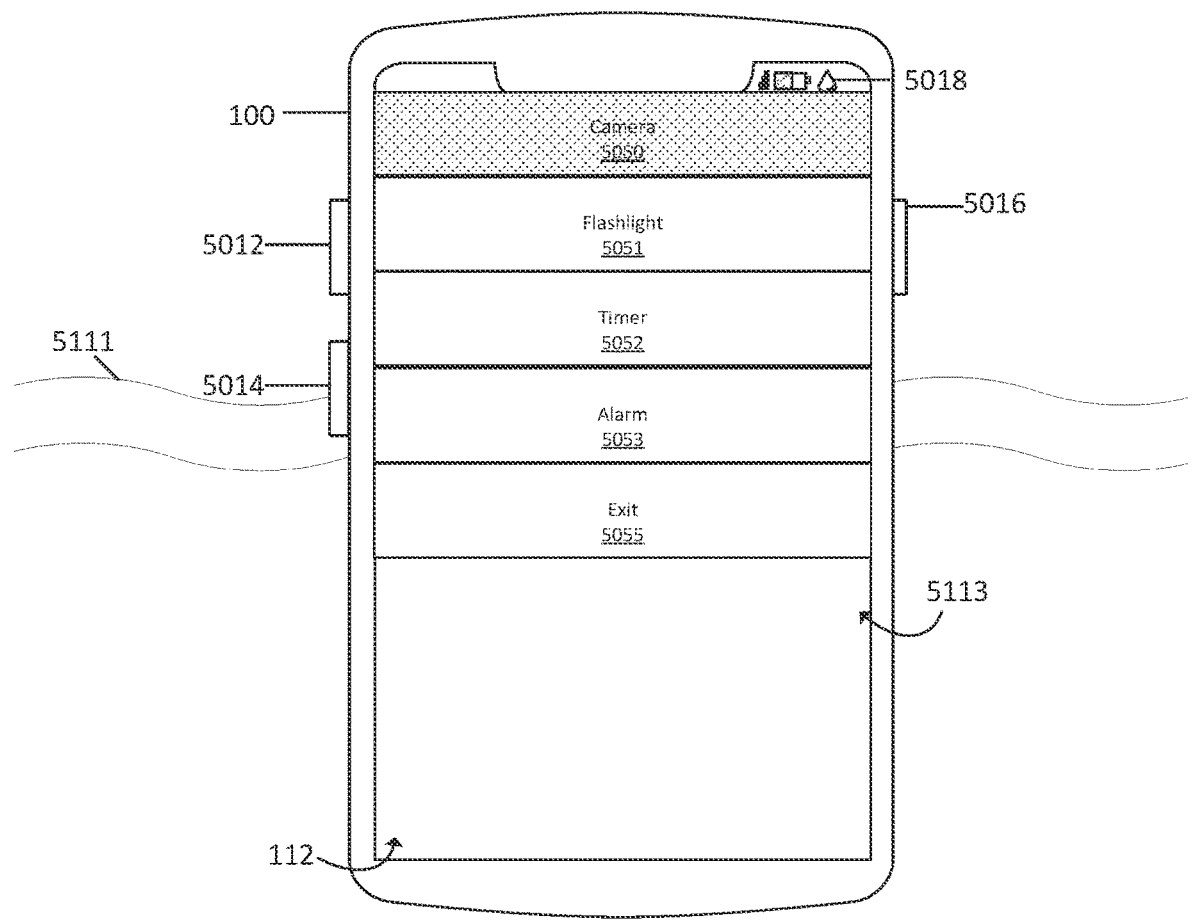
Figure 6V:
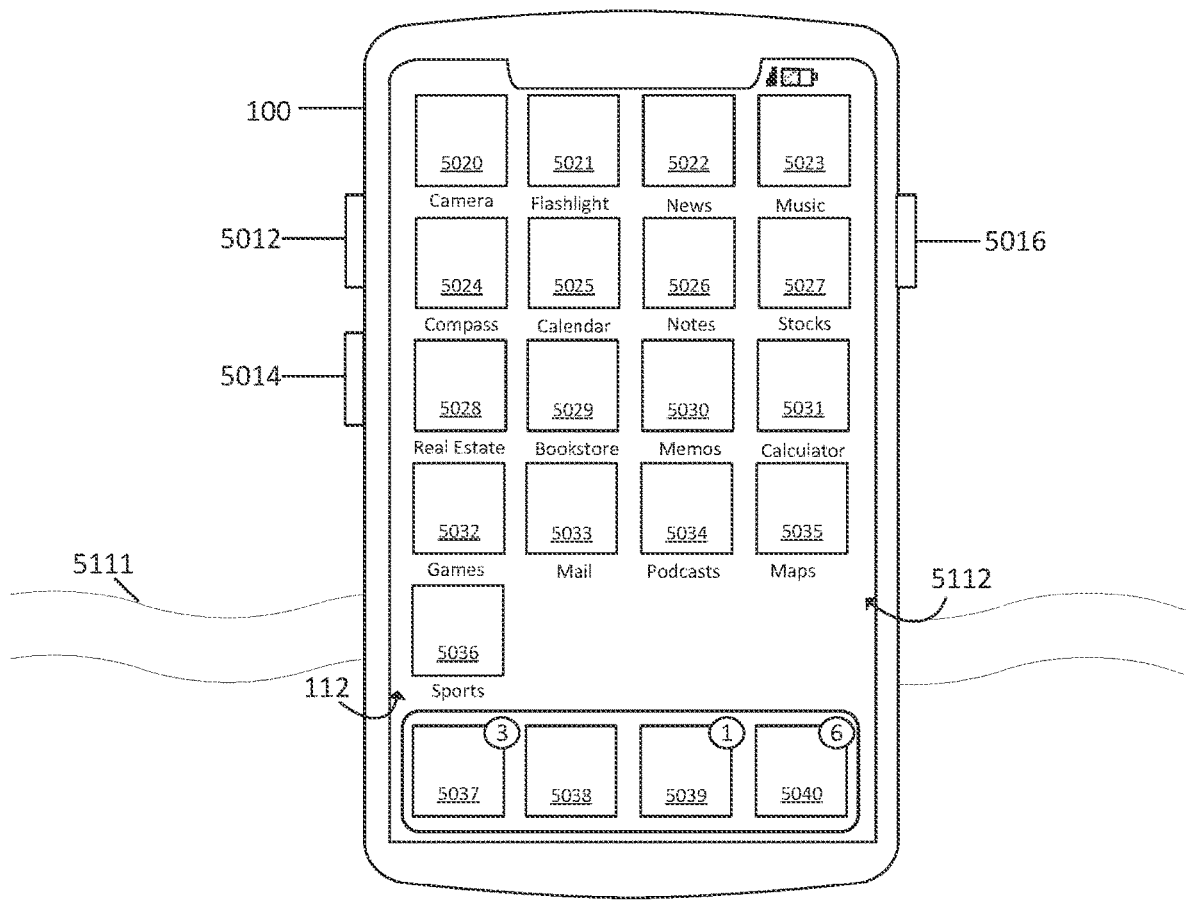

FIGS. 6T and 6U illustrate gradually raising device 100 above waterline 5111, where approximately 5% of device 100 is no longer wet in the embodiment of FIG. 6T and approximately 50% of device 100 is no longer wet in the embodiment of FIG. 6U. In the embodiments of FIGS. 6T and 6U, although a portion of device 100 is no longer wet, device 100 determines that the percentage of the surface area of display 112 that is not wet is less than a threshold value for determining that device is no longer under water. Device 100 then determines that it is still underwater and maintains display of underwater user interface 5113.

FIGS. 6U-6V illustrates further raising device 100 above waterline 5111. In the embodiment of FIG. 6V, approximately 25% of device 100 remains submerged. In the illustrated embodiment of FIG. 6V, device 100 determines that the percentage of the surface area of display 112 that is not wet is greater than or equal to the threshold value for determining that the device 100 is no longer under water, and subsequently determines that device 100 is no longer under water, and deactivates the underwater mode. In some embodiments, device 100 determines that it is no longer under water if a threshold percentage of the surface area of display 112 is no longer wet for a threshold period of time (e.g., at least 50% of display 112 is not wet for one second, five seconds, 15 seconds, or another period of time). In the illustrated embodiment of FIG. 6V, device 100, in response to determining that it is no longer under water, automatically deactivates the underwater mode and removes the display of underwater user interface 5113 of FIG. 6U, and displays user interface 5112. In one or more embodiments, device 100 deactivates the underwater mode and removes the display of an underwater user interface such as underwater user interface 5113 after determining that it is no longer under water for a threshold period of time. In one or more embodiments, device 100 deactivates the underwater mode and removes the display of an underwater user interface after determining that the user has not inputted any inputs (e.g., gestures on display 112 or presses of physical buttons) within a threshold period of time (e.g., within five second after device 100 is no longer under water or another period of time) to provide a smooth transition from an underwater user interface to a non-underwater user interface.

After device 100 deactivates the underwater mode, gestures having intensities that are less than the deep press intensity threshold are no longer treated by device 100 as accidental input. For example, device 100, after deactivating underwater mode, detects a tap gesture similar to the tap gesture illustrated in FIG. 6E with contact 5502 over camera affordance 5020, and in response to detecting the gesture, displays a camera user interface on display 112. In some embodiments, after device 100 deactivates the underwater mode, device 100 no longer displays underwater user interfaces (e.g., underwater user interface 5113 of FIG. 6C). For example, where the user performs a tap gesture with contact over camera 5020 after device 100 is no longer under water, device 100, in response to detecting the tap gesture, displays a camera user interface without displaying underwater user interface 5113 or other underwater user interfaces. In some embodiments, device 100 after deactivating underwater mode, automatically reactivates certain modules that were previously deactivated while device 100 was under water. For example, where device 100 deactivated the phone module after determining that it was under water, device 100, after determining that it is no longer under water, automatically reactivates the phone module. In one or more embodiments, device 100 also displays a notification on display 112 to notify the user which previously deactivated modules have been reactivated.

FIGS. 7A-7G are flow diagrams illustrating various embodiments of a method for accessing underwater user interfaces. More particularly, FIGS. 7A-7G are flow diagrams illustrating a method for accessing underwater user interfaces, using, for example, the user interfaces of FIGS. 6A-6V. As described in reference to FIGS. 6A-6V, method 700 can be utilized to access underwater user interfaces. Method 700 is performed at a device (e.g., device 100, 300, 500 illustrated in FIGS. 1, 3, and 5A, respectively) with a display and one or more input devices. In one of such embodiments, the display is a touch screen display and the touch-sensitive surface is on or integrated with the display. In some embodiments, the display is separate from the touch-sensitive surface. In some embodiments, the processes described herein may be implemented with devices having physical user-interfaces, voice interfaces, or other suitable interfaces. Some operations in method 700 are, optionally, combined and/or the order of some operations is, optionally, changed.

As described below, method 700 provides an intuitive way to access underwater user interfaces. Method 700 allows the user to access certain user interfaces of applications running on device 100 while device 100 is under water and other user interfaces of applications running on device 100 while device 100 is not under water. The foregoing allows the user to access certain applications and modules that are accessible while the user is under water, thereby reducing the cognitive burden on the user. Method 700 also provides the user with easy access to different applications and modules that are available to the user while device 100 is operating in different environments, thereby also reducing the cognitive burden on the user and creating a more efficient human-machine interface. For battery-operated computing devices, enabling a user to use device 100 in different environments, such as in underwater environments, faster and more efficiently conserves power and increases the time between battery charges.

At an electronic device (e.g., device 100) with a display and one or more input devices, receive (702) a first request to display a user interface for accessing a first function of device 100. FIG. 6F, for example, illustrates detecting a deep press gesture with contact 5504 over camera affordance 5020. In the illustrated embodiment of FIG. 6A, where device 100 is not under water, the user optionally performs a tap gesture with contact over camera affordance 5020 to access camera functions of device 100.

Device 100, in response to receiving the first request, and in accordance with a determination that device 100 is under water, displays (704) a first user interface for accessing the first function. FIGS. 6F-6G, for example, illustrate device 100 while it is under water. Further, FIGS. 6F-6G illustrate detecting a deep press gesture with contact 5504 over camera affordance 5020 while device 100 is under water, and in response to detecting the deep press gesture, and in accordance with a determination that device 100 is under water, displaying underwater user interface 5113 on display 112.

Device 100, in response to receiving the first request, and in accordance with a determination that device 100 is not under water, displays (706) a second user interface for accessing the first function. In the illustrated embodiment of FIG. 6A, where device 100 is not under water, the user optionally performs a tap gesture with contact over camera affordance 5020, and device 100, in response to detecting the tap gesture, displays a camera user interface on display 112. Similarly, in the illustrated embodiment of FIG. 6V, where device 100 is no longer under water, the user optionally performs a tap gesture with contact over flashlight affordance 5021, and device 100, in response to detecting the tap gesture, displays a flashlight user interface on display 112. In some embodiments, while device 100 is not under water, the user performs certain gestures (e.g., tap or slide gestures or other gestures having contact intensities less than the threshold deep press intensity threshold) over user interface elements (e.g., take photo affordance, delay shutter affordance, flash affordance, as well as other affordances associated with different camera settings and functions) displayed in the camera user interface to adjust different camera settings and functions.

In some embodiments, device 100, while displaying the first user interface, detects (708), via the one or more input devices, a first user input to access the first function. In some embodiments, device 100, in accordance with a determination that the first user input is a first type of user input, accesses (708) the first function from the first user interface. FIGS. 6F-6G, for example, illustrate detecting a deep press gesture with contact 5504 over camera affordance 5020, and in response to detecting the deep press gesture, displaying underwater user interface 5113. In the illustrated embodiment of FIGS. 6F-6G, the first type of input include deep press gestures. In one or more embodiments, the first type of input also includes pressing physical buttons, such as physical buttons 5012, 5014, and 5016 of FIGS. 6A-6V. In some embodiments, device 100, in accordance with a determination that the first user input is not the first type of user input, maintains displays (708) of the first user interface without accessing the first function. FIGS. 6E-6F, for example, illustrate detecting a tap gesture with contact 5502 over camera affordance 5020, where the detected intensity of the tap gesture is less than the deep press intensity threshold, and in response to detecting the tap gesture, maintaining display of user interface 5112 without accessing the camera application. In the illustrated embodiment of FIGS. 6E-6G, tap gestures having intensities less than the deep press intensity threshold do not belong to the first type of user input and are treated by device 100 as accidental input.

In some embodiments, device 100, while displaying the second user interface, detects (708), via the one or more input devices, a second user input to access the first function. In some embodiments, device 100, in accordance with a determination that the second user input is a second type of user input, accesses (708) the first function from the second user interface. In the illustrated embodiment of FIG. 6A, while user interface 5112 is displayed on display 112, the user optionally performs a tap gesture with contact over camera affordance 5020. In the illustrated embodiment of FIG. 6A, the tap gesture, as well as other types of gestures having intensities less than the deep press intensity threshold belong to the second type of user inputs whereas deep press gestures do not belong to the second type of user inputs. Device 100, in response to detecting the tap gesture, displays a non-underwater camera user interface on display 112. Continuing with the foregoing example, where the camera user interface includes user interface elements that the user interacts with to adjust different settings of the camera, the user performs tap gestures with contacts over the user interface elements to adjust the settings and functions of the camera.

In some embodiments, device 100, in accordance with a determination that the second user input is not the second type of user input, maintains display (708) of the second user interface without accessing the first function. In the embodiment of FIG. 6A, where device 100 is not under water, the user optionally presses volume adjustment button 5012 or 5014, each of which, is an input that does not belong to the second type of inputs. Device 100, in response to detecting a press of volume adjustment button 5012 or 5014, maintains display of user interface 5112 without accessing the camera application of device 100. Similarly, where a non-underwater camera user interface is displayed while device 100 is not under water, device 100, in response to detecting a press of volume adjustment button 5012 or 5014, maintains displaying of the non-underwater camera user interface without adjusting the camera zoom settings. Allowing different types of user inputs to access different functions based on whether device 100 is under water or not under water, or based on whether underwater user interfaces are displayed, allows a user to use one type of gestures (e.g., tap gestures) to access certain functions of device 100 while device 100 is not under water, and allows the user to use a different type of gesture (e.g., deep press gestures) to access corresponding functions of device 100 while device is under water, thereby reducing the cognitive burden of the user. Further, while device 100 is under water, allowing the user to access certain functions by performing only certain types of gestures, such as deep press gestures, reduces a likelihood of accidental user input while device 100 is under water, thereby creating a more efficient human-machine interface. Further, while device 100 is not under water, the likelihood of accidental input is less than the likelihood of accidental input while device 100 is under water. In such environments, allowing the user to access certain functions or settings by performing other types of inputs, such as tap gestures, which require less time and effort to complete, increases the efficiency and rate at which inputs are entered, thereby also creating a more efficient human-machine interface. For battery-operated computing devices, enabling a user to access different functions of device 100 faster, more efficiently, and with less error while device 100 is under water and while device 100 is not under water conserves power and increases time between battery charges.

In some embodiments, the first user interface has a first appearance, and where the second user interface has a second appearance that is different from the first appearance (710). FIG. 6C, for example illustrates underwater user interface 5113, which has a different appearance than user interface 5112 of FIG. 6A. In the embodiment of FIG. 6C, user interface elements of functions and applications of device 100 are arranged in a menu format whereas in the embodiment of FIG. 6A, user interface elements of functions and applications of device 100 are arranged in rows and columns. Further, FIG. 6I illustrates underwater camera user interface 5115. In some embodiments, certain user interface elements (e.g., exit affordance 5150G), which are displayed in underwater camera user interface 5115, are not displayed in non-underwater camera user interfaces. Displaying underwater user interfaces and non-underwater user interfaces in different appearances allows the user to quickly recognize whether device 100 is under water or not under water, thereby reducing the cognitive burden on the user and creating a more efficient human-machine interface. Further, allowing the user to quickly recognize whether device 100 is under water or not under water also allows the user to quickly determine which types of user inputs to enter (e.g., tap gestures vs. deep press gestures), which reduces incorrect inputs. For battery-operated computing devices, enabling a user to quickly determine which types of inputs to enter faster and more efficiently, and helping the user avoid entering incorrect inputs, conserves power and increases time between battery charges.

In some embodiments, device 100 receives (712) a second request to display a user interface for accessing a second function of the device 100. In some embodiments, device 100, in response to receiving the second request, and in accordance with a determination that the device 100 is under water, displays (712) the first user interface for accessing the second function. In some embodiments, device 100, while displaying the first user interface, detects (712), via the one or more input devices, a first user input to access the second function. In some embodiments, device 100, in accordance with a determination that the first user input is a first type of user input, accesses (712) the second function from the first user interface. In some embodiments, device 100, in accordance with a determination that the first user input is not the first type of user input, maintains (712) display of the first user interface without accessing the second function. FIG. 6F, for example, illustrates device 100 while device 100 is under water. In some embodiments, user optionally performs a deep press gesture (a first type of user input) with contact over flashlight affordance 5021. Device 100, in response to detecting the deep press gesture, displays underwater user interface 5113 as illustrated in FIG. 6E for accessing the flashlight application. The user optionally performs a deep press gesture with contact over flashlight affordance 5051 of FIG. 6E, and device 100, in response to detecting the deep press gesture, accesses the flashlight application and displays an underwater flashlight user interface on display 112. In some embodiments, the user performs a tap gesture (second type of user input) over flashlight affordance 5051. However, in such embodiments, device 100 does not respond to the tap gesture. More particularly, device 100, in response to the tap gesture, maintains display of underwater user interface 5113 without accessing the flashlight application.

In some embodiments, device 100, in response to receiving the second request, and in accordance with a determination that the device 100 is not under water, displays (712) the second user interface for accessing the second function.

In some embodiments, device 100, while displaying the second user interface, detects (712), via the one or more input devices, a second user input to access the second function. In some embodiments, device 100, after displaying the second user interface, and in accordance with a determination that a second type of user input is performed while the second user interface is displayed, accesses (712) the second function from the second user interface. In some embodiments, device 100, after displaying the second user interface, and in accordance with a determination that the second type of user input is not performed while the second user interface is displayed, maintains (712) display of the second user interface without accessing the second function. FIG. 6A, for example, illustrates device 100 while device 100 is not under water. In some embodiments, the user optionally performs a tap gesture with contact over flashlight affordance 5021 of FIG. 6A to access the flashlight application, and device 100, in response to detecting the tap gesture, displays a non-underwater flashlight user interface with user interface elements that the user interacts with to access or adjust one or more flashlight settings or functions, such as the intensity of the flashlight, the color of the emitted light, the pattern of the emitted light, as well as other flashlight settings. While device 100 is not under water and while the non-underwater flashlight user interface is displayed on display 112, the user optionally performs tap or slide gestures (first type of user input) to access or adjust one or more settings or functions of the flashlight. Further, while device 100 is not under water and while the non-underwater flashlight user interface is displayed on display 112, the user optionally presses one or more of physical buttons 5012, 5014, and 5016 (second type of user input). However, device 100, in response to detecting pressing of physical buttons, 5112, 5114, or 5116, maintains display of the flashlight user interface without accessing or adjusting one or more settings or functions of the flashlight.

Displaying different user interfaces that have different appearances based on whether device 100 is under water or not under water helps the user identify whether device 100 is under water or not under water, thereby reducing the cognitive burden of the user. Further, allowing the user to access certain settings or functions by performing only certain types of gestures, such as deep press gestures, reduces a likelihood of accidental user input while device 100 is under water, thereby creating a more efficient human-machine interface. Further, while device 100 is not under water, the likelihood of accidental input is less than the likelihood of accidental input while device 100 is under water. In such environments, allowing the user to access certain functions or settings by performing other types of inputs, such as tap gestures, which require less time and effort to complete, increases the efficiency and rate at which inputs are entered, also creates a more efficient human-machine interface. For battery-operated computing devices, enabling a user to access different functions of device 100 faster, more efficiently, and with less error while device 100 is under water and while device 100 is not under water conserves power and increases time between battery charges.

In some embodiments, device 100, while displaying the first user interface, detects (714), via the one or more input devices, a first user input to interact with a physical button of device 100. In some embodiments, device 100, in response to detecting the first user input, performs (714) the first function. FIGS. 6J-6K, for example, illustrates detecting a press of volume adjustment button 5012 with contact 5510 on volume adjustment button 5012, and in response to detecting the press of volume adjustment button 5012, performing a zoom in function.

In some embodiments, device 100, in response to receiving the first request, and in accordance with a determination that device 100 is not under water, displays (714) a first user interface element that is associated with the first function in the second user interface. In some embodiments, device 100 detects (714), via the one or more input devices, a second user input to select the first user interface element. In some embodiments, device 100, in accordance with a determination that the second user input is a drag input performed over the first user interface element, performs (714) the first function. In some embodiments, device 100, in accordance with a determination that the second user input is not a drag input performed over the first user interface element, maintains display (714) of the first user interface element without performing the first function. FIG. 6A, for example, illustrates device 100 while device 100 is not under water. In some embodiments, the user optionally performs a tap gesture with contact over camera affordance 5020 of FIG. 6A, and device 100, in response to detecting the tap gesture, displays a non-underwater camera user interface. In one or more embodiments, the user performs a drag gesture (or a pinch gesture) with contact on display 112, and device 100, in response to detecting the drag gesture (or the pinch gesture), adjusts the zoom of the camera. Further, in one or more embodiments, where the non-underwater camera user interface is displayed on display 112, the user presses volume adjustment buttons 5012 and 5014 of device 100. However, device 100, in response to detecting pressing of volume adjustment buttons 5012 and 5014, maintains display of the non-underwater camera user interface without adjusting the zoom level of the camera.

While device is under water, performing certain functions (e.g., adjusting the zoom level, changing the camera mode, switching between front and rear facing cameras, taking a photo, as well as performing other functions) in response to detecting certain types of gestures, such as pressing physical buttons 5012, 5014, or 5016 of device 100, reduces a likelihood of accidental user input while device 100 is under water, thereby creating a more efficient human-machine interface. Further, while device 100 is not under water, the likelihood of accidental input is less than the likelihood of accidental input while device 100 is under water. In such environments, performing certain functions in response to detecting other types of inputs, such as drag gestures, which require less time and effort to complete, increases the efficiency and rate at which inputs are entered, also creates a more efficient human-machine interface. For battery-operated computing devices, enabling a user to access different functions of device 100 faster, more efficiently, and with less error while device 100 is under water and while device 100 is not under water conserves power and increases time between battery charges.

In some embodiments, device 100, in response to receiving the first request, and in accordance with a determination that device 100 is under water, displays (716) a first user interface element that is associated with the first function in the first user interface. In some embodiments, device 100 detects (716), via the one or more input devices, a first user input to select the first user interface element. In some embodiments, device 100, in accordance with a determination that the first user input is an input with an intensity above a respective intensity threshold detected at a location corresponding to the first user interface element, performs (716) the first function. In some embodiments, device 100, in accordance with a determination that the first user input is an input with an intensity that is not above the respective intensity threshold detected at the location corresponding to the first user interface element; maintains display (716) of the first user interface element without performing the first function. FIG. 6I, for example, illustrates displaying underwater camera user interface 5115 while device 100 is under water. Moreover, focus is set on photo mode affordance 5150B to indicate that the camera is in photo mode. In some embodiments, the user optionally performs a deep press gesture with contact over video mode affordance 5150A. Device 100, in response to detecting the deep press gesture, moves focus to video mode affordance 5150A and changes the camera mode from photo mode to video mode. In some embodiments, the user optionally performs a tap gesture with contact over video mod affordance 5150A. Device 100, in response to detecting the tap gesture, treats the tap gesture as an accidental input and maintains display of underwater camera user interface 5115 without changing the camera mode.

In some embodiments, device 100, in response to receiving the first request, and in accordance with a determination that device 100 is not under water, displays (716) a second user interface element that is associated with the first function in the second user interface. In some embodiments, device 100 detects (716), via the one or more input devices, a second user input to select the second user interface element. In some embodiments, device 100, in accordance with a determination that the second user input is a drag input performed over the second user interface element, performs (716) the first function. In some embodiments, device 100, in accordance with a determination that the second user input is not a drag input performed over the second user interface element, maintains display (716) of the second user interface element without performing the first function. FIG. 6A, for example, illustrates device 100 while device 100 is not under water. In some embodiments, the user optionally performs a tap gesture with contact over camera affordance 5020 of FIG. 6A, and device 100, in response to detecting the tap gesture, displays a non-underwater camera user interface. In one or more embodiments, the user performs a drag gesture with contact from photo mode affordance 5150B to video mode affordance 5150A, and device 100, in response to detecting the drag gesture, changes the camera mode from photo mode to video mode. Further, in one or more embodiments, where the non-underwater camera user interface is displayed on display 112 while device 100 is not under water, the user optionally presses volume adjustment buttons 5012 and 5014 of device 100. However, device 100, in response to detecting pressing of volume adjustment buttons 5012 and 5014, maintains display of the non-underwater camera user interface without changing the camera mode.

While device is under water, performing certain functions (e.g., adjusting the zoom level, changing the camera mode, switching between front and rear facing cameras, taking a photo, as well as performing other functions) in response to detecting certain types of gestures, such as deep press gestures, reduces a likelihood of accidental user input while device 100 is under water, thereby creating a more efficient human-machine interface. Further, while device 100 is not under water, the likelihood of accidental input is less than the likelihood of accidental input while device 100 is under water. In such environments, performing certain functions in response to detecting other types of inputs, such as drag gestures, which require less time and effort to complete, increases the efficiency and rate at which inputs are entered, also creates a more efficient human-machine interface. For battery-operated computing devices, enabling a user to access different functions of device 100 faster, more efficiently, and with less error while device 100 is under water and while device 100 is not under water conserves power and increases time between battery charges.

In some embodiments, device 100, while displaying the first user interface, detects (718), via the one or more input devices, a first user input to interact with a physical button of device 100. In some embodiments, device 100, in response to detecting the first user input, performs (718) the first function. FIG. 6I, for example, illustrates displaying underwater camera user interface 5115 while device 100 is under water. In some embodiments, pressing volume adjustment button 5012 or 5014 while underwater camera user interface 5115 is displayed causes device 100 to switch between front and rear facing cameras of device 100. In one or more of such embodiments, device 100, in response to detecting a press of volume adjustment button 5012 or 5014, switches between front and rear facing cameras of device 100. However, where the user optionally performs a tap gesture with contact over switch camera affordance 5150F of FIG. 6I while device 100 is under water, device 100 maintains display of underwater camera user interface 5115 without switching the cameras of device 100.

In some embodiments, device 100, in response to receiving the first request, and in accordance with a determination that device 100 is not under water, displays (718) a first user interface element that is associated with the first function in the second user interface. In some embodiments, device 100 detects (718), via the one or more input devices, a second user input to select the first user interface element. In some embodiments, device 100, in accordance with a determination that the second user input is a touch input performed over the first user interface element, performs (718) the first function. In some embodiments, device 100, in accordance with a determination that the second user input is not a touch input performed over the first user interface element, maintains display (718) of the first user interface element without performing the first function. FIG. 6A, for example, illustrates device 100 while device 100 is not under water. In some embodiments, the user optionally performs a tap gesture with contact over camera affordance 5020 of FIG. 6A, and device 100, in response to detecting the tap gesture, displays a non-underwater camera user interface, which also contains a switch camera affordance similar to switch camera affordance 5150F of FIG. 6I. In one or more embodiments, the user performs a tap gesture with contact over the switch camera affordance that is displayed in the non-underwater camera user interface, and device 100, in response to detecting the tap gesture, switches the camera of device 100. Further, in one or more embodiments, where the non-underwater camera user interface is displayed on display 112, the user optionally presses volume adjustment buttons 5012 and 5014 of device 100. However, device 100, in response to detecting pressing of volume adjustment buttons 5012 and 5014, maintains display of the non-underwater camera user interface without switching the camera of device 100.

While device is under water, performing certain functions (e.g., adjusting the zoom level, changing the camera mode, switching between front and rear facing cameras, taking a photo, as well as performing other functions) in response to detecting certain types of gestures, such as pressing physical buttons 5012, 5014, or 5016 of device 100, reduces a likelihood of accidental user input while device 100 is under water, thereby creating a more efficient human-machine interface. Further, while device 100 is not under water, the likelihood of accidental input is less than the likelihood of accidental input while device 100 is under water. In such environments, performing certain functions in response to detecting other types of inputs, such as tap gestures, which require less time and effort to complete, increases the efficiency and rate at which inputs are entered, also creates a more efficient human-machine interface. For battery-operated computing devices, performing different functions of device 100 faster, more efficiently, and with less error while device 100 is under water and while device 100 is not under water conserves power and increases time between battery charges.

In some embodiments, device 100, in response to receiving the first request, and in accordance with a determination that device 100 is under water, displays (720) a first user interface element that is associated with the first function in the first user interface. In some embodiments, device 100 detects (720), via the one or more input devices, a first user input to select the first user interface element. In some embodiments, device 100, in accordance with a determination that the first user input is an input with an intensity above a respective intensity threshold detected at a location corresponding to the first user interface element, performs (720) the first function. In some embodiments, device 100, in accordance with a determination that the first user input is an input with an intensity that is not above the respective intensity threshold detected at the location corresponding to the first user interface element, maintains display (720) of the first user interface element without performing the first function. FIG. 6N, for example, illustrates displaying underwater camera user interface 5115 while device 100 is under water. Further, FIGS. 6N-6O, illustrate detecting a deep press gesture with contact 5514 over take photo affordance 5150E, and taking a photo with the rear facing camera in response to detecting the deep press gesture. In some embodiments, the user optionally performs a tap gesture with contact over take photo affordance 5150E. Device 100, in response to detecting the tap gesture, treats the tap gesture as an accidental input and maintains display of underwater camera user interface 5115 without taking a photo with the rear facing camera.

In some embodiments, device 100, in response to receiving the first request, and in accordance with a determination that device 100 is not under water, displays (720) a second user interface element that is associated with the first function in the second user interface. In some embodiments, device 100 detects (720), via the one or more input devices, a second user input to select the second user interface element. In some embodiments, device 100, in accordance with a determination that the second user input is a touch input performed over the second user interface element, performs (720) the first function. In some embodiments, device 100, in accordance with a determination that the second user input is not a touch input performed over the second user interface element, maintains display (720) of the second user interface element without performing the first function.

FIG. 6A, for example, illustrates device 100 while device 100 is not under water. In some embodiments, the user optionally performs a tap gesture with contact over camera affordance 5020 of FIG. 6A, and device 100, in response to detecting the tap gesture, displays a non-underwater camera user interface. In one or more embodiments, the user performs a tap gesture with contact on a take photo affordance similar to take photo affordance 5150E of FIG. 6O, and device 100, in response to detecting the tap gesture, takes a photo with the camera of device 100. Further, in one or more embodiments, where the non-underwater camera user interface is displayed on display 112 while device 100 is not under water, the user optionally performs a deep press gesture with contact over the take photo affordance. However, device 100, in response to detecting the deep press gesture, maintains display of the non-underwater camera user interface without taking a photo with the camera.

While device is under water, performing certain functions (e.g., adjusting the zoom level, changing the camera mode, switching between front and rear facing cameras, taking a photo, as well as other functions) in response to detecting certain types of gestures, such as deep press gestures, reduces a likelihood of accidental user input while device 100 is under water, thereby creating a more efficient human-machine interface. Further, while device 100 is not under water, the likelihood of accidental input is less than the likelihood of accidental input while device 100 is under water. In such environments, performing certain functions in response to detecting other types of inputs, such as tap gestures, which require less time and effort to complete, increases the efficiency and rate at which inputs are entered, also creates a more efficient human-machine interface. For battery-operated computing devices, performing different functions of device 100 faster, more efficiently, and with less error while device 100 is under water and while device 100 is not under water conserves power and increases time between battery charges.

In some embodiments, device 100, in response to receiving the first request, and in accordance with a determination that device 100 is under water, displays (722) one or more user interface elements associated with the first function. In some embodiments, device 100 detects (722), via the one or more input devices, a first user input to press a first physical button of device 100. In some embodiments, device 100, in response to detecting the first user input, selects (722) one of the one or more user interface elements. FIGS. 6F-6G, for example, illustrate detecting a deep press gesture with contact 5504 over camera affordance 5020, and in response to detecting the deep press gesture while device 100 is under water, displaying underwater user interface 5113 on display 112. Further, FIGS. 6G and 6I, for example, illustrate detecting a press of push button 5016 with contact 5506 on push button 5016 while focus is on camera affordance 5050, and in response to detecting the press of push button 5016, accessing the camera application and displaying underwater camera user interface 5115 on display 112. Allowing the user to select a user interface element such as camera affordance 5050 of FIG. 6G by pressing a physical button, such as push button 5016 of FIG. 6G provides a simple way for the user to select user interface elements that are displayed on display 112, thereby reducing the cognitive burden on the user and creates a more efficient human-machine interface. For battery-operated computing devices, allowing the user to select user interface elements faster and more efficiently conserves power and increases time between battery charges.

In some embodiments, device 100, in response to receiving the first request, and in accordance with a determination that device 100 is under water, displays (724) a plurality of user interface elements associated with the first function. In some embodiments, device 100 detects (724), via the one or more input devices, a first user input to press a first physical button of device 100. In some embodiments, device 100, in response to detecting the first user input, selects (724) a first user interface element of the plurality of user interface elements. In some embodiments, device 100, after selecting the first user interface element, detects (724), via the one or more input devices, a second user input to press a second physical button of device 100. In some embodiments, device 100, in response to detecting the second user input, unselects (724) the first user interface element. In some embodiments, device 100 selects (724) a second user interface element of the plurality of user interface elements. FIGS. 6F-6G, for example, illustrate detecting a deep press gesture with contact 5504 over camera affordance 5020, and in response to detecting the deep press gesture while device 100 is under water, displaying underwater camera user interface 5115 containing camera affordance 5050, flashlight affordance 5051, timer affordance 5052, alarm affordance 5053, and exit affordance 5054. In some embodiments, user interface 5113 of FIG. 6G contains multiple user interface elements associated with different camera functions and settings, such as, but not limited to photo mode, video mode, square mode, delay shutter, delay shutter, set flash, as well as other camera functions or settings. The user optionally presses volume adjustment button 5012 or 5014 to switch between different user interface elements of the camera functions and settings. For example, the user optionally presses volume adjustment button 5014, and device 100, in response to detecting pressing of volume adjustment button 5014 while focus is on photo mode, unselects the user interface element associated with photo mode, and selects the user interface element associated with video mode. Allowing the user to press physical buttons to select different user interface elements that are displayed while device 100 is under water provides the user with a simple method to switch between different user interface elements, and to adjust different settings or functions of device 100, thereby reducing the user's cognitive burden and creating a more efficient human-machine interface. For battery-operated computing devices, allowing the user to select user interface elements faster and more efficiently conserves power and increases time between battery charges.

In some embodiments, device 100, in response to receiving the first request, and in accordance with a determination that device 100 is under water, displays (726) one or more user interface elements that are associated with one or more functions in the first user interface. In some embodiments, device 100, in accordance with a determination that device 100 is not under water, displays (726) the second user interface without displaying the one or more user interface elements, where the first user interface and the second user interface are wake screen user interfaces that are displayed while device 100 is in a wake screen mode. FIG. 6C, for example illustrates displaying camera affordance 5050, flashlight affordance 5051, timer affordance 5052, alarm affordance 5053, and exit affordance 5054 in underwater user interface 5113. In some embodiments, user interface 5113 as illustrated in FIG. 6C is a wake screen user interface that is displayed when device 100 first wakes up while under water. Further, FIG. 6A illustrates displaying camera affordance 5020 and flashlight affordance 5021 in user interface 5112 without displaying a timer affordance or an alarm affordance in user interface 5112. In some embodiments, user interface 5112 as illustrated in FIG. 6A is a wake screen user interface that is displayed when device 100 first wakes up while device 100 is not under water. Displaying user interface elements associated with functions and applications that are useful to the user in an underwater wake screen user interface allows the user to easily access different functions and applications of device 100 while device 100 is under water, thereby reducing the cognitive burden on the user. Further, not displaying certain user interface elements (such as user interface elements that are associated with certain functions and applications that are not often accessed by the user) in a non-underwater wake screen user interface when device 100 wakes up while not being under water reduces the number of extraneous user interface elements that are displayed in the wake screen user interface, thereby also reducing the cognitive burden on the user and creating a more efficient human-machine interface. For battery-operated computing devices, providing the user with access to user interface elements associated with functions and applications the user will likely use, and allowing the user to select user interface elements faster, and more efficiently, conserves power and increases time between battery charges.

In some embodiments, the one or more user interface elements are associated with applications selected from a group consisting of a timer application, an alarm application, and a flashlight application (728). FIG. 6C, for example, illustrates displaying camera affordance 5050, flashlight affordance 5051, timer affordance 5052, and alarm affordance 5053 in underwater user interface 5113. Providing user interface elements of different applications and functions accessible to the user while device 100 is under water in a common user interface allows the user to quickly access different applications and functions accessible to the user while device 100 is under water, thereby reducing the cognitive burden on the user and creating a more efficient human-machine interface. For battery-operated computing devices, allowing the user to select user interface elements faster and more efficiently conserves power and increases time between battery charges.

In some embodiments, device 100, in response to receiving the first request, and in accordance with a determination that device 100 is under water, displays (730) a camera user interface element in the first user interface. In some embodiments, device 100 detects (730), via the one or more input devices, a first user input to select the camera user interface element to access a camera of device 100. In some embodiments, device 100, in response to detecting the first user input, displays (730) an underwater camera user interface having one or more camera user interface elements that are associated with camera settings of the camera, where the user interacts with one or more of the one or more camera user interface elements to adjust one or more corresponding camera settings of the camera. In some embodiments, device 100 detects (730), via the one or more input devices, a second user input to select a first camera user interface element of the one or more camera user interface elements. In some embodiments, device 100, in response to detecting the second user input, adjusts (730) a corresponding camera setting associated with the first camera user interface element. FIGS. 6G and 6I, for example, illustrate detecting a press of push button 5016 with contact 5506 on push button 5016 while focus is on camera affordance 5050, and in response to detecting the press while device 100 is under water, displaying underwater camera user interface 5115 on display 112. In the illustrated embodiment of FIG. 6I, take photo affordance 5150E is one of several user interface elements associated with different camera settings of the camera. Further, FIGS. 6N-6O illustrates detecting a deep press gesture with contact 5514 over take photo affordance 5150E, and in response to the deep press gesture, taking a photo with the camera. The user optionally performs a deep press gesture with contact over video mode affordance 5150A, which is a user interface element that is associated with another camera setting. Device 100, in response to detecting the deep press gesture, switches the camera mode from photo mode to video mode. Similarly, the user optionally performs a deep press gesture with contact over timer affordance 5150H, which is another user interface element that is associated with another camera setting. Device 100, in response to detecting the deep press gesture, adjust the shutter delay of the camera. Displaying user interface elements associated with different camera settings in a camera user interface provides the user access to multiple camera setting and allows the user to make adjustments to different camera settings from a common user interface, thereby reducing the cognitive burden on the user and creating a more efficient human-machine interface. For battery-operated computing devices, allowing the user to access and adjust different camera settings faster and more efficiently conserves power and increases time between battery charges.

In some embodiments, device 100, in accordance with a determination that device 100 is under water, automatically adjusts (732) one or more settings of device 100 for underwater usage. FIGS. 6I-6O, for example, illustrate displaying underwater camera user interface 5115 in response to detecting a user input to access the camera of device 100. In some embodiments, device 100, after determining that it is under water, automatically adjusts certain camera settings to improve performance of the camera while used under water. For example, device 100 automatically adjusts the default shutter speed and flash setting of the camera while device 100 is under water to improve the quality of photos taken while device 100 is under water. Automatically adjusting one or more settings of device 100 while device 100 is under water improves performance of device 100 without requiring user input, thereby reducing the cognitive burden of the user and creating a more efficient human-machine interface. For battery-operated computing devices, improving the performance of device 100 while device 100 is under water conserves power and increases time between battery charges.

In some embodiments, device 100, in accordance with a determination that device 100 is under water, activates (734) a lost phone mode. In some embodiments, while device 100 is in the lost phone mode, device 100 periodically emits (734) a flash from device 100. FIG. 6C, for example, illustrates device 100 being under water. In some embodiments, device 100 activates a lost phone mode after determining that it is under water. In one or more of such embodiments, device 100 activates the lost phone mode after determining that it is under water and after device 100 has not detected a user input for a threshold period of time. In one or more of the foregoing embodiments, device 100, after activating a lost phone mode, also emits flashes to provide a visual indication of the current location of device 100. Providing an easily recognizable visual indication of the current location of device 100 helps the user, as well as other individuals, locate device 100 while device 100 is under water, thereby reducing the cognitive burden of the user and creating a more efficient human-machine interface. For battery-operated computing devices, allowing the user or other individuals to determine the current location of device 100, and thereby recover device 100 faster and more efficiently, conserves power expanded by device 100 while device 100 is lost under water and increases time between battery charges.

In some embodiments, while device 100 is in the lost phone mode, device 100 periodically emits (736) a strobe pattern from device 100. Continuing with the foregoing example, where device 100 activates the lost phone mode after determining that it is under water, in some embodiments, device 100 also emits a strobe pattern, which allows the user or other individuals to identify the current location of device 100. Providing an easily recognizable visual indication of the current location of device 100 helps the user, as well as other individuals, locate device 100 while device 100 is under water, thereby reducing the cognitive burden of the user and creating a more efficient human-machine interface. For battery-operated computing devices, allowing the user or other individuals to determine the current location of device 100, and thereby recover device 100 faster and more efficiently, conserves power expanded by device 100 while device 100 is lost under water and increases time between battery charges.

In some embodiments, while device 100 is in the lost phone mode, device 100 receives (738) a communication from a second electronic device. In some embodiments, device 100, in response to receiving the communication from the second electronic device, activates (738) the display of device 100. FIG. 6C, for example, displays underwater user interface 5113 while device 100 is under water. In some embodiments, device 100 subsequently enters into a sleep mode after a period of inactivity, where display 112 is turned off during sleep mode. Further, device 100, while in the sleep mode, receives a communication from another electronic device, and in response to receiving the communication, activates display 112 to notify the user about the communication. In one or more of such embodiments, device 100 also displays an indication of the communication on display 112. For example, where the communication is a text message from the electronic device of the user's wife, device 100 also overlays user interface 5113 with a message bubble containing the text message. Activating display 112 after receiving a communication from another electronic device allows the user to become cognizant of an income communication from another electronic device, thereby reducing the cognitive burden on the user and creating a more efficient human-machine interface. For battery-operated computing devices, allowing the user to determine the presence of an incoming communication faster and more efficiently conserves power and increases time between battery charges.

In some embodiments, while device 100 is in the lost phone mode, device 100 receives (740) a communication from a second electronic device. In some embodiments, device 100, in response to receiving the communication from the second electronic device, determines (740) a position of device 100 relative to the second electronic device. In some embodiments, device 100 transmits (740) a request to the second electronic device to display the position of device 100 relative to the second electronic device on a display of the second electronic device. FIG. 6C, for example, displays underwater user interface 5113 while device 100 is under water. In some embodiments, device 100, after receiving a communication from another electronic device (e.g., another electronic device of the user, an electronic device of the user's spouse, an electronic device of a nearby user, an electronic device of a search and rescue personnel, etc.), also determines a current location of device 100 and a location of device 100 with respective to the other device, and provides the current location of device 100 and the relative location of device 100 with respect to the other device to the other electronic device with a request to display the current location on the other electronic device. Providing the current location of device 100 and a relative location of device 100 with respect to another electronic device to the other electronic device allows the user of the other electronic device to quickly locate device 100, and in certain circumstances, retrieve device 100 and possibly rescue the user from under water. In some embodiments, device 100 automatically provides the location of device 100 without requiring any input from the user, thereby reducing the cognitive burden on the user and creating a more efficient human-machine interface. For battery-operated computing devices, allowing the user of another electronic device to determine the current location of device 100, and thereby recover device 100 faster and more efficiently conserves power expanded by device 100 while device 100 is under water, and increases time between battery charges.

In some embodiments, device 100, in accordance with a determination that device 100 is under water, displays (742) a request for user confirmation that device 100 is under water. In some embodiments, device 100 detects (742), via the one or more input devices, a first user input to confirm that device 100 is under water. In some embodiments, device 100, in response to detecting the first user input, displays (742) the first user interface on the display. FIG. 6C, for example, illustrates device 100 determining that it is under water, and automatically displaying underwater user interface 5113. In some embodiments, after device 100 has determined that it is under water, device 100 queries the user to confirm that device 100 is under water. In one or more of such embodiments, device 100 displays underwater user interface 5113 after detecting a user input confirming that device 100 is under water. Providing the user an option to confirm that device 100 is under water before displaying an underwater user interface reduces the likelihood that device 100 incorrectly determines that it is under water. Further, providing the user with an option to confirm that device 100 is under water also allows the user to determine whether the user would like to interact with underwater user interfaces. The foregoing reduces the cognitive burden on the user and creates a more efficient human-machine interface. For battery-operated computing devices, accurately determining whether device 100 is under water conserves power and increases time between battery charges.

In some embodiments, device 100, while displaying the first user interface, determines (744) whether device 100 is no longer under water. In some embodiments, device 100 automatically removes (744) the display of the first user interface after a determination that device 100 is no longer under water. FIG. 6V, for example, illustrates device 100 determining that it is no longer under water, and in response to the determination, automatically removing underwater user interface 5113. Automatically removing an underwater user interface when device 100 is no longer under water, and optionally, displaying a corresponding non-underwater user interface without any user input reduces the cognitive burden on the user and creates a more efficient human-machine interface. For battery-operated computing devices, removing underwater user interfaces faster and more efficiently after device 100 is no longer under water, and optionally, automatically displaying corresponding non-underwater user interfaces faster and more efficiently, conserves power and increases time between battery charges.

In some embodiments, device 100 determines (746) that device 100 is under water if a first threshold amount of the display of device 100 is wet. In some embodiments, device 100 determines that device 100 is not under water if a second threshold amount of the display of device 100 is wet, where the first amount percentage is greater than the second threshold amount. FIG. 6C, for example illustrates device 100 determining that it is under water after approximately 75% of display 112 is wet. FIG. 6V, for example, illustrates device 100 determining that it is not under water after approximately 25% of display is wet. Setting different thresholds to determine whether device 100 is under water or no longer under water allows device to designate different criteria for determining whether device 100 is under water or not under water. Further, automatically determining whether device 100 is under water or not under water without user input reduces the cognitive burden on the user and creates a more efficient human-machine interface. For battery-operated computing devices, automatically determining whether device 100 is under water or not under water faster, more accurately, and more efficiently conserves power and increases time between battery charges.

In some embodiments, device 100, while displaying the first user interface, determines (748) whether device 100 is no longer under water for a threshold period of time. In some embodiments, device 100 automatically removes (748) the display of the first user interface after a determination that device 100 is no longer under water for the threshold period of time. FIGS. 6U-6V, for example, illustrates device 100 determining that a threshold percentage of display 112 is no longer wet, and in response to determining that the threshold percentage of display 112 is no longer wet, removing display of underwater user interface 5113. In some embodiments, device 100 removes the display of an underwater user interface after device 100 determines that it is no longer under water for a threshold period of time. Removing display of an underwater user interface after device 100 is no longer under water for a threshold period of time increases the likelihood that device 100 is no longer under water when the display of the underwater user interface is removed. Further, automatically removing the underwater user interface without requiring additional user inputs reduces the cognitive burden on the user and creates a more efficient human-machine interface. For battery operated computer devices, determining that device 100 is no longer under water faster and more efficiently, and automatically removing a previously displayed underwater user interface without user inputs conserve power and increase time between battery charges.

In some embodiments, device 100, in accordance with a determination that device 100 is under water, displays (750) an underwater indicator on the display. In some embodiments, device 100, in accordance with a determination that device 100 is no longer under water, removes (750) the underwater indicator from the display. FIG. 6C, for example illustrates displaying underwater indicator 5018 in the status bar region of display 112 in response to determining that device 100 is under water. Further, FIG. 6V illustrates removing underwater indicator 5018 of FIG. 6C from display after determining that device 100 is no longer under water. Displaying an underwater indicator, such as underwater indicator 5018 of FIG. 6C on display after device 100 and removing the underwater indicator from display after device 100 is no longer under water allow the user to quickly determine whether device 100 is under water or not under water. The foregoing reduces the cognitive burden on the user and creates a more efficient human-machine interface. For battery-operated computing devices, allowing a user to determine whether device 100 is under water or not under water faster and more efficiently conserves power and increases time between battery charges.

In some embodiments, while the underwater indicator is displayed in the first user interface, device 100 detects (752), via the one or more input devices, a first user input to remove the first user interface. In some embodiments, device 100, in response to detecting the first user input, removes (752) the first user interface from the display. FIGS. 6Q-6R, for example illustrates detecting a press of push button 5016 with contact 5520 on push button 5016, and in response to detecting the press of push button 5016 while underwater indicator 5018 is displayed on display 112, removing underwater user interface 5113 for display 112. Allowing the user to enter certain inputs to remove display of a user interface provides the user with a simple way of controlling which user interfaces are displayed on display 112, thereby reducing the cognitive burden on the user and creating a more efficient human-machine interface. For battery-operated computing devices, removing display of user interfaces faster and more efficiently conserves power and increases time between battery charges.

In some embodiments, device 100, in response to a determination that device 100 is under water, deactivates (754) one or more modules of device 100. FIGS. 6C-6U, for example, illustrate device 100 while device 100 is under water. In some embodiments, device 100, after determining that it is under water, deactivates certain modules that are not accessible by the user or are infrequently used by the user while device 100 is under water. For example, device 100 after determining that it is under water, deactivates touch modules, telephone modules, and acoustic modules. In one or more embodiments, device 100 automatically deactivates the modules without user input, thereby reducing the cognitive burden on the user and creating a more efficient human-machine interface. For battery-operated computing devices, deactivating certain modules not accessible or not frequently used by the user faster, more efficiently, and without user input, conserves power and increases time between battery charges.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
    at an electronic device in communication with a display device and one or more input devices:
        while the display device is inactive, detecting an activation event;
        in response to detecting the activation event, displaying, via the display device, a wake screen user interface, wherein:
            in accordance with a determination that the activation event was detected while the electronic device is underwater, the wake screen user interface is a first wake screen user interface that includes a first set of one or more affordances that are selectable to access one or more first functions of the electronic device; and
            in accordance with a determination that the activation event was detected while the electronic device is not underwater, the wake screen user interface is a second wake screen user interface that includes a second set of one or more affordances that are selectable to access one or more second functions of the electronic device;
        while displaying the wake screen user interface, detecting a user input to interact with a physical button associated with the electronic device; and
        in response to detecting the user input:
            in accordance with a determination that the electronic device is underwater, performing a first operation; and
            in accordance with a determination that the electronic device is not underwater, forgoing performing the first operation.

2. The method of claim 1, wherein the first set of one or more affordances includes the second set of one or more affordances.

3. The method of claim 1, wherein the first set of one or more affordances is displayed according to a first arrangement on the first wake screen user interface, and the second set of one or more affordances is displayed according to a second arrangement, different from the first arrangement, on the second wake screen user interface.

4. The method of claim 1, wherein the first set of one or more affordances includes a first affordance that is selectable to access a first function, and the second set of one or more affordances includes a second affordance that is selectable to access the first function.

5. The method of claim 4, wherein the first affordance has a first visual appearance, and the second affordance has a second visual appearance, different from the first visual appearance.

6. The method of claim 1, wherein the one or more first functions include a respective function of a first respective application installed on the electronic device.

7. The method of claim 1, wherein the one or more second functions include a respective function of a second respective application installed on the electronic device.

8. A non-transitory computer-readable storage medium including instructions, which when executed by one or more processors of an electronic device that is in communication with a display device and one or more input devices, cause the electronic device to perform a method comprising:
    while the display device is inactive, detecting an activation event;
    in response to detecting the activation event, displaying, via the display device, a wake screen user interface, wherein:
        in accordance with a determination that the activation event was detected while the electronic device is underwater, the wake screen user interface is a first wake screen user interface that includes a first set of one or more affordances that are selectable to access one or more first functions of the electronic device; and
        in accordance with a determination that the activation event was detected while the electronic device is not underwater, the wake screen user interface is a second wake screen user interface that includes a second set of one or more affordances that are selectable to access one or more second functions of the electronic device; and while displaying the wake screen user interface, detecting a user input to interact with a physical button associated with the electronic device; and
in response to detecting the user input:
in accordance with a determination that the electronic device is underwater, performing a first operation; and
in accordance with a determination that the electronic device is not underwater, forgoing performing the first operation.

9. An electronic device configured to communicate with a display device and one or more input devices, the electronic device comprising:
one or more processors; and
memory storing instructions, which when executed by the one or more processors, cause the electronic device to perform a method comprising:
while the display device is inactive, detecting an activation event;
in response to detecting the activation event, displaying, via the display device, a wake screen user interface, wherein:
in accordance with a determination that the activation event was detected while the electronic device is underwater, the wake screen user interface is a first wake screen user interface that includes a first set of one or more affordances that are selectable to access one or more first functions of the electronic device; and
in accordance with a determination that the activation event was detected while the electronic device is not underwater, the wake screen user interface is a second wake screen user interface that includes a second set of one or more affordances that are selectable to access one or more second functions of the electronic device; and
while displaying the first wake screen user interface, detecting a user input to interact with a physical button associated with the electronic device; and
in response to detecting the user input:
in accordance with a determination that the electronic device is underwater, performing a first operation; and
in accordance with a determination that the electronic device is not underwater, forgoing performing the first operation.

10. The method of claim 1, wherein the first operation comprises adjusting a zoom level of a camera application.

11. The method of claim 1, wherein the first operation comprises switching a focus between a first application affordance and a second application affordance.

12. The method of claim 1, further comprising:
in response to detecting the user input:
in accordance with the determination that the electronic device is not underwater, performing a second operation different from the first operation.

13. The non-transitory computer-readable storage medium of claim 8, wherein the first set of one or more affordances includes the second set of one or more affordances.

14. The non-transitory computer-readable storage medium of claim 8, wherein the first set of one or more affordances is displayed according to a first arrangement on the first wake screen user interface, and the second set of one or more affordances is displayed according to a second arrangement, different from the first arrangement, on the second wake screen user interface.

15. The non-transitory computer-readable storage medium of claim 8, wherein the first set of one or more affordances includes a first affordance that is selectable to access a first function, and the second set of one or more affordances includes a second affordance that is selectable to access the first function.

16. The non-transitory computer-readable storage medium of claim 15, wherein the first affordance has a first visual appearance, and the second affordance has a second visual appearance, different from the first visual appearance.

17. The non-transitory computer-readable storage medium of claim 8, wherein the one or more first functions include a respective function of a first respective application installed on the electronic device.

18. The non-transitory computer-readable storage medium of claim 8, wherein the one or more second functions include a respective function of a second respective application installed on the electronic device.

19. The non-transitory computer-readable storage medium of claim 8, wherein the first operation comprises adjusting a zoom level of a camera application.

20. The non-transitory computer-readable storage medium of claim 8, wherein the first operation comprises switching a focus between a first application affordance and a second application affordance.

21. The non-transitory computer-readable storage medium of claim 8, wherein the method further comprises:
in response to detecting the user input:
in accordance with the determination that the electronic device is not underwater, performing a second operation different from the first operation.

22. The electronic device of claim 12, wherein the first set of one or more affordances includes the second set of one or more affordances.

23. The electronic device of claim 12, wherein the first set of one or more affordances is displayed according to a first arrangement on the first wake screen user interface, and the second set of one or more affordances is displayed according to a second arrangement, different from the first arrangement, on the second wake screen user interface.

24. The electronic device of claim 12, wherein the first set of one or more affordances includes a first affordance that is selectable to access a first function, and the second set of one or more affordances includes a second affordance that is selectable to access the first function.

25. The electronic device of claim 24, wherein the first affordance has a first visual appearance, and the second affordance has a second visual appearance, different from the first visual appearance.

26. The electronic device of claim 12, wherein the one or more first functions include a respective function of a first respective application installed on the electronic device.

27. The electronic device of claim 12, wherein the one or more second functions include a respective function of a second respective application installed on the electronic device.

28. The electronic device of claim 12, wherein the first operation comprises adjusting a zoom level of a camera application.

29. The electronic device of claim 12, wherein the first operation comprises switching a focus between a first application affordance and a second application affordance.

30. The electronic device of claim 12, wherein the method further comprises:
    in response to detecting the user input:
        in accordance with the determination that the electronic device is not underwater, performing a second operation different from the first operation.

\* \* \* \* \*

UNITED STATES PATENT AND TRADEMARK OFFICE
CERTIFICATE OF CORRECTION

PATENT NO. : 11,875,021 B2
APPLICATION NO. : 17/222803
DATED : January 16, 2024
INVENTOR(S) : Benjamin W. Bylenok et al.

It is certified that error appears in the above-identified patent and that said Letters Patent is hereby corrected as shown below:

In the Claims

Column 64, Line 35: In Claim 22, delete "claim 12," and insert -- claim 9, --.

Column 64, Line 38: In Claim 23, delete "claim 12," and insert -- claim 9, --.

Column 64, Line 45: In Claim 24, delete "claim 12," and insert -- claim 9, --.

Column 64, Line 54: In Claim 26, delete "claim 12," and insert -- claim 9, --.

Column 64, Line 57: In Claim 27, delete "claim 12," and insert -- claim 9, --.

Column 64, Line 62: In Claim 28, delete "claim 12," and insert -- claim 9, --.

Column 64, Line 65: In Claim 29, delete "claim 12," and insert -- claim 9, --.

Column 65, Line 1: In Claim 30, delete "claim 12," and insert -- claim 9, --.

Signed and Sealed this
Twelfth Day of March, 2024

Katherine Kelly Vidal
*Director of the United States Patent and Trademark Office*